(12) United States Patent
Tarin

(10) Patent No.: US 7,076,507 B1
(45) Date of Patent: Jul. 11, 2006

(54) VALUE-INSTANCE-CONNECTIVITY COMPUTER-IMPLEMENTED DATABASE

(75) Inventor: Stephen A. Tarin, Atherton, CA (US)

(73) Assignee: Required Technologies, Inc., New York, NY (US)

( * ) Notice: Subject to any disclaimer, the term of this patent is extended or adjusted under 35 U.S.C. 154(b) by 337 days.

(21) Appl. No.: 10/329,296

(22) Filed: Dec. 23, 2002

Related U.S. Application Data

(63) Continuation of application No. 09/727,423, filed on Dec. 1, 2000, now Pat. No. 6,513,041, which is a continuation-in-part of application No. 09/412,158, filed on Oct. 5, 1999, now Pat. No. 6,606,638, which is a continuation of application No. 09/112,078, filed on Jul. 8, 1998, now Pat. No. 6,009,432.

(51) Int. Cl.
*G06F 17/30* (2006.01)
*G06F 15/16* (2006.01)

(52) U.S. Cl. .............................. 707/200; 707/5; 707/10; 707/100; 709/201

(58) Field of Classification Search ..................... 707/2, 707/3, 102, 103 R, 200, 206, 5, 10, 100; 709/201, 203; 711/118
See application file for complete search history.

(56) References Cited

U.S. PATENT DOCUMENTS

| | | | |
|---|---|---|---|
| 4,468,732 A | 8/1984 | Raver | |
| 4,479,196 A | 10/1984 | Ferrer et al. | |
| 4,858,146 A | 8/1989 | Shebini | |
| 5,010,478 A | 4/1991 | Deran | |
| 5,201,046 A | 4/1993 | Goldberg et al. | |
| 5,276,868 A | 1/1994 | Poole | |
| 5,379,422 A * | 1/1995 | Antoshenkov | ................. 707/1 |
| 5,388,259 A * | 2/1995 | Fleischman et al. | ........... 707/5 |
| 5,412,797 A | 5/1995 | Rubin | |
| 5,414,834 A | 5/1995 | Alexander et al. | |
| 5,495,608 A | 2/1996 | Antoshenkov | |
| 5,504,885 A * | 4/1996 | Alashqur | .................... 717/141 |

(Continued)

OTHER PUBLICATIONS

"ERDB Entity-Relation Database," Website and ERDB Manual, www.ataindy.com, copyright 1998, Automated Technology Associates.

(Continued)

Primary Examiner—Shahid Alam
(74) Attorney, Agent, or Firm—Jones Day

(57) ABSTRACT

A computer-implemented database and method providing an efficient, ordered reduced space representation of multi-dimensional data. The data values for each attribute are stored in a manner that provides an advantage in, for example, space usage and/or speed of access, such as in condensed form and/or sort order. Instances of each data value for an attribute are identified by instance elements, each of which is associated with one data value. Connectivity information is provided for each instance element that uniquely associates each instance element with a specific instance of a data value for another attribute. Low cardinality fields may be combined into a single field having values representing the various combinations of the original fields. In one embodiment, the "combined field" contains only instantiated combinations. In another embodiment, the combined field contains all values in the Cartesian product of the original fields, preferably in nested sort order. In yet another embodiment, the original fields are padded with dummy values so that their cardinalities are a power of two, causing each subfield in the combined field to fall on a bit boundary. In still another embodiment, containerization techniques are used to reduce the space required for representing the complete set of all possible values in the Cartesian product of the original fields.

4 Claims, 21 Drawing Sheets

U.S. PATENT DOCUMENTS

| | | | |
|---|---|---|---|
| 5,542,073 A * | 7/1996 | Schiefer et al. ................. | 707/2 |
| 5,546,575 A | 8/1996 | Potter et al. | |
| 5,555,388 A | 9/1996 | Shaughnessy | |
| 5,560,006 A | 9/1996 | Layden et al. | |
| 5,592,667 A * | 1/1997 | Bugajski ..................... | 707/102 |
| 5,611,076 A | 3/1997 | Durflinger et al. | |
| 5,649,181 A | 7/1997 | French et al. | |
| 5,675,779 A | 10/1997 | Doktor | |
| 5,692,178 A | 11/1997 | Shaughnessy | |
| 5,701,461 A | 12/1997 | Dalal et al. | |
| 5,713,014 A | 1/1998 | Durflinger et al. | |
| 5,734,887 A * | 3/1998 | Kingberg et al. .............. | 707/4 |
| 5,761,652 A * | 6/1998 | Wu et al. ...................... | 707/2 |
| 5,787,279 A * | 7/1998 | Rigoutsos ...................... | 707/6 |
| 5,794,229 A | 8/1998 | French et al. | |
| 5,797,000 A * | 8/1998 | Bhattacharya et al. ......... | 707/2 |
| 5,797,136 A | 8/1998 | Boyer et al. | |
| 5,799,312 A * | 8/1998 | Rigoutsos ............... | 707/103 R |
| 5,802,525 A * | 9/1998 | Rigoutsos ............... | 707/103 R |
| 5,838,965 A | 11/1998 | Kavanagh et al. | |
| 5,855,019 A * | 12/1998 | Bhargava et al. .............. | 707/9 |
| 5,918,225 A | 6/1999 | White et al. | |
| 5,956,706 A * | 9/1999 | Carey et al. .................... | 707/2 |
| 5,963,936 A * | 10/1999 | Cochrane et al. .............. | 707/3 |
| 5,966,709 A | 10/1999 | Zhang et al. | |
| 5,983,232 A | 11/1999 | Zhang | |
| 5,999,933 A * | 12/1999 | Mehta ........................ | 707/100 |
| 6,006,219 A | 12/1999 | Rothschild | |
| 6,018,734 A | 1/2000 | Zhang et al. | |
| 6,088,691 A * | 7/2000 | Bhargava et al. .............. | 707/2 |
| 6,138,111 A * | 10/2000 | Krishna ......................... | 707/2 |
| 6,199,099 B1 * | 3/2001 | Gershman et al. .......... | 709/203 |
| 6,330,554 B1 * | 12/2001 | Altschuler et al. ............ | 706/21 |
| 6,374,263 B1 * | 4/2002 | Bunger et al. .............. | 707/201 |
| 6,484,179 B1 * | 11/2002 | Roccaforte .................. | 707/102 |

OTHER PUBLICATIONS

"Monet Source Code," dated Jan. 8, 1996, as appears on www.cwi.nl/~monet/srcdoc.html as of Feb. 5, 1999.

"Monet Performance," www.cwi.nl/~monet/performance.html, last modified Sep. 20, 1995.

Boncz et al., "The Drill Down Benchmark," www.cwi.nl/~monet/papers.html, appears in Proceedings of the 24th VLDB Conference New York, USA, 1998.

Boncz et al., "Flattening an Object Algebra to Provide Performance," www.cwi.nl/~monet/papers.html, appears in 14th International Conference on Data Engineering, Feb. 23-27, 1998, Orlando, Florida, USA.

Boncz et al., "Monet and Its Geographic Extensions: a Novel Approach to High Performance GIS Processing," as appears on www.cwi.nl/~monet/papers.html as of Feb. 5, 1999.

Boncz et al., "Monet An Impressionist Sketch of An Advanced Database System," www.cwi.nl/~monet/papers.html, appears in Basque International Workshop on Information Technology, Data Management Systems, San Sebastian, Spain, Jul. 19-21, 1995.

van den Berg et al., "Monet Meets 007," Nov. 3, 1995, as appears on www.cwi.nl/~monet/papers.html as of Feb. 5, 1999.

Kersten et al., "A Data Cube Algebra Engine for Data Mining," as appears on www.cwi.nl/~monet/papers.html as of Feb. 5, 1999.

van den Berg, "Dynamic Query Processing in a Parallel Object-Oriented Databae System," Ph.D. Thesis, published at CWI, 1994, as appears on www.cwi.nl/~monet/papers.html as of Feb. 5, 1999.

van den Berg et al., "Analysis of a Dynamic Query Optimization Technique for Multi-Join Queries," as appears on www.cwi.nl/~monet/papers.html as of Feb. 5, 1999.

Angara website, www.angara.com, copyright 1998, Angara Database Systems, Inc.

Cache website, www.intersys.com, copyright 1996, 1997, 1998, InterSystems Corporation.

"The Dali Main-Memory Storage Manager," Dali website, www.bell-labs.com/project/dali, copyright 1996, as appears on the website as of Feb. 5, 1999.

Jagadish et al., "Dali: A High Performance Main Memory Storage Manager," www.bell-labs.com/project/dali, appears in Proceedings of the 20th VLDB Conference Santiago, Chile, 1994.

Bohannon et al., "Recoverable User-Level Mutual Exclusion," as appears on www.bell-labs.com/project/dali as of Feb. 5, 1999.

Bohannon et al., "Logical and Physical Versioning in Main Memory Databases," www.bell-labs.com/project/dali, appears in Proceedings of the Conference on Very Large Database, 1997.

"Times Ten Performance Software," Times Ten website, www.timesten.com, copyright 1997, 1998.

"Titanum Database Engine Technical Synopsis" copyright 1998, Micro Data Base Systems, Inc..

Herrin et al., "Schema and Tuple Trees: An Intuitive Structure for Representing Relational Data," www.hsdi.com/qddb/article2, appears in Computing Systems, vol. 9, No. 2, copyright 1996 by the USENIX Association.

Herrin et al., "An ASCII Database for Fast Queries of Relatively Stable Data," www.hsdi.com/qddb/article2, appears in Computing Systems, vol. 4, No. 2, copyright 1991 by the Regents of the University of California.

Date, C. J., "An Introduction to Database Systems," 3rd Ed., pp. 33-61, Addison-Wesley Publishing Company.

Date, C. J., Aug., 1995, "An Introduction to Database Systems," 6th Ed., pp. 1-51, 710-760, Addison-Wesley Publishing Company.

Batory, D.S., "On Searching Transposed Files," ACM Transactions on Database Systems, vol. 4, No. 4, Dec. 1979, pp. 531-544.

Batory et al., "A Unifying Model of Physical Databases," ACM Transactions on Database Systems, vol. 7, No. 4, Dec. 1982, pp. 509-539.

Eggers et al., "Efficient Access of Compressed Data," IEEE, 1980, pp. 205-211.

Eggers et al., "A Compression Technique for Large Statistical Databases," IEEE, 1981, pp. 424-434.

Valduriez, P., "Join Indices," ACM Transactions on Database Systems, vol. 12, No. 2, Jun. 1987, pp. 218-246.

Olken et al., "Rearranging Data to Maximize the Efficiency of Compression," ACM, 1986, pp. 78-90.

* cited by examiner

VALUE-INSTANCE-CONNECTIVITY COMPUTER-IMPLEMENTED DATABASE

CROSS REFERENCE TO RELATED APPLICATIONS

This is a continuation of priority application Ser. No. 09/727,423, filed Dec. 1, 2000 now U.S. Pat. No. 6,513,041 which is a continuation-in-part of prior application Ser. No. 09/412,158, filed Oct. 5, 1999 now U.S. Pat. No. 6,606,638, which is a continuation of application Ser. No. 09/112,078, filed Jul. 8, 1998, now U.S. Pat. No. 6,009,432.

FIELD OF THE INVENTION

The present invention relates generally to computer-implemented databases and, in particular, to an efficient, ordered, reduced-space representation of multi-dimensional data.

BACKGROUND OF THE INVENTION

State of the art database management systems (DBMS's), like the underlying data files out of which and on top of which they historically grew, continue to store and manipulate data in a manner that closely mirrors the users' view of the data. Users typically think of data as a sequence of records (or "tuples"), each logically composed of a fixed number of "fields" (or "attributes") that contain specific content about the entity described by that record. This view is naturally represented by a logical table (or "relation") structure (referred to herein as a "record-based table"), such as a rectilinear grid, in which the rows represent records and the columns represent fields.

The long-standing existence of record-based tables and their correspondence to a conventional user view, in the absence of generally recognized drawbacks, has led to their nearly universal acceptance as the major underlying internal representation of databases. Yet record-based tables contain key structural weaknesses including high levels of unorderedness and redundancy that have traditionally been regarded as unavoidable. For example, such tables can be sorted or grouped (i.e., the contiguous positioning of identical values) on at most one criterion (based upon column values or some function of either column values or multiple column values). This limitation renders essential database functions, such as querying and updating, on all criteria other than this privileged one awkward and overly resource-intensive.

The above deficiencies inhere in the fundamental properties of the record-based table structure, in particular, the requirement that the positioning of each field be made co-linear with all other fields in the same record. This arbitrary positioning of fields in record-based table structures excludes all other arrangements. It thus obscures natural and exploitable latent data relationships that are revealed by more ordered, condensed and efficient data arrangements. Moreover, the inability of record-based tables to effectively group or sort data leads to negative characteristics of state of the art DBMS's such as unorderedness, redundancy, cumbersomeness, algorithmic inefficiencies and performance instabilities.

Database research provides palliatives for these problems, but fails to uncover and address their underlying cause (i.e., the reliance on record-based table structures). For example, the inability to represent a natural, multi-dimensional grouping within the confines of a record-based table structure has led to the creation of index-based data structures. These supplementary structures are inherently and often massively redundant, but they establish groupings and orderings that cannot be directly represented using a conventional table. Index-based structures typically grow to be overly lengthy, convoluted and are cumbersome to maintain, optimize and especially update. Examples of common indexes are b-trees, t-trees, star-indexes, and various bit maps.

Other supplementary structures developed in the prior art have different drawbacks. For example, hash tables can provide rapid querying of individual data items, but their lack of sort ordering render them unsuitable for range queries or for any other operation that requires returning data in a specific order.

The ability to maintain an ordered, non-redundant, multi-dimensional data set, using flexible sorting and/or grouping criteria, is extremely useful to database management. Sorted data makes rapid searching and updating possible via, for example, binary search algorithms and insertion sorts. Grouped data enables condensation that reduces space requirements and further increases the speed of, for example, searching and updating.

A system of data storage in which most or all columns of a data table can be stored in grouped and/or sorted order is thus extremely desirable. Previous studies have investigated "fully inverted databases," which index each column through traditional methods, preserving all the inadequacies of records and indexes. Additionally, the bloated storage requirements necessary to accommodate complete indexing tend to make fully inverted databases impractical, especially, but not only, in main memory databases.

SUMMARY OF THE INVENTION

It is therefore an object of the present invention to provide a fully or partially ordered (e.g., grouped and/or sorted) database without the deficiencies characteristic of the prior art, as mentioned above.

Briefly, instead of structuring a database as a table in which each row is a record and each column contains the fields in the record, as in earlier databases, the present invention permutes or otherwise modifies the columns to provide an advantage in, for example, space usage and/or speed of access, such that the rows no longer necessarily correspond to individual records. For example, one such modification is to condense the column by eliminating redundant values (which reduces memory usage); another is sort-ordering the column, ensuring that value groups will always appear in some particular order (which can greatly reduce the time required to search a column for a particular value); still another is to both condense and sort a column. Other permutations and modifications with other advantages are also possible. The table of permuted/modified values is referred to herein as the "value table."

Logically, though not necessarily physically, separate data structures provide the information needed to reconstruct the "records" in the database. In particular, they provide "instance" and "connectivity" information, where instance information identifies the instances of each value in the field that is in a record and connectivity information associates each instance with a specific instance of a value in at least one other field.

In one embodiment of the invention, both the instance and connectivity information is provided in a table, referred to herein as the "instance table." Each column in the instance table corresponds to an attribute of the records in the database and is associated with a column in the value table that contains the values for that attribute (and possibly other attributes). Each cell (row/column location) in the instance table has a position (in one embodiment of the invention, its row number) and an instance value (the contents of the cell). An associated cell in the associated column of the value table is derived from each instance cell's position. Also, an associated instance cell in another column of the instance table that belongs to the same record is derived from each instance cell's instance value. Thus, in this embodiment, an instance cell's position identifies the value which the cell is an instance of and an instance cell's contents provides the connectivity information associating the instance with another instance cell in another field. A record can then be reconstructed starting at a cell in the instance table by deriving, from the cell's position, the associated value cell in the value table and, from the cell's instance value, the position of the associated instance cell, and repeating this process at the associated instance cell and so forth, with a last cell in the chain providing, in one embodiment, the corresponding position of the starting cell.

If a column of the value table is sorted but not condensed, the value table column and the associated column in the instance table has, in one embodiment of the invention, the same number of rows. An instance cell's associated value cell is, in this one embodiment, the value cell in the associated value table column having the same row number as the instance cell. An instance cell's associated instance cell (i.e., cell in another column of the instance table belonging to the same record) is the cell in a specified column having the row number given by the instance cell's instance value. In one embodiment, the specified column is the next column in the instance table, with the last column referring back to the first column. For example, if column 1 of the value table is uncondensed and, after permutation, column 1, row 2 and column 2, row 5 of the value table belong to the same record and an instance of column 2, row 5 is at column 2, row 5 of the instance table, the instance table at column 1, row 2 would contain the number 5 (indicating that row 5 of the next column belongs to the same record).

If a value table column is condensed, there is in general no longer a one-to-one correspondence between that column and an instance table column that is associated with it. In this case, a table, referred to herein as a "displacement table," is provided that, in one embodiment of the invention, has a column for each instance table column associated with a condensed value table column and specifies the range of instance table row numbers associated with each row of the value table column. The value cell associated with an instance cell is then determined by the corresponding displacement table column based on the instance cell's position (row number). In one embodiment, a displacement table column has the same number of rows as an associated value table column with each cell in the displacement table providing the first row number in the range of instance table row numbers associated with the corresponding value cell. Alternatively, each cell in the displacement table could, for example, provide the last row number in the range of instance table row numbers, the total number of rows in the range, or some other value from which it is possible to derive the range of instance table row numbers associated with each value cell (i.e., the instances of each value).

One drawback of the displacement table, as just described, is that searching the displacement table for the value cell corresponding to an instance cell slows record reconstruction. This drawback is addressed in still another embodiment of the invention in which the instance value of an instance cell whose associated instance cell is in a column having a displacement column is set to the position of the value cell associated with the associated instance cell (as opposed to the position of the associated instance cell itself, as in the embodiment described above). The value of the associated instance cell is then directly obtainable without a search of the displacement table. In this embodiment, a table, referred to herein as an "occurrence table," provides information for determining the associated instance cell.

In one embodiment of the occurrence table, each column in the instance table that has cells with instance values as just described has an associated column in the occurrence table that has the same number of rows. A cell in the occurrence table is associated with a cell in the instance table based, in this embodiment, on its position and specifies an offset. The offset is added to the first row number in the range of instance table row numbers associated with the value cell to arrive at the associated instance cell. The first row number is derived from the displacement table based on the instance value of the instance cell. The connectivity information for an instance cell is thus provided in this embodiment by the instance cell's contents, the occurrence table and the displacement table.

The data structures described herein may be, but need not be, entirely in RAM or distributed across a network comprised of a multiplicity of data processors. They may also be implemented in a variety of ways and the invention herein is in no way limited to the examples given of particular implementations. For example, one embodiment may involve only partly storing the data set using the computer-implemented database and methods described herein, with the remainder stored using traditional table-based methods. Information may be stored in various formats and the invention is not limited to any particular format. The contents of particular columns may be represented by functions or by functions in combination with other stored information or by stored information in any form, including bitmaps.

More generally, while the value, instance, displacement and occurrence tables have been described as "tables" having rows, columns and cells, the invention is not limited to such structures. Any computerized data structure for storing the information in these tables may be used. For example, the value table described above is a specific example of a "value store" (i.e., it stores the data values representing the user-view values of information in the database); the instance table is a specific example of an "instance store" and a "connectivity store" (i.e., it both identifies instances of data items in the value store and represents relationships among instances of data items in the value store); and the displacement table is a specific example of a "cardinality store" (i.e., it represents the frequency of occurrence of equal instances of data values). The columns of a table are specific examples of a "list" or, more generally, a "set." A "set," for the purposes of the present invention, comprises one or more "elements," each having a value or values and a "position," where the position specifies the location of the element within the set. In the discussion above, a "cell" in a column of a table is an example of an "element" and its position in the set is its row number.

Furthermore, although the embodiments described herein refer to and manipulate traditional "records", the invention is not limited to records and is generally applicable to represent relationships between data values.

All such variations are alternate embodiments of this invention.

Typical database operations supported by the database system of the present invention include, but are not limited to:
1) reconstructing physical records,
2) finding records matching query criteria,
3) joining tables in standard ways,
4) deleting and/or adding records,
5) modifying existing records, and
6) combinations of these and other standard database operations to perform useful tasks.

The present invention provides a new and efficient way of structuring databases enabling efficient query and update processing, reduced database storage requirements, and simplified database organization and maintenance. Rather than achieve orderedness through increasing redundancy (i.e., superimposing an ordered data representation on top of the original unordered representation of the same data), the present invention eliminates redundancy on a fundamental level. This reduces storage requirements, in turn enabling more data to be concurrently stored in RAM (enhancing application performance and reducing hardware costs) and speeds up transmission of databases across communication networks, making high-speed main-memory databases practical for a wide spectrum of business and scientific applications. Fast query processing is possible without the overhead found in a fully inverted database (such as excessive memory usage). Furthermore, with the data structures of the present invention, data is much more easily manipulated than in traditional databases, often requiring only that certain entries in the instance table be changed, with no copying of data. Database operations in general are thus more efficient using the present invention. In addition, certain operations such as histographic analysis, data compression, and multiple orderings, which are computationally intensive in record-oriented structures, are obtainable immediately from the structures described herein. The invention also provides improved processing in parallel computing environments.

The database system of the present invention can be used as a back-end for an efficient database compatible with almost any database front-end employing industry standard middleware (e.g., Microsoft's Open Database Connectivity (ODBC) or Microsoft's Active-X Data Objects (ADO)) and will provide almost drop-in compatibility with the large corpus of existing database software. Alternatively, a native stand-alone engine can be directly implemented, via, for example, C++ functions, templates and/or class libraries. Implemented either as a back-end to middleware or as a stand-alone engine, this invention provides a database that looks familiar to the user, but which is managed internally in a novel and efficient manner.

For certain data sets, space saving techniques can be applied in accordance with additional aspects of the present invention, as described herein. One such technique, referred to herein as "combined fields", is to combine low cardinality fields into a single column having values representing the various combinations of the original fields. While such combined fields may have value and displacement lists that are larger than the value and displacement lists of the uncombined columns taken together, overall space savings may result from the reduced number of columns needed in the instance and displacement tables. Searching for values matching the first part of such combined fields is generally unchanged, but searching for other parts is more complicated.

One technique in accordance with another aspect of the present invention for simplifying the searching of interior subfields of a combined field is to include all values in the Cartesian product of the original fields in the combined field and to sort the values in nested sort order. Preferably, each subfield value is assigned a number based on its position in the sort order of the subfield. This technique is referred to herein as "metric combined fields." Performing complex queries on such a field is extremely fast because no searching is required—values in a metric combined field representing subfields with specific values can be directly computed due to there being fixed distances between subfields with a given value. The computation can be additionally simplified by padding the cardinality of each subfield to a power of two, resulting in a metric combined field wherein each subfield's value falls within a separate and distinct sequence of bits. In alternative embodiments, containerization techniques are used to reduce the size of the value and displacement lists required for representing the complete set of all possible values in a metric combined field, while preserving its metric property (i.e., regular spacing between like values).

DETAILED DESCRIPTION

Figure 1:
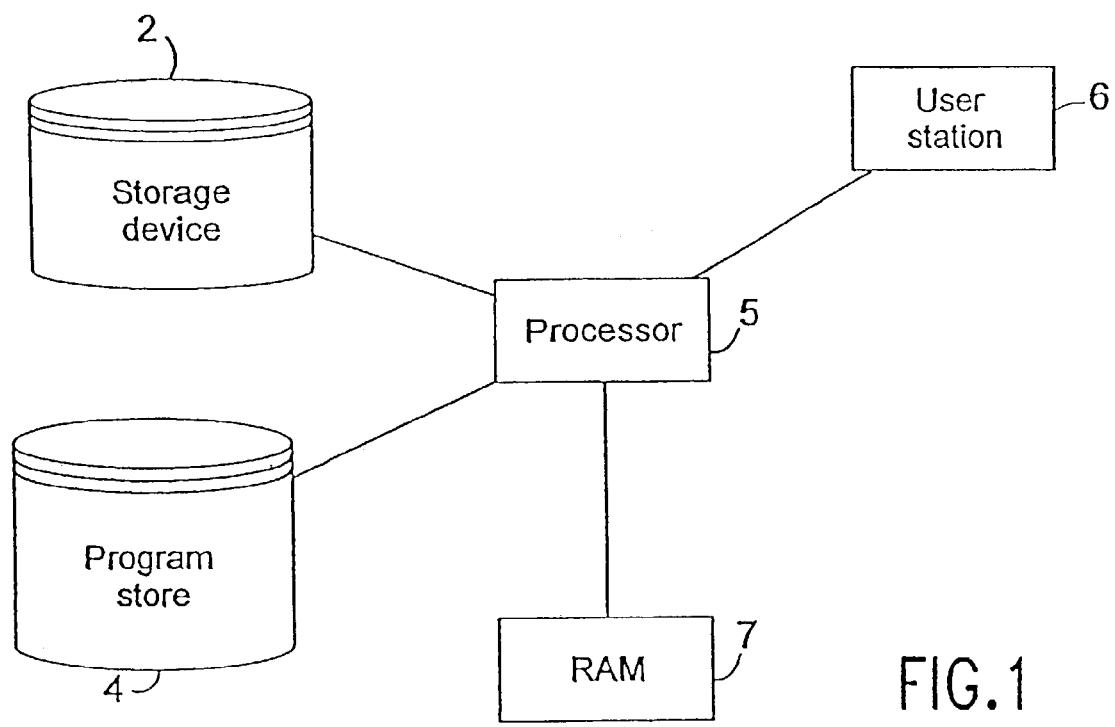
FIG. 1 is a block diagram of one embodiment of the present invention.

FIG. 1 illustrates the basic hardware setup of an embodiment of the present invention. Program store 4 is a storage device, such as a hard disk, containing the software that performs the functions of the database system of the present invention. This software includes, for example, the routines for generating the data structures of the underlying database and for reformatting legacy databases, such as those in record-oriented files, into those data structures. In addition, the software includes the routines for manipulating and accessing the database, such as query, delete, add, modify and join routines. Data files are stored in storage device 2 and contain the data associated with one or more databases. Data files may be formatted as binary images of the data structures herein or as record-oriented files. Program store 4 and storage device 2 may be different parts of a single storage device. The software in program store 4 is executed by processor 5, having random access memory (RAM) 7. The selection of the tasks to be performed by the database system is determined by a user at user station 6.

In the following discussion, the term "pointer" is used in a general sense to include both the C/C++ language meaning (a variable containing a memory address) and, more generally, any data type which is used to uniquely describe a location in storage, whether that storage be RAM, disk, etc. A pointer implemented as an integer offset from the beginning of a given data structure will perform the same function as a C/C++ pointer while advantageously requiring less storage. The terms memory and storage, used herein, mean any electronic, optical or other means of storing data.

The term multi-dimensional is used herein in a mathematical or quasi-mathematical sense to refer to a view of the data in which an n-column record-based table is considered to occupy an n-dimensional vector space. It is not used in its narrower sense, sometimes used in data warehousing and On-Line Analytical Processing (OLAP), where multi-dimensionality refers to multiple layers of data analysis.

Basic Database Structure

Record-based tables, in which each row represents a record and each column is a field in the record, are commonly used in state of the art databases. A database in accordance with the present invention differs from this known structure. In one embodiment, the database is divided into two basic data structures; an uncondensed value table and an instance table. The value table contains the same data instances as prior art databases, but each column may be permuted or otherwise changed and thus a row no longer necessarily corresponds to a particular record. In accordance with this embodiment, the instance table provides the means for reconstructing the records from the value table. Specifically, in one embodiment, the instance table has the same number of rows and columns as the uncondensed value table and each cell (i.e., row/column location) in the instance table contains the row number for the next field in the same record ("next" being defined below). Thus, the value of the next field of the record containing Value_Table(r, c), where r and c are the row and column of a particular location in the value table, is Value_Table(Instance_Table(r, c), next(c)), where Instance_Table(r, c) is the row number of the next field. The function next(c) obtains the next column from the current one. In one embodiment of the present invention using a ring topology, next(c)=((c+1) mod n), where n is the number of columns and the columns are numbered from 0 to n−1 (zero-based indexing). In an alternate embodiment (columns numbered 1 to n), next(c)=c mod n+1. A wide variety of topologies are possible, each having a corresponding next(c) function.

For example, below is a database in the standard one-record-per-row format, with 1-based row numbering:

| | PRIOR ART DATABASE: | | | | |
|---|---|---|---|---|---|
| Record # | ENGLISH (col. 0) | SPANISH (col. 1) | GERMAN (col. 3) | TYPE (col. 4) | PARITY (col. 5) |
| 1 | One | Uno | Eins | Unit | Odd |
| 2 | Two | Dos | Zwei | Prime | Even |
| 3 | Three | Tres | Drei | Prime | Odd |
| 4 | Four | Cuatro | Vier | Power2 | Even |
| 5 | Five | Cinco | Fuenf | Prime | Odd |
| 6 | Six | Ses | Sechs | Composi | Even |

The corresponding value and instance tables arranged in accordance with a specific embodiment of the present invention are:

| | VALUE TABLE: | | | | |
|---|---|---|---|---|---|
| Row # | ENGLISH (col. 0) | SPANISH (col. 1) | GERMAN (col. 2) | TYPE (col. 3) | PARITY (col. 4) |
| 1 | Five$^5$ | Cinco$^5$ | Drei$^3$ | Compos$^6$ | Even$^2$ |
| 2 | Four$^4$ | Cuatro$^4$ | Eins$^1$ | Power2$^4$ | Even$^4$ |
| 3 | One$^1$ | Dos$^2$ | Fuenf$^5$ | Prime$^2$ | Even$^6$ |
| 4 | Six$^6$ | Ses$^6$ | Sechs$^6$ | Prime$^3$ | Odd$^1$ |
| 5 | Three$^3$ | Tres$^3$ | Vier$^4$ | Prime$^5$ | Odd$^3$ |
| 6 | Two$^2$ | Uno$^1$ | Zwei$^2$ | Unit$^1$ | Odd$^5$ |

| | INSTANCE TABLE: | | | | |
|---|---|---|---|---|---|
| Row # | ENGLISH (col. 0) | SPANISH (col. 1) | GERMAN (col. 2) | TYPE (col. 3) | PARITY (col. 4) |
| 1 | 1 | 3 | 4 | 3 | 6 |
| 2 | 2 | 5 | 6 | 2 | 2 |
| 3 | 6 | 6 | 5 | 1 | 4 |
| 4 | 4 | 4 | 1 | 5 | 3 |
| 5 | 5 | 1 | 2 | 6 | 5 |
| 6 | 3 | 2 | 3 | 4 | 1 |

The value table shown above is created by sorting each column, in this case, in alphabetical order. For explanatory purposes only, a superscript has been placed next to each value to indicate its record number in the original database.

After sorting the columns, a row of the value table will not generally correspond to a single record in the original database. The instance table however provides the information necessary to reconstruct those records to the traditional external record view. Specifically, each cell (i.e., row/column location) in the instance table is associated, in the above embodiment, with a single record. The cell with the same row/column location in the value table contains the value of the record for the field associated with the column. The instance table cell itself contains the row number of the next field of the record.

For example, suppose the record containing row 1 of the "English" column (column 0) of the instance table is to be reconstructed. The associated cell in the value table (i.e., row 1, column 0) contains the value "Five". Taking the other fields (or columns) in order, first the row of the "Spanish" column (column 1) belonging to the same record as row 1 of the "English" column (column 0) is determined. The information is provided by the instance table at row 1/column 0, which in this case contains the number 1, meaning row "1" of the Spanish column is in the same record as row "1" of the English column. Next, to determine the row of the "German" column (column 2) from the same record as row "1" of the Spanish column (column 1), row 1/column 1 in the instance table is read, which contains the number 3, meaning row "3" of the "German" column is from the same record. Tracing this record through, row 3 of the "German" column (column 2) in the instance table provides the row of the "Type" column (column 3) in the same record and it contains the number 5—meaning row "5" of the "Type" column is from the same record as row 3 of the "German" column. Row 5 of the "Type" column (column 3) indicates that the corresponding row in the "Parity" column (column 4) is row 6. Finally, row 6 of the "Parity" column (column 4) in the instance table, which is the last column in the table, indicates that the corresponding row from the "English" column, the first column in the table (column 0), is row 1, which is where the process started. This is due to the ring topology used in this example.

Figure 2:
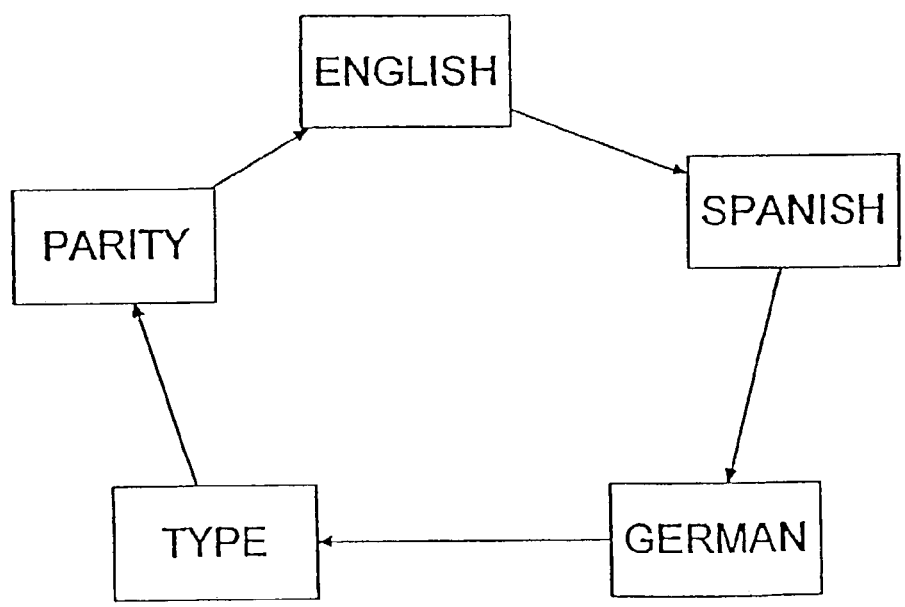
FIG. 2 illustrates a simple ring topology.

Thus, in accordance with the embodiment illustrated above, each row/column location in the instance table contains the row number in the next column which belongs to the same record, with the last column containing the row number of the same record in the first column. The links between the row/column locations belonging to the same record would, in this embodiment, form a ring through the instance table, as illustrated in FIG. 2. As this ring is traversed, directly corresponding row/column locations in the value table allow recovery of each field's value. Topologies other than a ring may be used in alternate embodiments of the present invention.

Generation of Value and Instance Tables from Record-Oriented Data

Value and instance tables can be generated in accordance with the present invention using the data in a prior art record-oriented database format.

First, the value table is created by permuting or otherwise changing the data in each column of the original database. Examples of changes in a value table column are sort ordering the data and grouping like values together. Different columns may be permuted or changed differently. A sort order should be chosen based on its usefulness for display or retrieval purposes in actual applications. The requirement for a potential sort order is that it have a computable predicate which orders the values. Some columns may remain unsorted. In the example above, all columns were sorted in alphabetic order.

In one embodiment, during this first step, a temporary intermediate table is created that facilitates generation of the instance table in the second step below. The intermediate table, in this embodiment, has rows that correspond to records, as in the original prior art database, and columns that indicate the permuted position of the corresponding field in the value table. The intermediate table for the above example (in which the permutations are sort orderings) is as follows:

| | INTERMEDIATE TABLE: | | | | |
|---|---|---|---|---|---|
| Record # | ENGLISH (col. 0) | SPANISH (col. 1) | GERMAN (col. 3) | TYPE (col. 4) | PARITY (col. 5) |
| 1 | 3 | 6 | 2 | 6 | 4 |
| 2 | 6 | 3 | 6 | 3 | 1 |
| 3 | 5 | 5 | 1 | 4 | 5 |
| 4 | 2 | 2 | 5 | 2 | 2 |
| 5 | 1 | 1 | 3 | 5 | 6 |
| 6 | 4 | 4 | 4 | 1 | 3 |

Thus, for example, the intermediate table indicates that the "English" field for the original record 5 is in row 1 of the value table, the "Spanish" field for record 5 is in row 1 of the value table, the "German" field for record 5 is in row 3 of the value table, the "Type" field for record 5 is in row 5 of the value table and the "Parity" field for record 5 is in row 6 of the value table.

In accordance with this embodiment, the instance table is then determined as follows:

Instance_Table(Intermediate_Table(r, c), c)=
  Intermediate_Table(r, next(c)), for each row r and column c in the intermediate table and where next(c) is defined above. In other words, each cell in the intermediate table specifies a row of the corresponding column in the instance table; that row in the instance table receives the value in the next column of the intermediate table.

For example, referring to record number 5 in the example above, the "English" field (column 0) in the intermediate table contains the number 1 and the next field, "Spanish," (column 1) also contains the number 1. Based on this information, the value 1 (i.e., the row number of the "Spanish" field of record 5 in the sorted value table) is placed in row 1 of the instance table (i.e., the location of the "English" field of record 5 in the sorted value table). Row 1 of the "Spanish" field in the instance table is set to the value in the "German" field (column 2) of record number 5 in the intermediate table (i.e., the value 3), which corresponds to the row number of the "German" field in the sorted value table. This process is repeated for each field, again with the last field wrapping around to the first field.

A person skilled in the art will recognize that there are equivalent algorithms, some possibly avoiding the use of an intermediate table, for generating the instance table, and the present invention is not limited to the algorithm shown here.

Condensed Value Table

In certain situations, the data in the value table may be more efficiently represented in terms of space (e.g., memory or disk usage) if certain columns are "condensed" by eliminating redundant values. For example, in the value table above, the "Parity" field has only two different values ("Even" and "Odd") and the "Type" field has only four different values ("Compos", "Power2", "Prime" and "Unit"). (The number of unique values for a given field is called its "cardinality.") Accordingly, in a preferred embodiment of the present invention, redundancy can be eliminated by constructing a condensed value table, which for the example above is as follows:

CONDENSED VALUE TABLE:

| Row # | ENGLISH (col. 0) | SPANISH (col. 1) | GERMAN (col. 2) | TYPE (col. 3) | PARITY (col. 4) |
|---|---|---|---|---|---|
| 1 | Five | Cinco | Drei | Composi | Even |
| 2 | Four | Cuatro | Eins | Power2 | Odd |
| 3 | One | Dos | Fuenf | Prime | |
| 4 | Six | Ses | Sechs | Unit | |
| 5 | Three | Tres | Vier | | |
| 6 | Two | Uno | Zwei | | |

To realize this space savings, the storage for the value table must be allocated in the appropriate manner; for example, allocating each column as a separate vector or list, as opposed to allocating the table as a two-dimensional array. In addition, the changes applied to the columns should group equal values together.

In order to retain the original information of the uncondensed value table, an additional structure, referred to herein as a "displacement" table, is provided in a preferred embodiment. In one embodiment of the present invention, the displacement table provides either the first or the last row number at which each unique value in a column occurs in the original uncondensed value table (referred to herein as "first row number" and "last row number" format, respectively). For example, the displacement table for the condensed value table above is as follows (in "first row number" format):

DISPLACEMENT TABLE:

| Row # | ENGLISH | SPANISH | GERMAN | TYPE | PARITY |
|---|---|---|---|---|---|
| 1 | (no condensation, so no displacement | | | 1 | 1 |
| 2 | table columns for ENGLISH, | | | 2 | 4 |
| 3 | SPANISH, or GERMAN) | | | 3 | |
| 4 | | | | 6 | |
| 5 | | | | | |
| 6 | | | | | |

The "Parity" column of the displacement table thus indicates that the value in the first row of the condensed value table (i.e., "Even") was in row 1 of the uncondensed value table (that is, the value "Even" first appeared in row 1) and the value in the second row of the condensed value table (i.e., "Odd") first appeared in row 4 of the uncondensed value table. Alternatively, the record counts for each value may be stored in the displacement table with the first row for each value being arithmetically derived, or some arithmetic combination of the count and displacement may be used.

A column having field width W bytes and cardinality C (i.e., C unique values) is represented by a "condensed" column of unique values, together with a displacement table of integer values (row numbers) of size P bytes in $W*C+P*C$ bytes of RAM, whereas storage of the uncondensed column requires $W*N$ bytes (where N is the number of records). Thus, where $W*C+P*C<W*N$, or $C<N/(1+P/W)$, this type of compression is beneficial.

The condensed columns in this embodiment generally destroys the one-to-one correspondence between the cells (i.e., row/column locations) of the instance table and the cells of the value table. Thus, during record reconstruction, the value for a cell cannot be retrieved when traversing the instance table simply by looking at the value in the value table at the same row/column location. For example, there is no longer a cell in the value table at the same row/column location as column 3 ("Type"), row 5 of the instance table in the example above.

Instead, in accordance with a preferred embodiment, the value of the field associated with Instance_Table(r, c), where c is a condensed column, is given by Value_Table(disp_row_num, c), where disp_row_num is the row number of the cell in the displacement table for the $c^{th}$ column for which Displacement_Table(disp_row_num, c)<=r<
Displacement_Table(disp_row_num+1, c), where the upper-bound test is not performed if disp_row_num+1 does not exist (i.e., if disp_row_num is the last Displacement_Table row for column c)

(for "first row number" Displacement_Table format), or

Displacement_Table(disp_row_num-1, c)<r<=
Displacement_Table(disp_row_num, c)

where the lower-bound test is not performed if disp_row_num-1 does not exist.

(for "last row number" Displacement_Table format).

Again referring to the example above, to find the value in the value table associated with row 5 of column 3, the row in column 3 of the displacement table that has the largest value not greater than 5 is located. That is row 3 in the displacement table above (row 4 having the value 6, which is greater than 5). Thus, row 3 of column 3 has the value in the value table associated with row 5 of column 3 in the instance table.

Space-Saving Techniques Applicable to Certain Types of Data

In accordance with a specific embodiment, fields with data having certain properties can be incorporated into the database system of the present invention without using some of the structures described above (i.e., value, displacement and/or instance tables). This is the case where the information that would be contained in these structures is already present in the system in an implicit form; i.e., the information is deducible from characteristics of the data or other information that is present. For example, if an uncondensed value table column contains the numbers from 1 to N, there is no need to store this information in the value table at all, because the information is implicitly in the instance table (row 1 of the instance table corresponds to value 1, and so forth). Each column (field) descriptor's information states which structures are implicit for that field and where and how to obtain the implicit data. In the example just given, the column descriptor for the instance table column would state that the value corresponding to each row is the row number. This data can then be used in the algorithms described herein, or other implementations of the algorithms.

When the special circumstances exist where "implicit" structures can be used, space savings can be achieved. Examples of such circumstances include, but are not limited to, the following:

1) A field having unique values requires no displacement list since each value in the field's value list appears only once in the instance list.

2) A field having contiguous, unique, integer values that have the same range as the rows of the value table requires no value list and no displacement list. These values will sort so that their value would be equal to their position in a value list, which would also be their position in the instance list. Thus, their value is equal to their position (row) in the instance list, so no separate value list is needed. Since these values are unique, no displacement list is needed either.

3) A field having values that are the output values of a function of contiguous integer input values requires no value list if the function produces ordered outputs given ordered inputs (as would be the case, for example, for a monotonic function). Values are computed by applying the function to the position (row) of a cell in the instance list. Since row positions are ordered contiguous integers, the output of the function will also be ordered. Thus no value list is needed since the values can be computed from the instance list. Since the functions' output values are always unique for unique inputs, no displacement list is necessary either.

4) A field having values that are approximated by the output values of a function of contiguous integer input values can be implemented with a reduced-spaced value list if the function produces ordered outputs given ordered inputs (as would be the case, for example, for a monotonic function). The value list in this case need only contain the offset of the output of the function, instead of the full value, and is arranged such that the offsets plus the outputs of the function produce ordered values.

5) A sequence of contiguous instance list elements all associated with the same data value and all having associated (e.g., next) instance list elements associated with the same data value can be represented by a single entry identifying, for example, the associated data value, the position of the associated instance element's associated data value and the number of instance elements in the sequence, with the displacement list adjusted appropriately.

Additionally, known compression and space-reduction techniques may be applied to the value and instance tables (and other structures). For example, values may be represented using dictionary-type methods, including methods that match bit patterns that are less than the entire length of a value. An effect of this compression and the compression techniques above is to produce more random bit patterns, which in turn improves hashing performance. In addition, the value table, instance table and other structures may be compressed, for example, using methods that take advantage of repeated bit patterns, such as run-length encoding, and word compaction (i.e., packing values into physical data storage units when there is a mismatch between the value size and the physical storage unit). The instance table can be further-compressed, for example, by reordering the relative positions of the columns and the instances within columns, where allowable, to optimize performance of the above compression techniques.

Alternative Instance Table with Condensed Value Table

The displacement table discussed above slows record reconstruction because values from condensed columns can be obtained only after searching the displacement table. An alternative configuration used in another embodiment of the present invention is to modify the instance table so that entries in a column pointing into a condensed column point instead directly into the value table. An additional table is then provided, referred to herein as the "occurrence" table, that contains information by which the row number of the next column in the instance table can be calculated. The "occurrence" table contains the occurrence number of the particular value pointed to by the corresponding cell in the instance table. Specifically, in an embodiment in which the displacement table is in "first row number" format, row numbers in the instance table are 1-based, and the occurrence table is also 1-based, the instance table row number of the next field equals Occurrence_Table(r, c)+
   Displacement_Table(Instance_Table(r, c), next(c))−1

Variants on this embodiment include, but are not limited to, zero-based row numbering in the various structures, and/or zero-based occurrence numbering in the occurrence table, and/or "last row number" format for the displacement table entries. Such variants affect the formula above for determining the instance table row number of the next field. For example, for zero-based row numbering in the occurrence and instance tables, zero-based occurrence numbering and "last row number" format in the displacement table, the instance table row number of the next field is:

for Instance_Table(r, c)=0,
   Occurrence_Table(r, c)
and for Instance_Table(r, c)>0:
   Occurrence_Table(r, c)+
      Displacement_Table(Instance_Table(r, c)−1, next(c))+1

(because Displacement_Table(Instance_Table(r, c)−1, next(c)) is the last row number for the previous value). In all such embodiments, the instance and occurrence tables could be merged into one table having two-part elements.

In the above example, the TYPE column points into the PARITY column of the instance table and the PARITY column in the value table is condensed. In accordance with this alternative embodiment, the instance and occurrence tables are as follows:

Alternative Instance Table:

| Row # | ENGLISH | SPANISH | GERMAN | TYPE | PARITY |
|---|---|---|---|---|---|
| 1 | 1 | 3 | 4 | 1 | 6 |
| 2 | 2 | 5 | 6 | 1 | 2 |
| 3 | 6 | 6 | 5 | 1 | 4 |
| 4 | 4 | 4 | 1 | 2 | 3 |
| 5 | 5 | 1 | 2 | 2 | 5 |
| 6 | 3 | 2 | 3 | 2 | 1 |

Occurrence Table:

| Row # | ENGLISH | SPANISH | GERMAN | TYPE | PARITY |
|---|---|---|---|---|---|
| 1 | | | | 3 | |
| 2 | | | | 2 | |
| 3 | | | | 1 | |
| 4 | | | | 2 | |
| 5 | | | | 3 | |
| 6 | | | | 1 | |

Thus, the TYPE column of the instance table now points directly at the associated row in the value table of the PARITY column. For example, the TYPE column at row 5 of the instance table above contains 2, meaning that row 2 of the PARITY column in the value table contains the PARITY value for the same record associated with row 5 of the TYPE column. In this case, row 2 of the PARITY column contains the value "Odd." The associated row of the PARITY column in the instance table is the value in row 5 of the TYPE column of the occurrence table plus the value in row 2 of the PARITY column of the displacement table minus 1; which is 3+4−1 or 6.

The value, instance, displacement and occurrence tables have been described above as separately stored tables. However, in alternative embodiments, this need not be the case. For example, the value and displacement tables elements can be stored adjacently, and the instance and occurrence table elements can likewise be stored adjacently, in those columns with condensed value tables. This may reduce storage cache misses while retrieving data rows from the database, and also reduce operand fetch time by allowing the adjacent elements to share the same base storage address.

Skewering, or Nested Ordering

For a given value and displacement table, there are many possible instance and occurrence tables generating the same record set. This is because, for a value having multiple occurrences, the occurrences of the value may be assigned to the physical records having that value in arbitrary order. In general, the product of the factorials of the various values' multiplicities gives the number of instance/occurrence tables which generate the same physical record set. (There are thus 414,720 (3!*1!*3!*1!*2!*1!*2!*1!*5!*2!*1!*3!*2!*1!) different instance/occurrence tables which generate the records of the SPJ$_{mod}$ database given below.)

In a ring topology, there exists a unique instance/occurrence representation that simultaneously stores N multikey "lexical" orderings (where N is the number of attributes in the database) with no more overhead than that required to store the individual sorted columns (a characteristic referred to herein as "skewering"). Each column C defines one such ordering such that that column is taken as the most significant attribute in the key, with next(C) as the next most significant attribute, etc., to column prev(C) as the least significant attribute in the key (where prev(c) is the previous column in the ring structure). The ordering is referred to as "lexical" herein because it is the same type of ordering used to sort words alphabetically, i.e., the words are sorted on the first letter, then words with the same first letter are sorted on the second letter and so forth.

Skewering is illustrated below starting with a prior art table labelled SPJ$_{mod}$ (excerpted from C. J. Date, *Introduction to Database Systems*, Sixth Edition, inside front cover (1995)):

| | | SPJ$_{mod}$: | | |
|---|---|---|---|---|
| Rec # | S# | P# | J# | QTY |
| 0000 | S2 | P3 | J2 | 200 |
| 0001 | S2 | P3 | J5 | 600 |
| 0002 | S2 | P5 | J2 | 100 |
| 0003 | S3 | P4 | J2 | 500 |
| 0004 | S5 | P2 | J2 | 200 |
| 0005 | S5 | P5 | J5 | 500 |
| 0006 | S5 | P6 | J2 | 200 |

The condensed value and displacement tables, in accordance with the embodiments described above, for SPJ$_{mod}$ are:

| | | Value Table: | | |
|---|---|---|---|---|
| Row # | S# | P# | J# | QTY |
| 0000 | S2 | P2 | J2 | 100 |
| 0001 | S3 | P3 | J5 | 200 |
| 0002 | S5 | P4 | | 500 |
| 0003 | | P5 | | 600 |
| 0004 | | P6 | | |
| 0005 | | | | |
| 0006 | | | | |

| | | Displacement Table: | | |
|---|---|---|---|---|
| Row # | S# | P# | J# | QTY |
| 0000 | 0 | 0 | 0 | 0 |
| 0001 | 3 | 1 | 5 | 1 |
| 0002 | 4 | 3 | | 4 |
| 0003 | | 4 | | 6 |
| 0004 | | 6 | | |
| 0005 | | | | |
| 0006 | | | | |

Three alternative instance/occurrence tables are shown below, each reproducing the physical record set of SPJ$_{mod}$. The instance and occurrence tables are shown as a single combined table with entries of the form instance/occurrence.

Each value in the value table corresponds to a contiguous block of cells in the instance/occurrence table, which is defined by the displacement table entries for that value. These blocks have been indicated by alternating bold highlights in the instance/occurrence tables printed below.

| | | Instance/Occurrence (version 1): | | |
|---|---|---|---|---|
| Row # | S# | P# | J# | QTY |
| 0000 | 3/0 | 0/2 | 0/0 | 0/0 |
| 0001 | 1/0 | 0/1 | 1/0 | 0/1 |
| 0002 | 1/1 | 1/1 | 1/1 | 2/0 |
| 0003 | 2/0 | 0/4 | 1/2 | 2/1 |
| 0004 | 0/0 | 0/0 | 2/0 | 1/0 |
| 0005 | 4/0 | 1/0 | 2/1 | 2/2 |
| 0006 | 3/1 | 0/3 | 3/0 | 0/2 |

| | | Instance/Occurrence (version 2): | | |
|---|---|---|---|---|
| Row # | S# | P# | J# | QTY |
| 0000 | 1/0 | 0/3 | 1/0 | 0/2 |
| 0001 | 1/1 | 0/0 | 0/0 | 0/0 |
| 0002 | 3/0 | 1/0 | 2/0 | 2/0 |
| 0003 | 2/0 | 0/2 | 1/1 | 2/2 |
| 0004 | 0/0 | 0/1 | 1/2 | 1/0 |
| 0005 | 3/1 | 1/1 | 3/0 | 2/1 |
| 0006 | 4/0 | 0/4 | 2/1 | 0/1 |

| Instance/Occurrence (version 3): | | | | |
|---|---|---|---|---|
| Row # | S# | P# | J# | QTY |
| 0000 | 1/0 | 0/2 | 0/0 | 0/2 |
| 0001 | 1/1 | 0/1 | 1/0 | 0/0 |
| 0002 | 3/0 | 1/1 | 1/1 | 2/0 |
| 0003 | 2/0 | 0/4 | 1/2 | 2/2 |
| 0004 | 0/0 | 0/0 | 2/0 | 1/0 |
| 0005 | 3/1 | 1/0 | 2/1 | 2/1 |
| 0006 | 4/0 | 0/3 | 3/0 | 0/1 |

In version 3 the entries within each value block are in sorted order based on their instance and occurrence. The N (here, 4) multikey orderings naturally defined by $SPJ_{mod}$ are:
(S#,P#,J#,QTY),
(P#,J#,QTY,S#),
(J#,QTY,S#,P#), and
(QTY,S#,P#,J#),
where the fields are ordered from left to right in descending order of significance.

In a prior art record-type table structured database, in order to reconstruct the records in any of these orders, there is a space-time tradeoff. If the records are to be reproduced quickly, and in linear time, four separate indices are required, specifying the four different sort orders. To avoid this redundant use of space, a time-consuming search is required each time the lexical order used is changed.

The skewered instance/occurrence table eliminates this tradeoff. Any of the natural lexical orders can be produced in linear time. For example, to reproduce the order (P#,J#,QTY,S#), the cells in column P# are processed top to bottom, reconstructing the record corresponding to each such cell. These records will be in the desired lexical order. To illustrate, the records corresponding to cells 0000 through 0006 of column P# are as follows:
cell 0000 of column P#->S5 P2 J2 200
cell 0001 of column P#->S2 P3 J2 200
cell 0002 of column P#->S2 P3 J5 600
cell 0003 of column P#->S3 P4 J2 500
cell 0004 of column P#->S2 P5 J2 100
cell 0005 of column P#->S5 P5 J5 500
cell 0006 of column P#->S5 P6 J2 200

Similarly, records may be reproduced in any of the N lexical orders by proceeding linearly down through the cells of the most significant column of that chosen lexical order.

If the columns of the value table are sorted and condensed, as described earlier, a skewered instance/occurrence table is formed by creating a multi-key lexical ordering starting at any column. The other N−1 multi-key lexical orderings automatically result.

Preserving Standard Database Formats within the Database System of the Present Invention The present invention allows the option of maintaining portions of a database in conventional form without incurring significant additional overhead. This may be desired, for example, for a column that cannot be compressed and will not be queried. An illustrative embodiment is shown below.

For purposes of this illustration, a French column, which will not be translated into the data structures of the present invention, is added to the original prior art database as shown below:

| PRIOR ART DATABASE: | | | | | | |
|---|---|---|---|---|---|---|
| Record # | ENGLISH | SPANISH | GERMAN | TYPE | PARITY | FRENCH |
| 1 | One | Uno | Eins | Unit | Odd | Un |
| 2 | Two | Dos | Zwei | Prime | Even | Deux |
| 3 | Three | Tres | Drei | Prime | Odd | Trois |
| 4 | Four | Cuatro | Vier | Power2 | Even | Quatre |
| 5 | Five | Cinco | Fuenf | Prime | Odd | Cinq |
| 6 | Six | Ses | Sechs | Composi | Even | Six |

Instead of creating separate columns in the displacement, instance and occurrence tables for the FRENCH column, the FRENCH column is "attached" to one of the other columns, whose displacement, instance, and occurrence tables were shown earlier.

First, a column is selected to which to "attach" the FRENCH column; any column in the database may be selected for this purpose. In this example, the PARITY column has been selected. When reconstructing the records in the database, the appropriate value for the "FRENCH" attribute is retrieved while determining the "PARITY" value for that record.

In order to attach the FRENCH column to the PARITY column, prior to "value-table condensation", the FRENCH cells in the value table are sorted in the same order as the PARITY cells. As this operation is performed during the construction of the data structures in accordance with the present invention, a negligible amount of additional effort is required. The sorted FRENCH column is then appended to the condensed value table, as shown below:

Value Table:

| Row # | ENGLISH | SPANISH | GERMAN | TYPE | PARITY | FRENCH |
|---|---|---|---|---|---|---|
| 1 | Five | Cinco | Drei | Composi | Even | Deux |
| 2 | Four | Cuatro | Eins | Power2 | Odd | Quatre |
| 3 | One | Dos | Fuenf | Prime | | Six |
| 4 | Six | Ses | Sechs | Unit | | Un |
| 5 | Three | Tres | Vier | | | Trois |
| 6 | Two | Uno | Zwei | | | Cinq |

The displacement, instance, and occurrence tables are, in one embodiment, as follows:

Displacement Table:

| Row # | ENGLISH | SPANISH | GERMAN | TYPE | PARITY |
|---|---|---|---|---|---|
| 1 | | | | 1 | 1 |
| 2 | | | | 2 | 4 |
| 3 | | | | 3 | |
| 4 | | | | 6 | |
| 5 | | | | | |
| 6 | | | | | |

Instance Table:

| Row # | ENGLISH | SPANISH | GERMAN | TYPE | PARITY |
|---|---|---|---|---|---|
| 1 | 1 | 3 | 3 | 1 | 6 |
| 2 | 2 | 5 | 4 | 1 | 2 |
| 3 | 6 | 6 | 3 | 2 | 4 |
| 4 | 4 | 4 | 1 | 2 | 3 |
| 5 | 5 | 1 | 2 | 1 | 5 |
| 6 | 3 | 2 | 3 | 2 | 1 |

Occurrence Table:

| Row # | ENGLISH | SPANISH | GERMAN | TYPE | PARITY |
|---|---|---|---|---|---|
| 1 | | | 1 | 3 | |
| 2 | | | 1 | 2 | |
| 3 | | | 2 | 2 | |
| 4 | | | 1 | 3 | |
| 5 | | | 1 | 1 | |
| 6 | | | 3 | 1 | |

Now, for example, the record corresponding to the query ENGLISH="Three" is reconstructed. This record, in the prior art database, is given by:

| Record # | ENGLISH | SPANISH | GERMAN | TYPE | PARITY | FRENCH |
|---|---|---|---|---|---|---|
| 3 | Three | Tres | Drei | Prime | Odd | Trois |

To reconstruct this record from the data structures above, first the value "Three" in the ENGLISH column of the value table is found, and then the remaining attributes in the record are reconstructed by tracing through the instance table. At the instance cell for the Parity column, the "FRENCH" value corresponding to the record is the value in the corresponding cell of the FRENCH column in the value table. In the example, the entry in row 5 of the Parity column of the instance table is associated with the record being reconstructed. Thus, the "French" value is found in row 5 of the "French" column of the value table, whose value is "Trois".

Alternatively, an unsorted column may be included in the data structures of the present invention by using the identity permutation as the permutation for that column (i.e., the value table for that column will not be reordered in any way).

Column Merge Compression

In accordance with a further embodiment of the invention, separate value table columns can be merged into a single column, referred to herein as a "union column," with separate displacement list columns for each of the original columns. This has the potential advantages of having a smaller value table, pre-joined data expediting join operations and improved update speed. A value not present in a particular original column is indicated in the displacement table column by a null range for that value. For example (assuming a "first row number" format displacement table), if the original column did not have the value at row 'r' of the merged column, the displacement table for that column would have the same value at row 'r' and row 'r+1' (that is Displacement_Table(r+1,c)−Displacement_Table(r,c)=0). If 'r' is the last row in the column, its value is set to a number greater than the number of rows in the instance table for that column.

Alternatively, if the displacement table is in "last row number" format, the null range indicating no instances of value number r is given by Displacement_Table(r,c)=Displacement_Table(r−1,c) (if r−1 is a valid row number), or, for r equals the lowest valid row number, Displacement_Table(r,c)=0 (for 1-based row numbering) or −1 (for zero-based row numbering).

For example, the following prior art database is considered:

Prior Art Database:

| Record # | FIRST | MIDDLE | LAST |
|---|---|---|---|
| 1 | John | Frederick | Jones |
| 2 | Steven | Allen | Smith |
| 3 | Frederick | Henry | Blubwat |
| 4 | Albert | Allen | Brown |
| 5 | Alexander | Graham | Bell |
| 6 | Alexander | The | Great |
| 7 | Harvey | Nelson | Tiffany |
| 8 | Nelson | Harvey | Tiffany |
| 9 | Jackson | Albert | Poole |
| 10 | Henry | Edward | Billings |
| 11 | Joseph | | Blubwat |

The corresponding value and displacement tables for the FIRST and MIDDLE columns are, in one embodiment:

Value Table:

| Row # | FIRST | MIDDLE |
|---|---|---|
| 1 | Albert | |
| 2 | Alexander | Albert |
| 3 | Frederick | Allen |
| 4 | Harvey | Edward |
| 5 | Henry | Frederick |
| 6 | Jackson | Graham |
| 7 | John | Harvey |
| 8 | Joseph | Henry |
| 9 | Nelson | Nelson |
| 10 | Steven | The |

Displacement Table:

| FIRST | MIDDLE |
|---|---|
| 1 | 1 |
| 2 | 2 |
| 4 | 3 |
| 5 | 5 |
| 6 | 6 |
| 7 | 7 |
| 8 | 8 |
| 9 | 9 |
| 10 | 10 |
| 11 | 11 |

Applying the column-merge space-saving technique results in a single value table column for FIRST and MIDDLE, with the displacement table columns for FIRST and MIDDLE adjusted to point into that column, as shown below:

Value Table with Union Column:

| FIRST union MIDDLE |
|---|
| Albert |
| Alexander |
| Allen |
| Edward |
| Frederic |
| Graham |
| Harvey |
| Henry |
| Jackson |
| John |
| Joseph |
| Nelson |
| Steven |
| The |

Displacement Table:

| FIRST | MIDDLE |
|---|---|
| 1 | 1 |
| 1 | 2 |
| 2 | 3 |
| 4 | 3 |
| 4 | 5 |
| 4 | 6 |
| 5 | 7 |
| 5 | 8 |
| 6 | 9 |
| 7 | 10 |
| 8 | 10 |
| 9 | 10 |
| 10 | 10 |
| 11 | 11 |
| 12 | 11 |

In this embodiment, the absence of a blank FIRST name is indicated by the first two rows of the displacement table having the same value (i.e., the difference is zero). The absence of FIRST name values "Allen" and "Edward" and MIDDLE name values "Alexander", "Jackson, "John", "Joseph", and "Steven" are similarly indicated. In addition, a FIRST name spelled "The" has no occurrences, as is indicated by a displacement table value of 12, which is greater than the number of records. Conversely, a displacement table value in the last row that is less than or equal to the total number of records indicates that value has an occurrence (such as "The" in the last row of MIDDLE name in this example).

In this example, if 20 bytes of storage is required for each FIRST and MIDDLE field entry, uncondensed columns would use 440 bytes for 11 records. After column merge compression, the union column of the value table uses a total of 20*15 bytes and, with 2-byte values in the displacement table, the displacement table columns use 2*2*15 bytes, for a total of 360 bytes, a space savings of 80 bytes. The space savings would be correspondingly greater where the value table values for the separate columns have more overlap. Union columns can also be advantageously used in implementing joins, as described below.

Another space saving technique used in alternate embodiments of the present invention is to combine fields of low cardinality into a single field having values representing the various combinations of the original fields. For example, in the example above, the TYPE and PARITY fields can be merged into a single field, TYPAR, having values representing combinations of TYPE and PARITY values.

Modified Input Table:

| Record # | ENGLISH | SPANISH | GERMAN | TYPAR |
|---|---|---|---|---|
| 1 | One | Uno | Eins | Odd_Unit |
| 2 | Two | Dos | Zwei | EvenPrime |
| 3 | Three | Tres | Drei | Odd_Prime |
| 4 | Four | Cuatro | Vier | EvenPower2 |
| 5 | Five | Cinco | Fuenf | Odd_Prime |
| 6 | Six | Ses | Sechs | EvenComposite |

Value Table:

| Row # | ENGLISH | SPANISH | GERMAN | TYPAR |
|---|---|---|---|---|
| 1 | Five | Cinco | Drei | EvenComposite |
| 2 | Four | Cuatro | Eins | EvenPower2 |
| 3 | One | Dos | Fuenf | EvenPrime |
| 4 | Six | Ses | Sechs | Odd_Prime |
| 5 | Three | Tres | Vier | Odd_Unit |
| 6 | Two | Uno | Zwei | |

Displacement Table:

| TYPAR |
|---|
| 1 |
| 2 |
| 3 |
| 4 |
| 6 |

Instance Table:

| Row # | ENGLISH | SPANISH | GERMAN | TYPAR |
|---|---|---|---|---|
| 1 | 1 | 3 | 4 | 4 |
| 2 | 2 | 5 | 6 | 2 |
| 3 | 6 | 6 | 5 | 6 |
| 4 | 4 | 4 | 1 | 5 |
| 5 | 5 | 1 | 2 | 1 |
| 6 | 3 | 2 | 3 | 3 |

The process of setting up these data structures is exactly as before, except that the TYPE and PARITY data is taken as a unit, rather than being two separate columns. While the compression of the TYPAR column is less than the compression achieved for the original TYPE and PARITY columns (due to the greater number of distinct values), an overall savings of space results due to the reduced numbers of columns in the displacement and instance tables. This space savings is realizable if the combined cardinality is sufficiently low. Searching for values matching the first part of the combined field (Even/Odd) is generally unchanged, but searching for the second part (Composite/Power2/Prime/Unit) is more complicated. To search for, for example, "Prime" it is necessary to search for both "EvenPrime" and "OddPrime". In general, C such searches will be necessary, where C is the cardinality of the first column of the combination. Counts are also more complicated for either column involved. More than two columns may be combined, with similar costs.

Hashing

Hashing comprises a known high-speed data storage and retrieval mechanism that can significantly outperform logarithmic-time binary searching. Although capable of delivering low-coefficient constant-time performance when implemented with an efficient hash function on an appropriate size hash table, the search for high-performance hash parameters can be complex, difficult and data dependent (e.g., depending on both the number and distribution of values). Still more importantly, hashing has major drawbacks—especially as implemented by state of the art DBMS's. Hash functions typically fail to return ordered results rendering them unsuitable for range queries, user requests for ordered output, such as SQL "sort-by" and "group-by" queries, and other queries whose efficient implementation is dependent on sortedness, such as joins.

By supporting an efficient, ordered, reduced-space representation of multi-dimensional data, the present invention obviates the deficiencies of hashing associated with the unorderedness of prior art DBMS's. Moreover, any known hashing technique can be used in conjunction with, and as part of, the present invention.

One example of hashing applied to a sorted value table is a 64 KB hash table in which each entry in the hash table contains the position of the first element in the value table whose first two bytes match the entry's position. For example, using 0-based numbering, the first entry in the hash table contains a pointer to the first entry in the value table whose first two bytes contain all 0's. The second entry contains a pointer to the first entry in the value table whose leading two bytes contains 00000000 00000001, and so on. Every set of consecutive hash table entries thus uniquely specifies the entire range of values containing the associated leading two-byte bit-pattern for all 64k possible leading two-bytes. This narrowed range of values can then be searched, via for example a binary search, to find any sought value. Two consecutive hash table entries with the same value indicates that no value elements contain the leading two bytes of the first entry.

Additional modifications can be imposed on top of hash tables implemented as described above. For example, space can be saved by stripping off the specified two bytes of the values in the value table, because those bytes can be obtained from the hash table. However, additional time is then needed to reconstruct the leading stripped off two bytes (if not known from the lookup), before that value can be returned to the user. This may be done for example by binary searching the hash table for the appropriate row in the value table. This may take up to 16 additional steps for a 64k hash table in the worst case, but average performance can be significantly reduced by for example an interpolation search where this is supported by the regular distribution of a particular data set.

Hashing may also be performed on instance elements to directly return or narrow the search for an associated value element, serving as an alternative to the occurrence table. Any hash function that returns the value element associated with a given instance element or some near-by value element can be used for this purpose. If a near-by value element is returned, the specific associated value element is then found by searching a limited portion of the displacement table. One such technique is a 64 KB hash table with pointers into the value table mapped onto each possible leading two bytes of an instance table. The range of displacement table entries to search are given by a hash table entry and its adjacent entry.

In situations where significant searching is still required but utilizable localized distribution patterns also exists this 64 KB entry hash table may be modified to accept two part entries. In such an implementation the first hash table entry still points to the first value associated with the first instance element that contains the two leading bytes specified by that position in the hash table. The second hash table entry then provides the address of a function that utilizes this local distribution to further narrow the search for the value element associated with that specified instance element.

The choice of 64 KB hash tables corresponding to two byte fields is not meant to be inclusive. Other byte size choices, other radixes, and byte placements other than the leading bytes can also be utilized. Moreover, any other known hashing method may also be used.

A General Case Topology for the Instance Table

As described above, in a specific embodiment, individual records are linked through the instance table in some topology, one of the simplest of which is a circularly linked list, or "ring" topology. So far the examples have used this simple ring topology—the pointers (i.e., entries) in the instance table link all the fields in a record in a single loop with each field having a single "previous" and a single "next" field, as shown in FIG. 2. Other topologies may be used in other embodiments of the invention.

A topology, as the term is used in connection with the present invention, is defined in terms of a graph in which attributes (or other forms of associated data) are nodes in the graph and links exist between nodes. Such is clearly the case for the simple ring topology.

Figure 3:
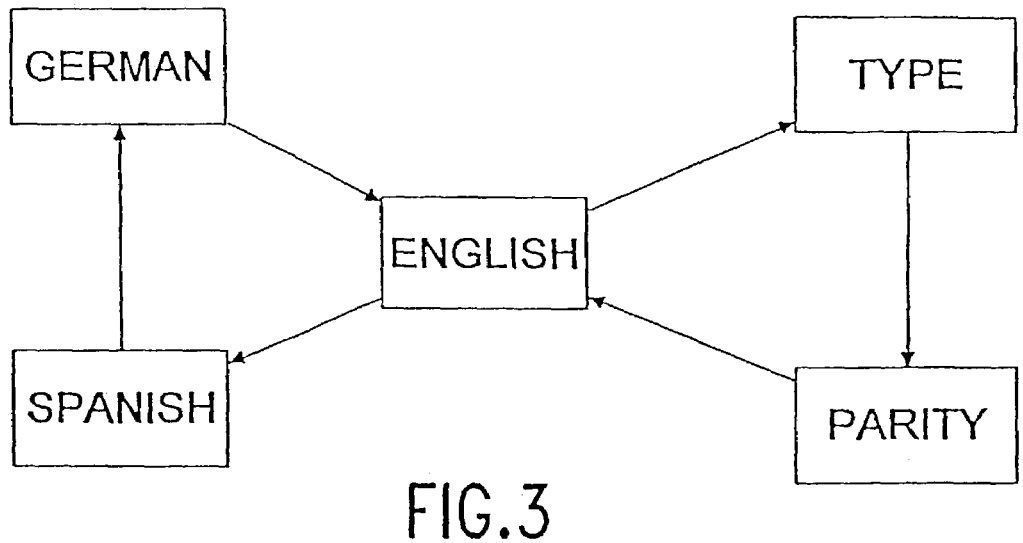
FIG. 3 illustrates a topology having subrings with a bridge field.

Another example of a topology is shown in FIG. 3. In this topology, the fields are separated into two subsets having exactly one field in common and each subset having a simple ring topology. The field common to both rings acts as a "bridge" between them. Complete record reconstruction then requires traversal around both rings, with the bridge field joining the record's subrings into a single entity. This topology is particularly useful if the majority of queries only pertain to the fields in one of the subrings, since that subring can then be traversed and retrieved without traversing and retrieving the full record.

Figure 4:
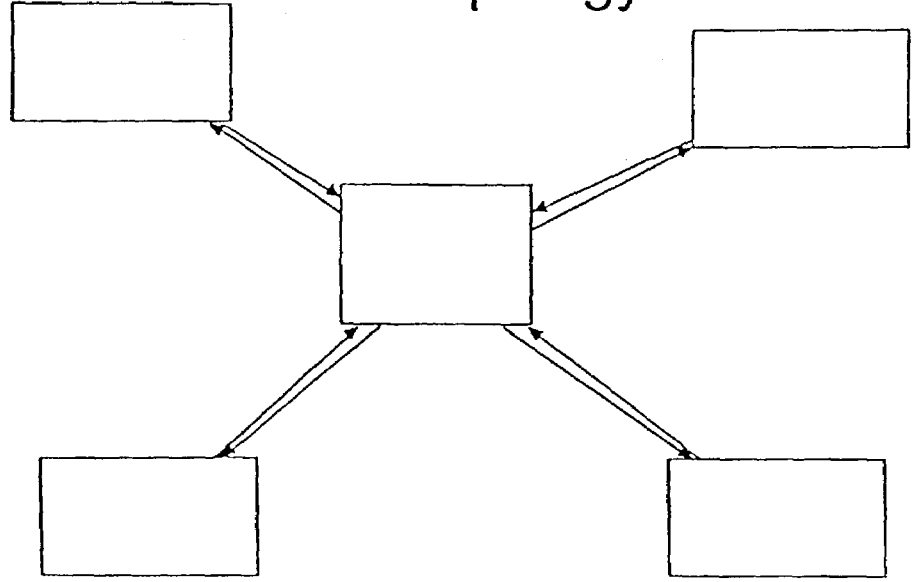
FIG. 4 illustrates a "star" topology.

As shown in FIG. 4, still another topology is a star, or spur, configuration, wherein each field represents a doubly-linked spoke radiating from a central hub. Alternatively, the individual spurs (branches) of the star may be either a linear or ring topology. In general, any of the above topologies could be combined (or other topologies used) to optimize record storage and retrieval for specific databases.

Any defined topology may be either singly or doubly linked and a topology need not be closed as in the examples above. Also, a topology may be changed between singly and doubly linked at the user's option or automatically by the database system based on access patterns. A doubly-linked topology is useful when adjacency of data is important; that is, when the order of the fields in the record is arranged such that fields frequently accessed in combination are located topologically close to each other. Singly-linked topologies are more desirable when full records (or substantial portions of them) are retrieved, or if a predominant field-retrieval starting point and order are given, since the instance list in a singly-linked topology occupies half the storage of the doubly-linked case.

Bridge Field Example

FIG. 3 specifically illustrates a topology wherein each record is comprised of two separate subrings (ENGLISH->SPANISH->GERMAN and ENGLISH->TYPE->PARITY) with ENGLISH as the bridge field. An instance table that implements such a topology is shown below:

| Row # | ENGLISH | SPANISH | GERMAN | TYPE | PARITY |
|---|---|---|---|---|---|
| 1 | 1/5 | 3 | 5 | 3 | 6 |
| 2 | 2/2 | 5 | 3 | 2 | 2 |
| 3 | 6/6 | 6 | 1 | 1 | 4 |
| 4 | 4/1 | 4 | 4 | 5 | 3 |
| 5 | 5/4 | 1 | 2 | 6 | 5 |
| 6 | 3/3 | 2 | 6 | 4 | 1 |

The ENGLISH column has two outgoing pointers, one for each of the subrings. To traverse, for example, the record starting in row 1 of the ENGLISH column, one of the outgoing pointers is first followed, for example, the one pointing to row 1 of the SPANISH column. Row 1 of the SPANISH column points to row 3 of the GERMAN column, which in turn points back to row 1 of the ENGLISH column. The other outgoing pointer is then followed, leading to row 5 of the TYPE column. Row 5 of the TYPE column in turn points to row 6 of the PARITY column, which again points back to row 1 of the ENGLISH column.

Database Implementation

Described below are implementations of routines for inputting data to, maintaining, and extracting data from the data structures described above. A person skilled in the art will recognize that there are many different algorithms for performing these operations, and the present invention is not limited to the algorithms shown herein.

Primitive functions (i.e., functions that are called by other functions) are provided, in one embodiment, to extract the data associated with a given record and buffer it in linear form, and to write such a buffered linear form of the data back into the data structures of the invention.

Data structures in accordance with the present invention are referred to below as follows:
1) VALS2: a value table with the columns in sort order and possibly condensed;
2) DISP: displacement table (column I of which has same number of rows as the corresponding column I of VALS2);
3) DELS: deletes table, described below, (column I of which has same number of rows as the corresponding column I of VALS2);
4) INST: instance table;
6) OCCUR: occurrence table.

In the discussion below, an embodiment having a ring topology is used, unless otherwise noted. In the ring topology in this embodiment, the functions prev(C) and next(C), which return the previous and next column, respectively, are as follows: prev(C)=(C+fcount−1) mod fcount, and next(C)=(C+1) mod fcount, where fcount is the number of columns and C is a column number ranging from 0 to fcount−1. An alternate embodiment has column numbers ranging from 1 to fcount, with prev(C)=(C−1)?(C−1):fcount (using C language notation), and next(C)=C mod fcount+1. More general topologies may be implemented by defining more complicated prev( ) and next( ) functions, and/or by analysis of the topology into simple rings and repeated application of the functions below on those simple rings.

The number of rows in the uncondensed value table, and the instance table, is represented as reccount. Condensed VALS2 columns will have fewer rows, as will the corresponding DISP and DELS structures. Rows are numbered from 0 to reccount−1 (zero-based); alternate embodiments may have rows numbered from 1 to reccount (one-based).

"V/O splitting" refers to the alternative instance table with condensed value table discussed above—the Ith column is called "V/O split" if the pointers in column I of the instance table have both a value and an occurrence component. Parallel treatments for non-V/O and V/O split columns are present where appropriate. The descriptors for each column in the instance table indicate whether the column has V/O splitting. The descriptors also contain other column/attribute specific information, such as the path of node traversal (i.e., "record topology"), whether the column has 0-based or 1-based numbering, etc.

Column descriptors for each column of the value table contain configuration information, such as its data type, size of field, type of permutation/change (e.g. grouped by value, sorted), type of compression (if any), locking information, type of hashing (if any), etc.

Other tables also have column descriptors containing relevant configuration information.

To facilitate the notation of function variables and return values, the following will be used (written in a pseudo-C/C++ notation):
typedef long Row;
typedef int Column;
class ChainVO {Row chainV[fcount]; Row chainO [fcount]; bool valid;}

If a ChainVO object has been filled in with data for a valid record, chainV[C] contains the row number of the record's VALS2 entry in column next(C).

If column C of the instance table is V/O split, chainO[C] contains the occurrence number of the value VALS2[chainV [C], next(C)].

If column C of the instance table is not V/O split, chainO[C] contains the row number of the record's cell in column next(C) of the instance table(s).

Record Reconstruction

Figure 5:
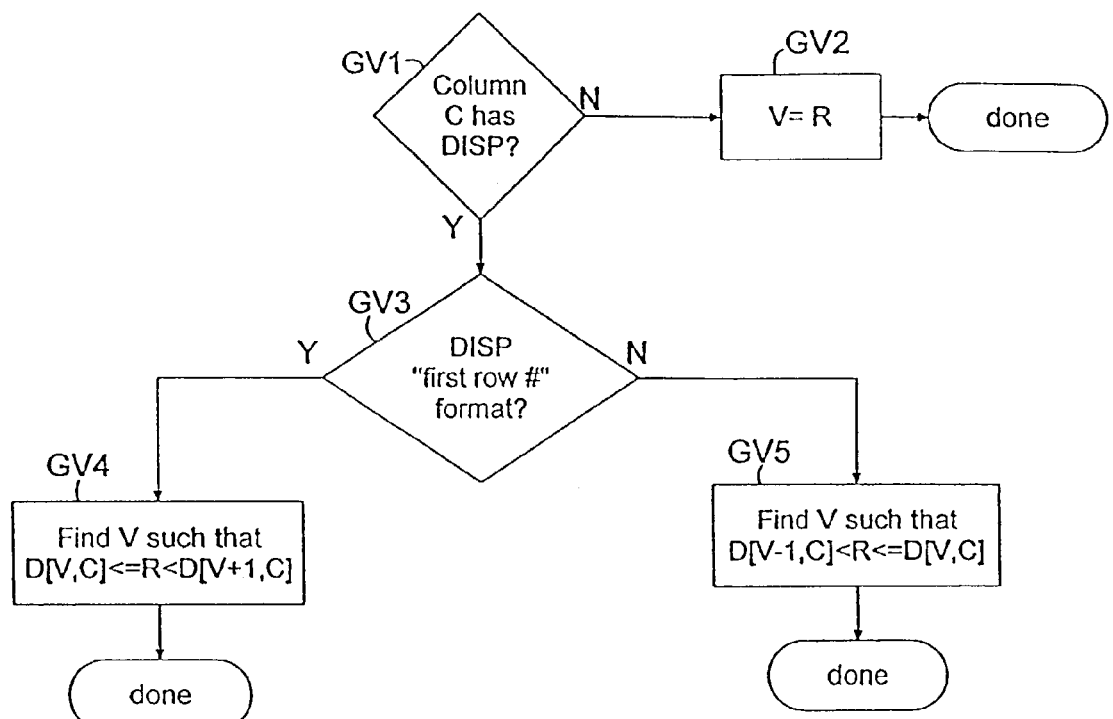
FIG. 5 is a flowchart illustrating a routine that finds the value table cell associated with an instance table cell.

Given a row number R in column C of the instance table, there exists a unique row number V in VALS2, containing the actual value associated with the [R,C] cell of the instance table. The routine shown in FIG. 5, Row get_valrec(Row R, Column C), determines V from R and C. Step GV1 determines whether column C has a DISP table column by checking the column descriptors for column C, and if not, step GV2 sets V to R. Otherwise, if a DISP table column is present, step GV3 determines its format (again by checking the column descriptor). If the DISP table column is in first row number format, then V is set, in step GV4, to the value for which DISP[V,C]<=R<DISP[V+1,C] is true, where the upper-bound test is not performed if V+1 does not exist (i.e., if V is the last DISP table row for column c). Otherwise, V is set, in step GV5, to the value for which DISP[V−1] <R<=DISP[V,C], where the lower-bound test is not performed if V−1 does not exist (i.e., if V is the first DISP table row for column c).

Figure 6:
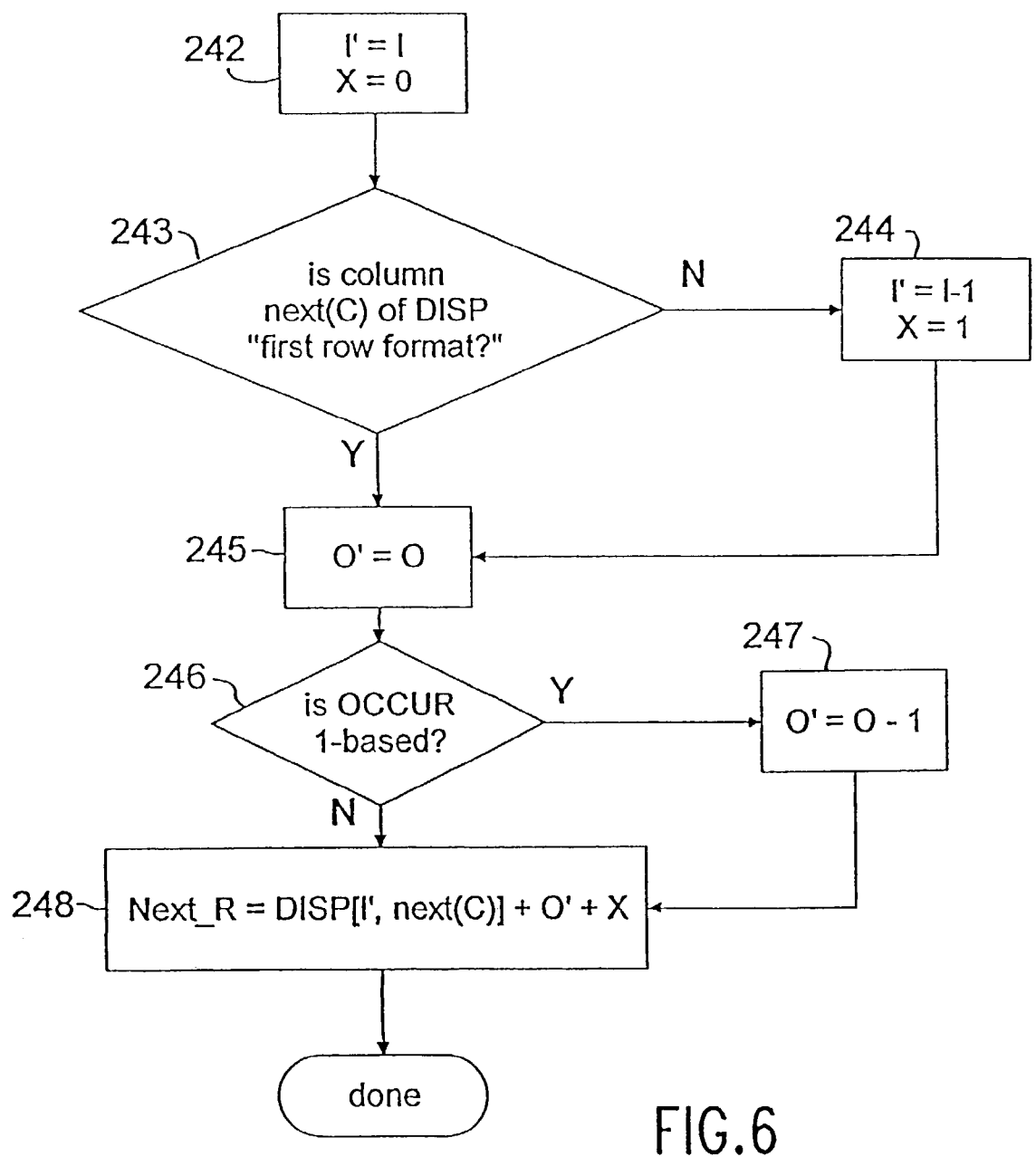
FIG. 6 illustrates a routine that determines the row of the next column where the current column is V/O split.

If column C of the instance table is V/O split, row number Next_R in column next(C) of the instance table is determined from the V/O entries in a manner dependent on the DISP and OCCUR implementation as shown in the flowchart of the R_from_VO(C, I, O) routine in FIG. 6. R_from_VO( ) is passed the current column, C, the row number, I, of the associated value in the next column, next(C), of VALS2 (and DISP) and the occurrence number, O, of that value. Step 242 sets variables I' to I and X to zero. Step 243 tests (e.g., via column descriptors) whether column next(C) of the DISP table is in "first row" format or "last row" format. If it is "last row" format, step 244 is performed, which sets I' to I−1 and X to 1. In either case, step 245 is then performed, which sets variable O' to O. Step 246 is then performed, which tests whether column C of the OCCUR table is 1-based. If it is, step 247 is performed, which sets O' to O−1. In either case, step 248 is then performed, which sets Next_R, the row in the next column, to DISP[I',next(C)]+ O'+X].

Figure 7:
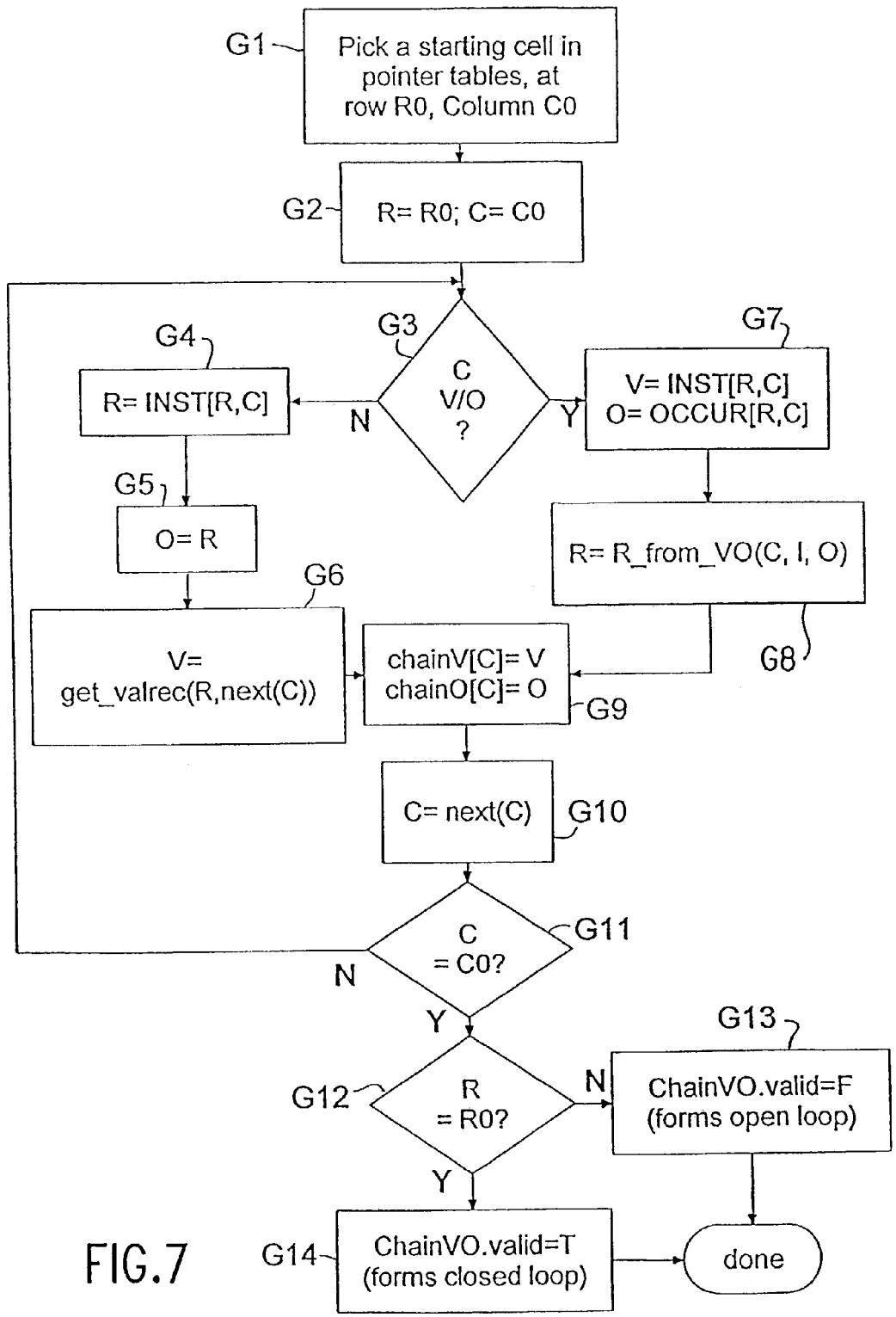
FIG. 7 is a flowchart illustrating the mapping of a record's topology data into a linear array.

FIG. 7 illustrates a function for linearizing a record's topology data, referred to herein as get_chain(Row R0, Column C0). Starting at row R0, column C0 in the instance table, this routine walks through the pointer cycle, storing the pointers in a ChainVO object. If the pointer cycle closes, ChainVO.valid is set to "true"; otherwise it is set to "false".

In step G1, instance table cell [R0, C0] is set as the starting point for record reconstruction. In step G2, the "current cell" [R, C] is initialized to the starting cell [R0, C0]. In step G3, the column descriptors for the current column in the instance table are checked to see if it has V/O splitting.

If the column does not have V/O splitting, step G4 fetches the row number in the next column directly by setting R to INST[R, C]. Step G5 sets the variable O for loading into the chainO[ ] array. Step G6 uses get_valrec(R, next(C)) to find the corresponding next-column row number, V, in VALS2, DISP, and DELS (if they exist).

If column C has V/O splitting, V (the row number in the next column, next(C), of VALS2, DISP, DELS) and O (the occurrence number for that value) are set, at step G7, to INST[R, C] and OCCUR[R, C], respectively. Step G8 then uses R_from_VO(C, V, O) as described above to find the row number, R, in column next(C) of the instance table.

Processing then reconverges at step G9, where chainV[C] and chainO[C] are set to V and O, respectively. Step G10 then replaces C with next(C), and step G11 checks to see if processing has returned to the column at which it started (i.e., C0). If not, processing loops back to step G3, and repeats as above. If processing has reached the original starting column, step G12 compares the current value of R to the starting value R0. If equal, the pointer chain forms a closed loop, indicating that a valid record has been reconstructed and stored in the ChainVO object, and step G14 sets a flag to indicate this. If R is not equal to R0, step G13 sets a flag to indicate the attempt to reconstruct a record did not result in a closed loop, which in this embodiment of the invention (which uses a ring topology) indicates that a valid record does not pass through cell [R0, C0]. In other embodiments of the invention, using different topologies, the pointer chain between associated instance elements need not form a closed loop.

The final step of record reconstruction is the conversion of the value table row numbers stored in the chainV array to values. The column C value of the record is given by VALS2[chainV[prev(C)], C] (possibly with a hash value prefixed, as described above).

Generalized Record Reconstruction

The description above for using get_chain( ) to reconstruct a record is based on a simple loop topology in which the next column in the topology depends only on the current column. The situation may be generalized. The next column may depend on meta-data, other than or in addition to the current column. For example, the next column might be a function of both the current column and the previous column, i.e., C=next(C, prev(C)). In addition, the next column in the topology may depend on data itself, such as the value, V, of the current cell in the value table, or depend on all of the above, i.e., C=next(C, prev(C), V).

Primitives for Record Modification

Primitive functions are now described for one implementation of record deletion, record insertion, and record modification. The implementation is referred to herein as the "swap" method. In this method a value in the value table may have deleted as well as nondeleted ("live") instances. A data structure, referred to herein as DELS, stores a count for each value of the number of deleted instances it has. Thus, DELS has the same number of columns as VALS2 and DISP, and, for any given column, the same number of rows in that column as VALS2 and DISP. The deleted instances are regarded as free space in the instance table, and the instance table is maintained such that for any given value in any given column, all live instances are grouped contiguously together and all deleted instances are grouped contiguously, such that the live instances precede the deleted instances or vice versa. This permits free space to be easily located for assignment to new records or new field values for existing records, as shown in the functions below. Free spaces can also be placed at desired locations in the instance table at setup time by including appropriate deleted records in an input data table; thus providing one implementation for performing insertions prior to deletions.

Figure 8:
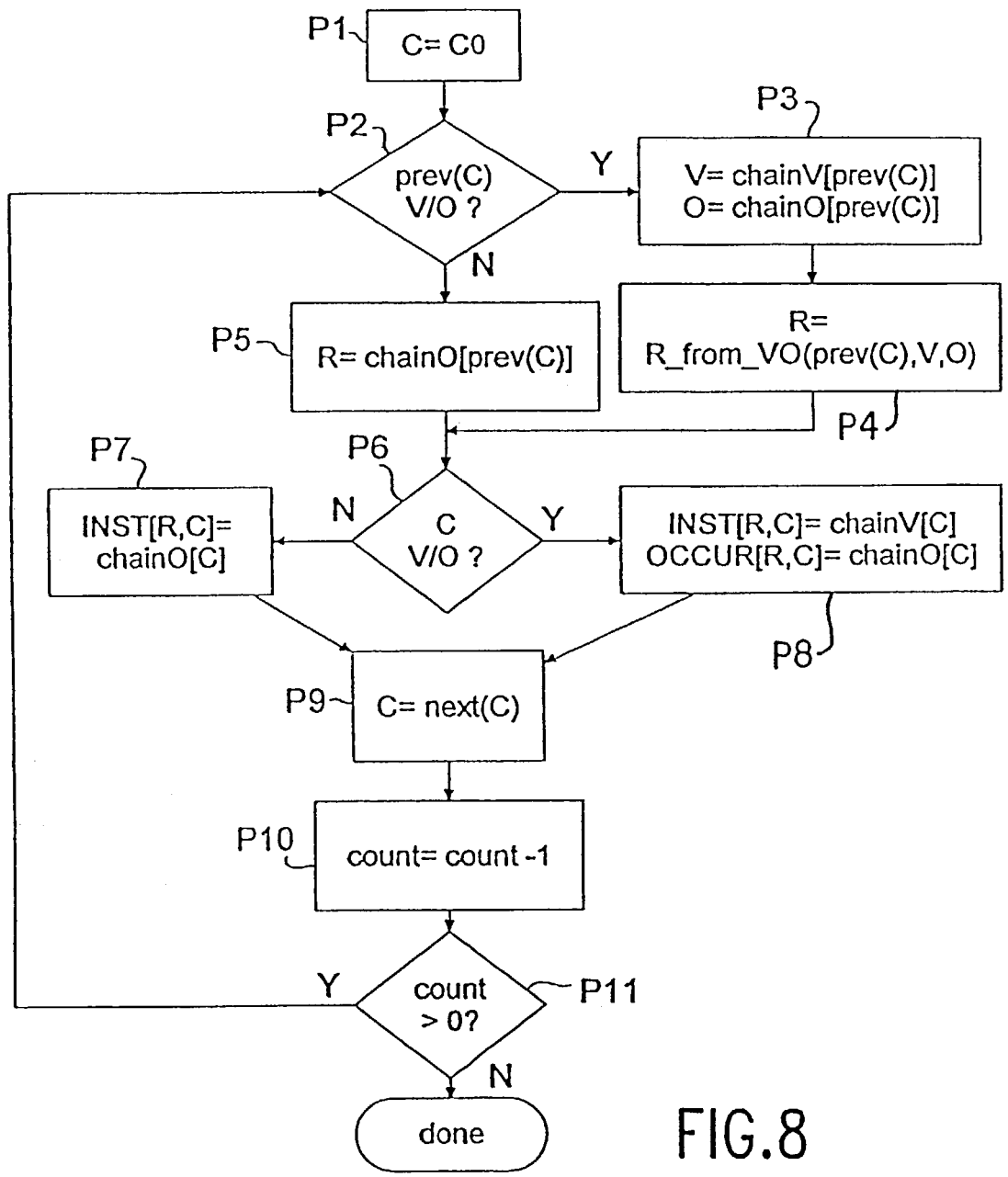
FIG. 8 is a flowchart illustrating the process of writing a linearized record topology into an instance table.

The put_chain(Column C0, ChainVO rec, int count) function, shown in FIG. 8, performs the inverse of get_chain( ). Put_chain( ), starting in column C0, writes part or all of the contents of a ChainVO object "rec" into the instance and occurrence tables, for "count" number of columns. The row number written to in column C is obtained from the prev(C) entries in rec. Put_chain( ) does not modify the value or displacement tables.

Step P1 sets the current column number C to the starting column C0. Step P2 checks the column descriptors for the instance table at column prev(C) to determine whether the previous column is V/O split. If prev(C) is V/O split, step P3 sets V (the row number in the value and displacement tables) to chainV[prev(C)] and O (the row number in the occurrence table) to chainO[prev(C)]. Step P4 sets R (the row number in the instance table) to R_from_VO(prev(C),V,O).

If the prev(C) column of the instance table is not V/O split, step P5 sets R to chainO[prev(C)]. Having now obtained the row number in column C of the instance table at which to write, step P6 determines if column C is V/O split. If it is not, step P7 sets INST[R,C] to chainO[C]. If column C is V/O split, step P8 sets INST[R,C] to chainV[C] and OCCUR[R,C] to chainO[C]. Processing then moves on to the next column in step P9 and the count of columns to process is decremented in step P10. If step P11 determines that no additional columns are to be written, processing is done, otherwise processing loops back to step P2 and repeats.

Figure 9:
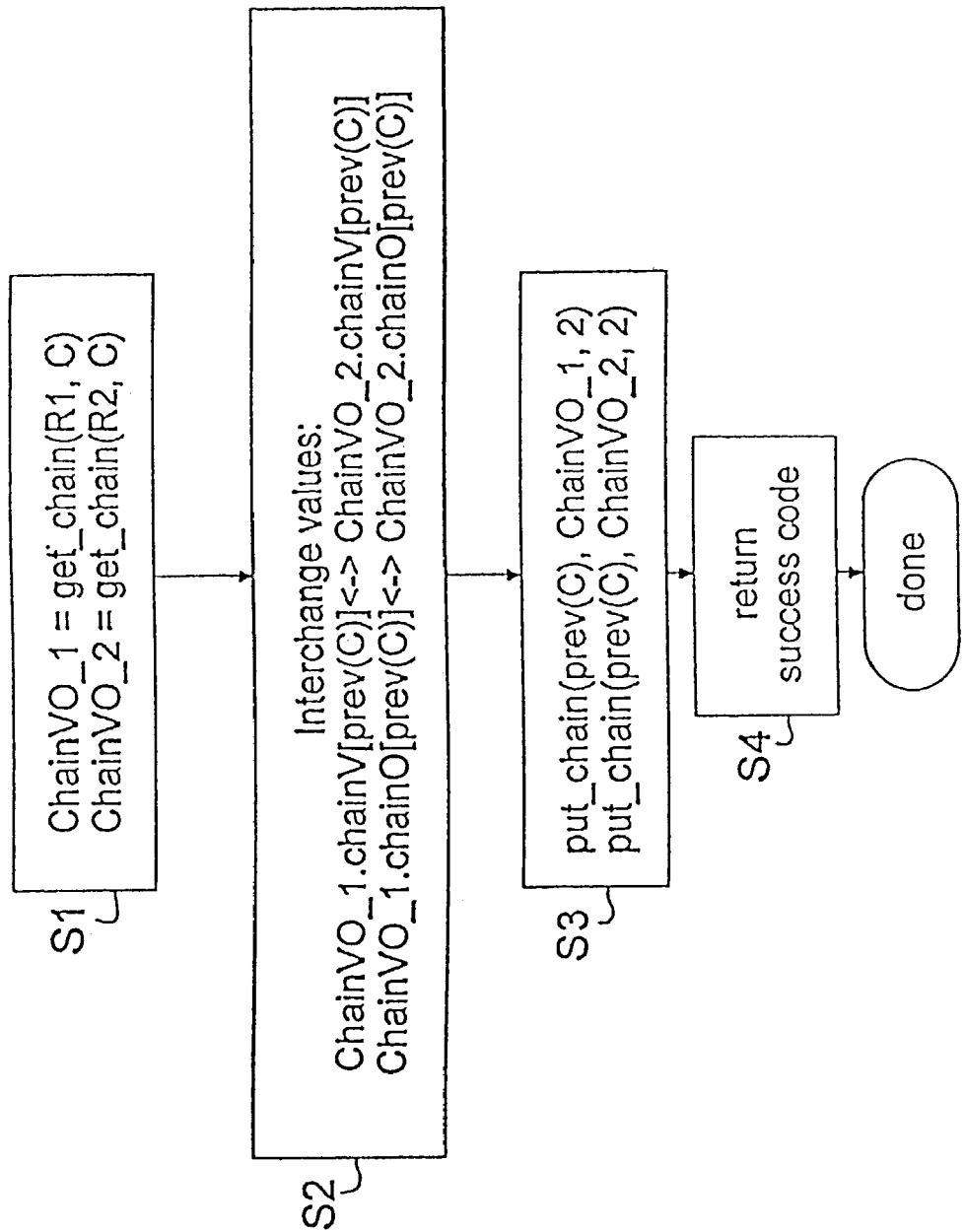
FIG. 9 is a flowchart illustrating the interchange of the cells of two records in the instance table.

FIG. 9 is a flowchart of the function int swap(Column C, Row R1, Row R2), which modifies the instance table, and other tables, such that the record passing through [R1,C] is made to pass through [R2,C], and the record passing through [R2,C] is made to pass through [R1,C].

Step S1 fetches the record data for the record passing through INST[R1,C] into ChainVO object ChainVO_1 and fetches the record data for the record passing though INST[R2,C] into ChainVO_2. Both records must be closed loops, otherwise, an exception is raised by get_chain( ). If both loops are valid, in step S2, the values in ChainVO_1.chainV[prev(C)] and ChainVO_2.chainV[prev(C)] are interchanged and the values in ChainV0_1.chainO[prev(C)] and ChainVO_2.chainO[prev(C)] interchanged. The exchanged values are in the prev(C) column, because that column determines the row number of column C in the instance table. The modifications are then written back into the instance table in step S3 via the calls to put_chain(prev(C), ChainVO_1, 2) and put_chain(prev(C), ChainVO_2, 2). Put_chain( ) is called with count 2, since one pass through the put_chain( ) loop updates the pointers to the swapped cells, and the second pass updates the contents of the swapped cells. A success code is returned in step S4, and processing is complete.

Figure 10:
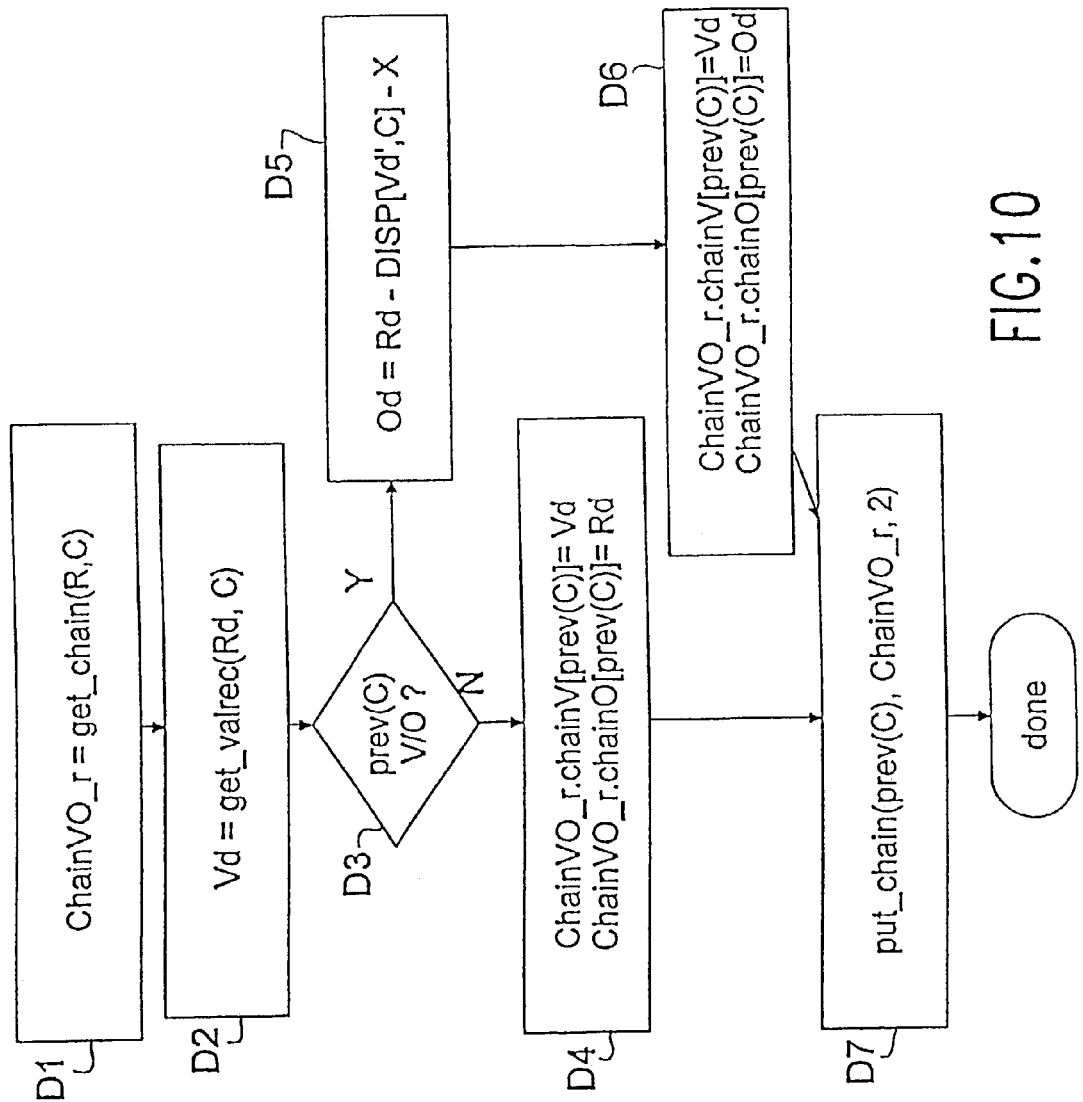
FIG. 10 is a flowchart illustrating swapping a live for a deleted cell.

FIG. 10 is a flowchart of the function del_swap(Column C, Row R, Row Rd), which modifies the instance and other tables such that the record through [R, C] is rerouted to pass through free cell [Rd, C]. This routine is used, for example, in maintaining segregation of deleted from live instances of a given value.

In step D1, data for the record to be rerouted (at row R, column C) is placed in the ChainVO object Chain VO_r via a call to get_chain( ). If get_chain( ) determines that the record is not a closed loop (i.e. it is an invalid record), an exception is raised. Step D2 finds the row, Vd, of the value table associated with the free cell Rd, using Vd=get_valrec(Rd, C).

Step D3 checks the column descriptors for column prev(C) of the instance table to determine if it is V/O split. If it is not V/O split, step D4 is performed, which sets ChainVO_r.chainV[prev(C)] to Vd and ChainVO_r.chainO[prev(C)] to Rd. If column prev(C) is V/O split, steps D5 and D6 are performed. Step D5 sets the occurrence number, Od, in a manner closely related to R_from_VO( ) described above; specifically, Od=Rd−DISP[Vd', C]−X (where Vd'=Vd and X=0 if DISP is "first row number" format, or Vd'=Vd−1 and X=1 if DISP is "last row number" format; if OCCUR is 1-based rather than zero-based, decrement X by 1 in the preceding). Step D6 puts values into the ChainVO object, setting ChainVO_r.chainV[prev(C)] to Vd and ChainVO_r.chainO[prev(C)] to Od. In either case, step D7 is then performed, which writes the modified record topology back into the instance table, via a call to put_chain(prev(C), ChainVO_r,2), and processing is complete.

Figure 11:
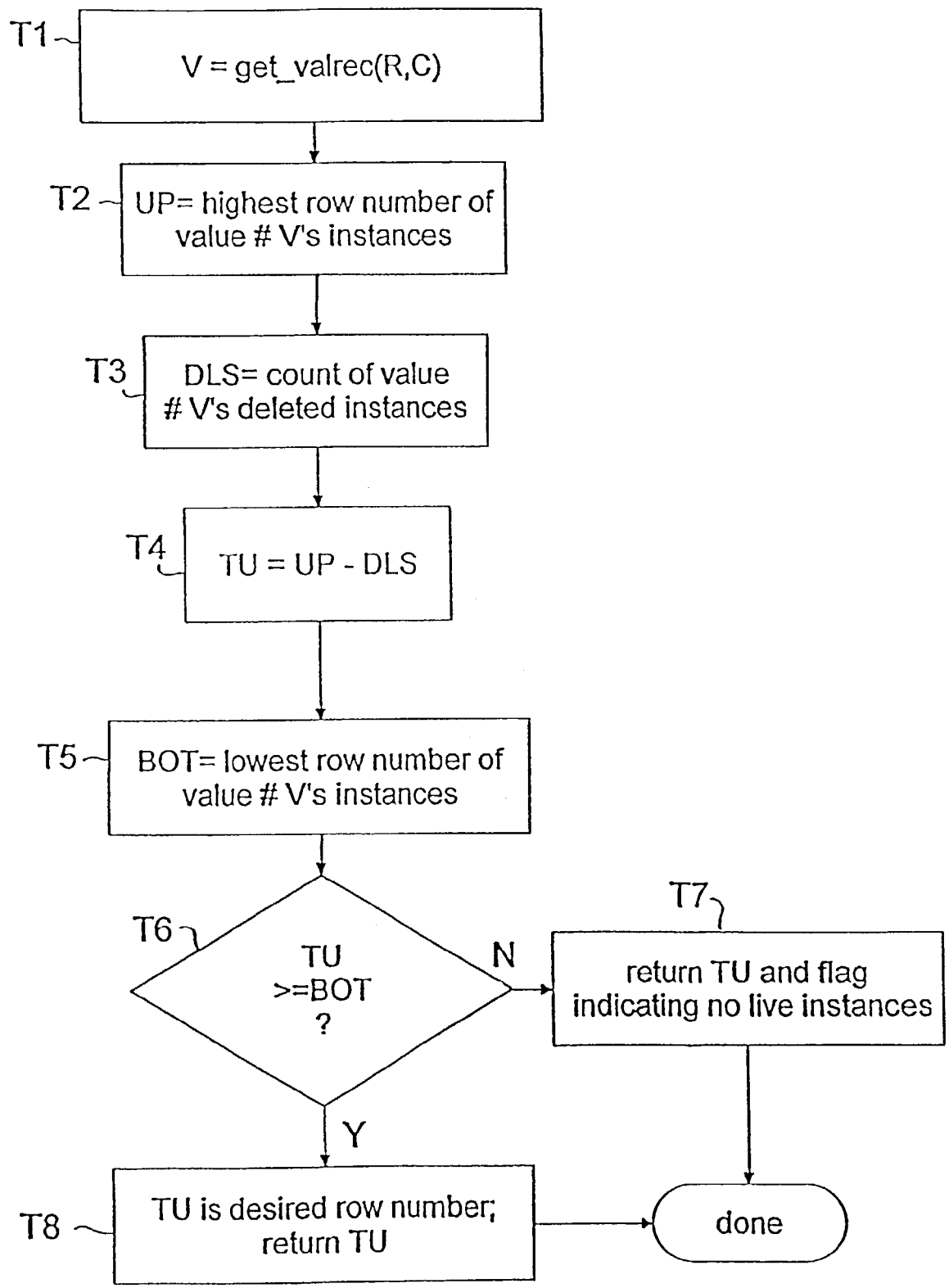
FIG. 11 is a flowchart illustrating finding the undeleted cell (if any) immediately adjoining the deleted cell(s) (if any) for a given value's instance cells in the instance table.

FIG. 11 is a flowchart of the function top_undel(Column C, Row R). Cell [R,C] of the instance table has associated value VALS2[V, C], where V=get_valrec(R,C). If this value has live instances, top_undel( ) returns the highest row number (in the instance table column C) for such live instances; otherwise the routine returns a flag indicating there are no live instances and a number that is one less than the row number of the first instance of V.

In step T1, the value table row V associated with instance table row R of column C is found; i.e., V=get_valrec(R, C). Step T2 sets UP to the highest row number in the instance table of all instances of value V. If DISP is in "last row number" format, UP=DISP[V,C]; if DISP is "first row number" format, UP=DISP[V+1,C]−1, if DISP[V+1,C] exists, or, if DISP[V+1,C] does not exist, UP=reccount+X−1 (where X=0 for 0-based row numbering, and X=1 for 1-based row numbering). If there is no DISP at all for column C, a search through the uncondensed value table column will provide the row numbers of the first and last instances of value number V. Step T3 sets DLS to the count of deleted instances for value number V. If there is a DELS structure, DLS=DELS[V,C]; otherwise, DLS is obtained by counting the instances flagged as deleted. Step T4 sets TU to the row number immediately previous to the first deleted instance of value number V (again, in the "swap method" embodiment all live instances of value number V precede, or in an alternate embodiment follow, all deleted instances of that same value). Step T5 sets BOT, the row number of value number V's first instance. For "first row number" format DISP, BOT=DISP[V,C]; for "last row number" format DISP, BOT=0+DISP[V−1,C] (if DISP[V−1,C] exists), or BOT=X (for X-based row numbering, X=0 or X=1). If there is no DISP for column C, then BOT is obtained by a search in the uncondensed value table. Step T6 tests to see if TU>=BOT. If not, then row number TU does not belong to value number V, but instead is one less than the row number of the first instance of V. Step T7 follows, returning TU and a flag indicating that all instances are deleted. If TU>=BOT, step T6 is followed by step T8, which returns the desired row number.

Figure 12:
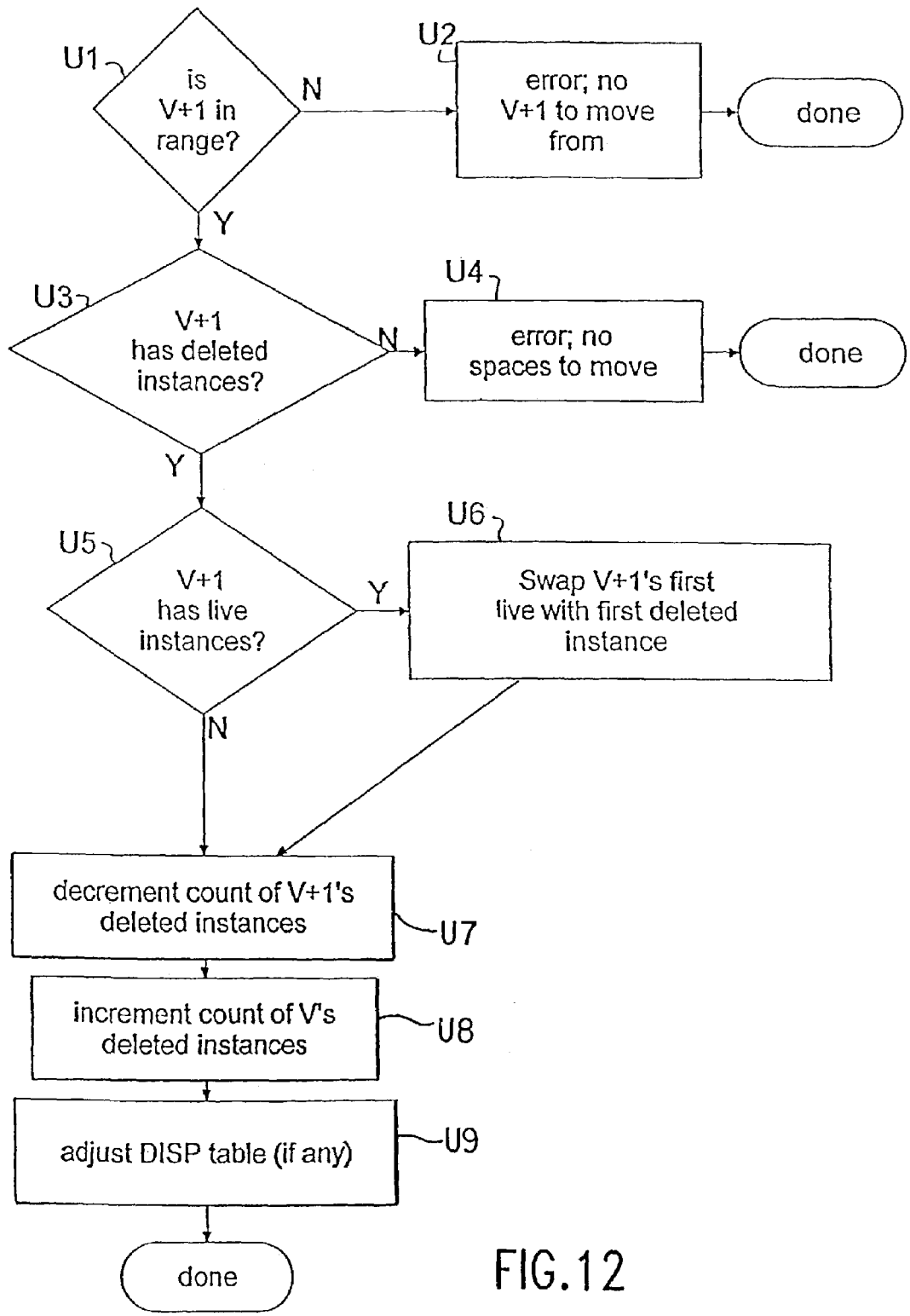
FIG. 12 is a flowchart illustrating moving a free (deleted instance) cell in the instance table from its original associated value to the immediately preceding value.

FIG. 12 is a flowchart of the function I_move_space_uplist(Column C, Row V), which swaps pointers in the instance table, so as to move a free cell from DELS[V+1, C] to DELS[V, C] while maintaining the segregation of live from deleted instances.

Step U1 checks whether there exists a value in row number V+1 in column C of VALS2. If there is no such value in row number V+1 (i.e., index V+1 is out of bounds), an error is reported at step U2 and function is done. Otherwise, step U3 tests whether value row V+1 of column C of VALS2 has any deleted instances (one of which will be moved by this routine). If it has none, step U4 reports an error (no spaces to move), and processing terminates. If deleted instances are found, step U5 tests whether value row V+1 has any live instances by calculating J=top_undel(C, K) (where K, the row number of the first instance of value number V+1, is given by K=DISP[V+1,C] if column C of DISP is "first row number" format, or K=DISP[V,C]+1 if column C of DISP is "last row number" format, or is found e.g. by linear search in the values table if there is no column C of DISP). If so, step U6 calls del_swap(C, K, J+1) to swap the first live instance (at row K) with the first deleted instance (at row J+1), thereby putting the free cell next to the instance table rows associated with the value V. Step U7 then deducts this free cell from the count of deleted cells for value number V+1 (by decrementing DELS[V+1,C] if DELS has a column C), step U8 adds the cell to the count of deleted cells for value number V (by incrementing DELS[V,C], if DELS has a column C), and step U9 adjusts the Displacement table (if it has a column C), to reflect the transfer of the free cell into value number V's set of deleted instances. If column C of DISP is in "first row number" format, DISP [V+1,C] is incremented to move the "floor" of the instance block for value number V+1 up one cell; if column C of DISP is "last row number" format, DISP[V,C] is incremented to move the "ceiling" of the instance block for value number V up one cell.

Figure 13:
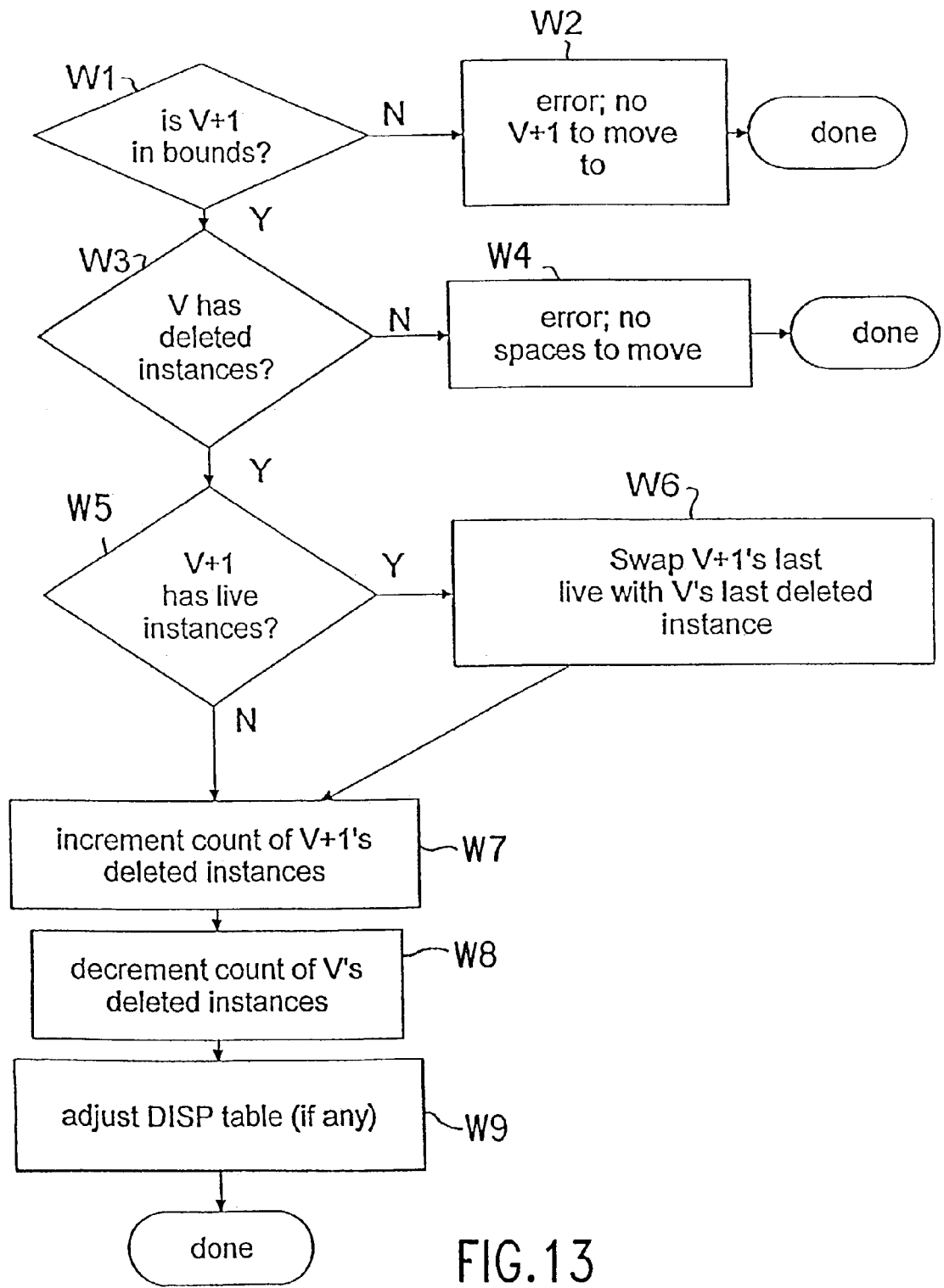
FIG. 13 is a flowchart illustrating moving a free (deleted instance) cell in the instance table from its original associated value to the immediately following value.

FIG. 13 is a flowchart of I_move_space_downlist(Column C, Row V), which swaps pointers in the instance table, so as to move a free cell from DELS[V, C] to DELS[V+1, C]. Segregation of live from deleted instances is maintained. An error is indicated by the return value.

Step W1 determines whether row V+1 of column C of VALS2 is out of bounds. If it is, step W2 reports an error (i.e., that there is no V+1 value to move a free cell to) and returns. Otherwise, step W3 tests whether value V has any deleted instances (one of which will be moved by this routine). If not, step W4 reports an error (no spaces to move), and processing terminates. If deleted instances are found, step W5 calculates J=top_undel(C, K) (where K, the row number of the first instance of value number V+1, is given by K=DISP[V+1,C] if column C of DISP is in "first row number" format, or K=DISP[V,C]+1 if column C of DISP is in "last row number" format, or is found e.g. by a linear search in the values table if there is no column C of DISP) to determine whether value number V+1 has any live instances. If it does, step W6 calls del_swap(C, J, K−1) to swap the top live instance (at J) of value V+1 with the last deleted instance of value V (at K−1), thereby moving the free cell to the instance table rows associated with value table row number V+1. Step W7 then adds this free cell to the count for value number V+1. Step W8 deducts the cell from the count for value number V. Step W9 shifts the boundary between V and V+1 to incorporate the transferred free cell into value number V+1's set of deleted instances. If column C of DISP is in "first row number" format, DISP [V+1,C] is decremented to move the "floor" of the instance block for value number V+1 down one cell; if column C of DISP is "last row number" format, DISP[V,C] is decremented to move the "ceiling" of the instance block for value number V down one cell.

Figure 14:
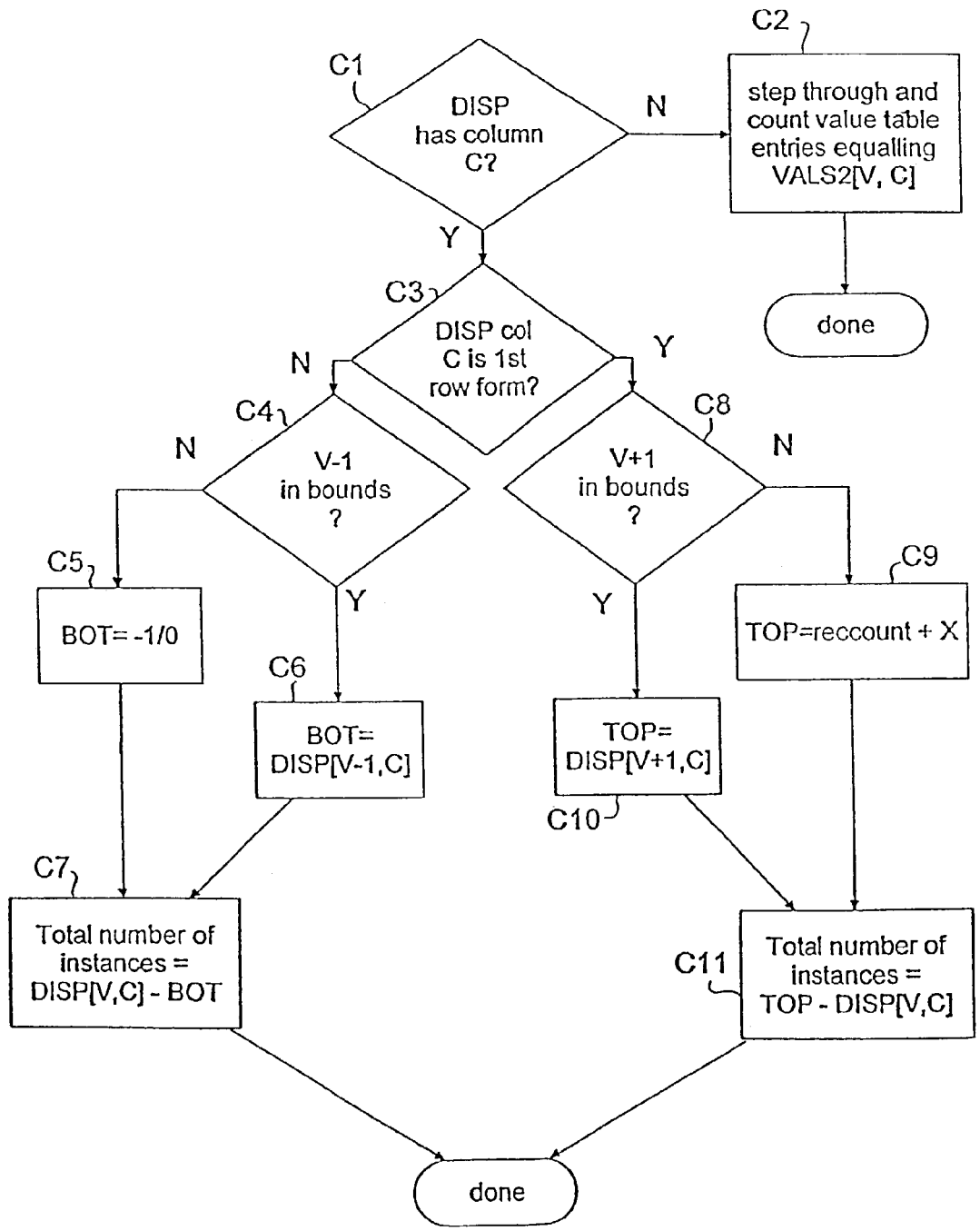
FIG. 14 is a flowchart illustrating determining the total number of instances (including deleted instances) for a given value.

FIG. 14 is a flowchart of Row inst_count(Column C, Row V), which gets the total instance count (live+deleted) for the value at VALS2[V, C], where V is a row number in the VALS2 array and C is the column number.

Step C1 determines if column C of DISP exists. If it does not, entries of the required value in the uncondensed values column are counted directly in step C2, and processing is complete. If column C of DISP does exist, step C3 determines if the DISP column is in "first row number" format. If it is not, processing continues with step C4. If the DISP column is in "first row number" format, processing continues with step C8. Step C4 determines how to set the variable BOT: if V is the lowest allowed index for DISP, then step C5 sets BOT=−1 for 0-based row numbering, or sets BOT=0 for 1-based row numbering. If on the other hand V−1 is a valid index for DISP, step C6 sets BOT=DISP[V−1,C]. Step C7 then finds the total instance count as DISP[V,C]−BOT, and processing is complete. If step C3 determines that DISP[c] is in "first row number" format, processing goes to step C8, which determines how to set the variable TOP: if V is the highest allowed index for DISP, then step C9 sets TOP=reccount+X for X-based row numbering (X=0 or X=1). If on the other hand V+1 is a valid index for DISP, step C10 sets TOP=DISP[V+1,C]. Step C11 then finds the total instance count as TOP−DISP[V,C], and processing is complete.

Figure 15:
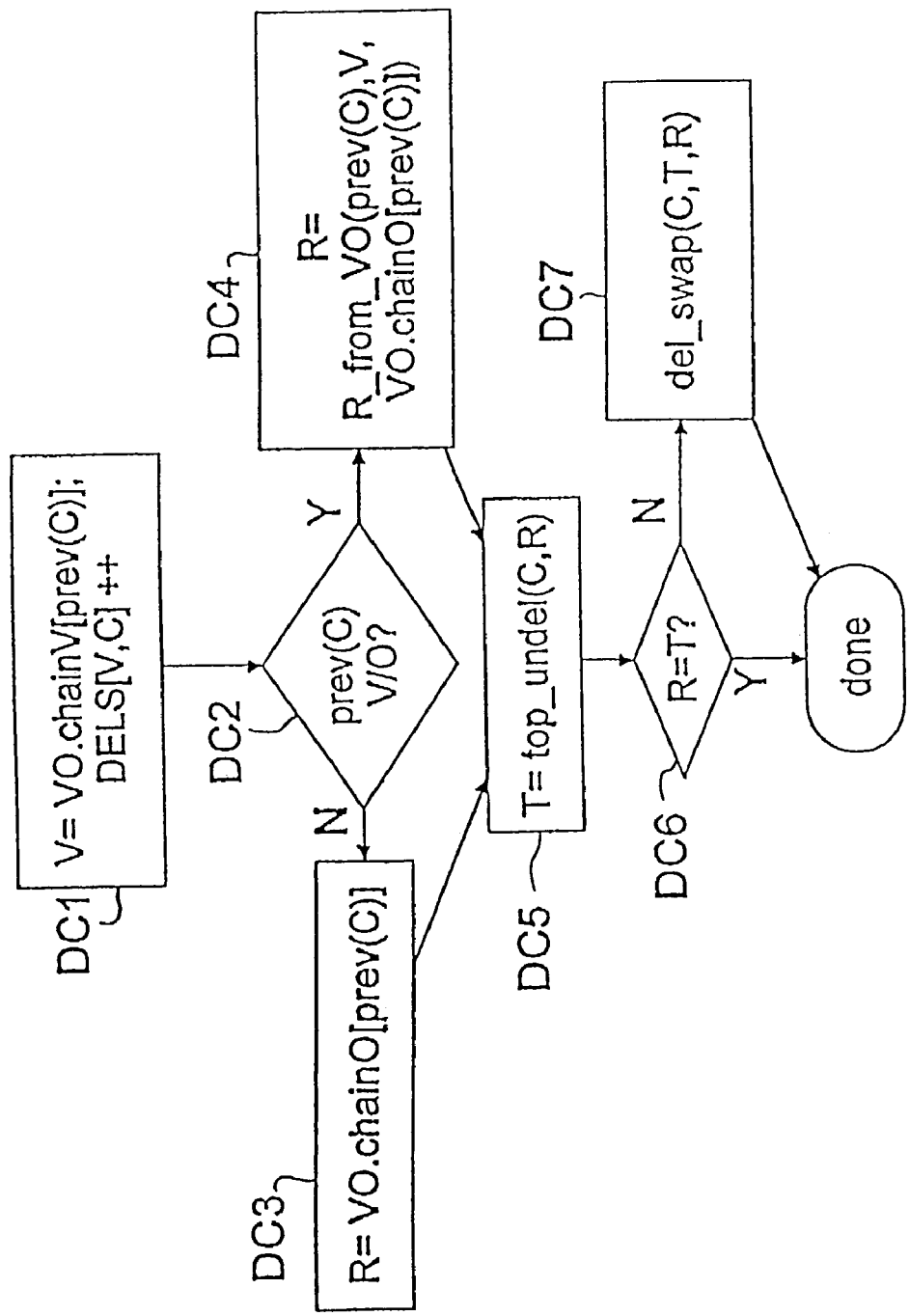
FIG. 15 is a flowchart illustrating the deletion of a previously live instance cell in the instance table.

FIG. 15 is a flowchart of a function that deletes the instance table cell [R,C]; that is, cell [R,C] in the instance table is placed in the free pool, and the appropriate DELS count is incremented. If the newly deleted cell is surrounded by live cells for the same value, it is moved to the live/deleted boundary via del_swap( ). The record's topology data is in a ChainVO object called VO. This routine is used in record deletion and in updating a field in an existing record; see "Update existing record" step E6 and "Delete record through cell" step DR7, below.

In step DC1, the VALS2/DELS/DISP row number in column C is obtained from the ChainVO structure representing the record being processed, and the corresponding DELS count is incremented. Step DC2 determines whether the pointers to the cell in question are V/O split. If prev(C)

is not V/O split, step DC3 gets the row number R directly from VO.chainO. If prev(C) is V/O split, step DC4 reconstructs R from VO.chainO via R=R_from_VO(prev(C),V, VO.chainO[prev(C)]). In either case, the top undeleted cell for the same value is located, via a call to top_undel(C,R), and set to T in step DC5 (which is guaranteed to exist, since the cell to be deleted is such an undeleted cell). Step DC6 then tests whether the cell being deleted is the topmost undeleted cell for the value in question. If not, a swap is performed in step DC7 via a call to del_swap(C,T,R) in order to maintain segregation of live from deleted instances. Processing is then complete.

Figure 16:
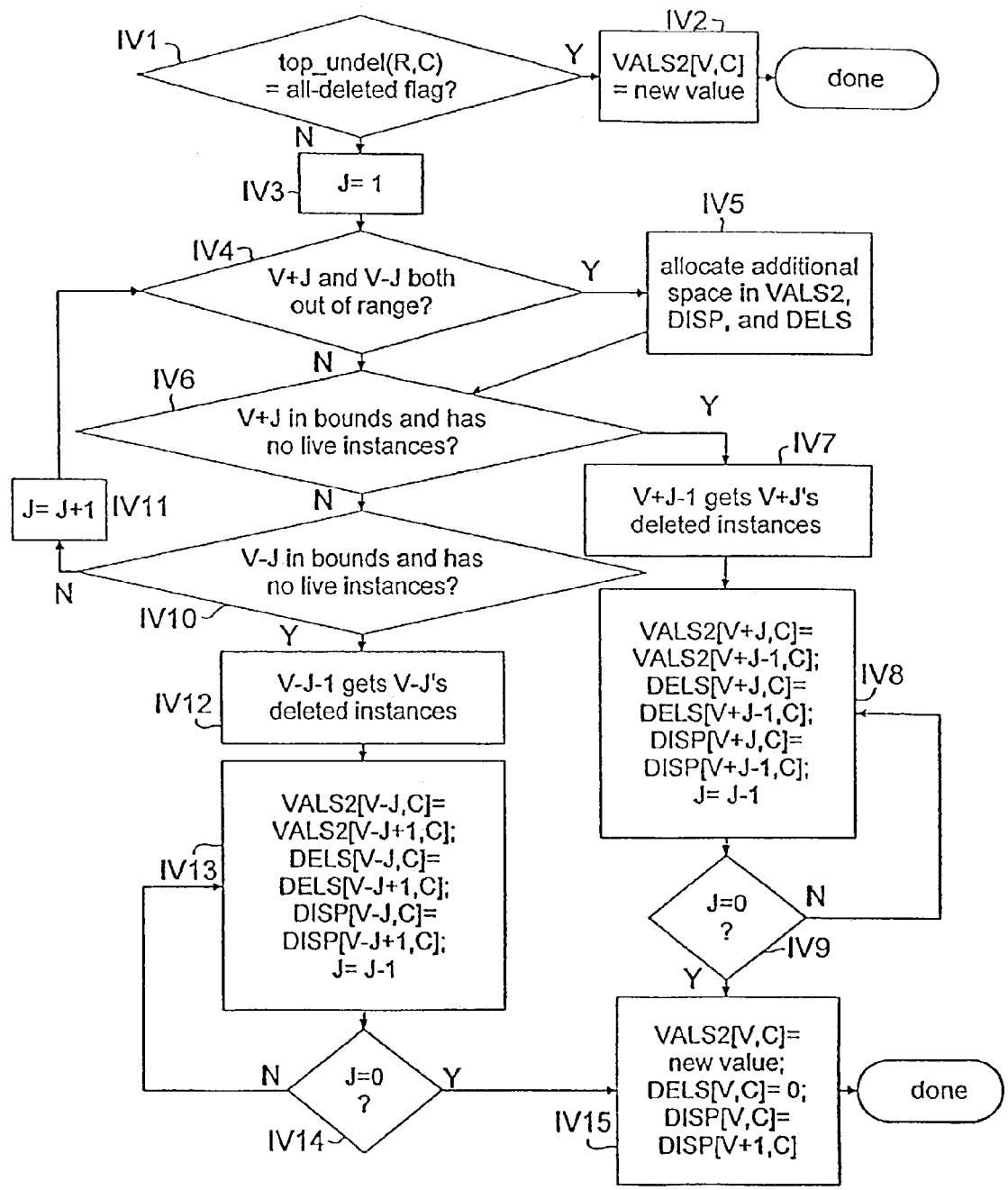
FIG. 16 is a flowchart illustrating the insertion of a new value into a value table column, when the pointers into that column are not V/O split.

FIG. 16 is a flowchart of insert_v(Row V, Column C, void *newvalptr), which inserts into column C of VALS2, at row V, a new value not previously present (pointed to by newvalptr), and modifies the associated DELS and DISP tables (if they exist) to accommodate the new value. This function is used only when column prev(C) of the instance table is not V/O split.

Step IV1 tests whether the value at the insertion point (row V) has any live instances; i.e., whether top_undel(R,C) returns a flag indicating that there are no live instances (R here is the INST row number of any instance of value number V; if column C of DISP exists, R=DISP[V,C] is such an instance; if DISP has no column C, R=V is such an instance. If there are no live instances of the value at row V, step IV2 is performed, which overwrites the old value with the new value, and processing is complete. If there is a live instance, a search is performed for the closest value having no live instances. Step IV3 initializes an index J to 1. Step IV4 determines whether both V+J and V−J are out of bounds. If they are, meaning that no further searching is possible and no free value slots have been found, step IV5 is performed which allocates additional space, for one or more additional slots, in column C of VALS2, DISP and DELS. Step IV6 tests whether V+J is in bounds, and whether the value at row V+J has any live instances (via top_undel (R',C), where R' is the INST row number of any instance of value number V+J; if column C of DISP exists, R'=DISP [V+J,C] is such an instance; if DISP has no column C, R'=V+J is such an instance. If V+J is in bounds and value V+J has no live instances, then the branch starting with step IV7 is executed; otherwise, step IV10 is executed.

The branch starting with step IV7 is a loop which shifts the values in rows V to V+J−1 in VALS2 to the next higher row, thus opening an unused row at row V of VALS2. Step IV7 adds the deleted instances of value number V+J to value number V+J−1, e.g., if DELS has a column C, then DELS [V+J−1,C] is set to DELS[V+J−1,C]+DELS[V+J,C]. Step IV8 shifts the values at row V+J−1 of VALS2, (and DELS and DISP, if they exist) to row V+J of VALS2, DELS and DISP, respectively (i.e., VALS2[V+J,C]=VALS2[V+J−1,C]; DELS[V+J,C]=DELS [V+J−1,C]; DISP[V+J,C]=DISP[V+ J−1,C]), and then decrements J. Step IV9 iterates step IV8 until J=0. Then, step IV15 inserts the new value at row V of VALS2 and updates DELS and DISP to indicate that the new value has no instances; i.e., VALS2[V,C]=new value, DELS [V,C]=0, and DISP[V,C]=DISP[V+1,C]. Processing is then complete.

Step IV10 tests whether V−J is in bounds, and whether the value at row V−J has live instances. If there are live instances, step IV11 is executed, which increments J and loops back to step IV4. If V−J is in bounds and value number V−J has no live instances, step IV12 is executed, which begins a loop which shifts the values in rows V−J+1 to V in VALS2 to the next lower row, thus opening an unused row at row V of VALS2. Step IV12 adds the deleted instances of value number V−J to value number V−J−1 (e.g. if DELS has a column C, then DELS[V−J−1,C] is set to DELS[V−J−1, C]+DELS[V−J,C]). Step IV13 then shifts values for rows V−J+1 of VALS2, (and DELS and DISP, if they exist) to rows V−J of VALS2, DELS and DISP, respectively (i.e. VALS2[V−J,C]=VALS2[V−J+1,C]; DELS[V−J,C]=DELS [V−J+1,C]; DISP[V−J,C]=DISP[V−J+1,C]), and decrements J. Step IV14 iterates step IV13 until J=0, at which point step IV15 inserts the new value, with no instances, as described above, and processing is complete.

Figure 17:
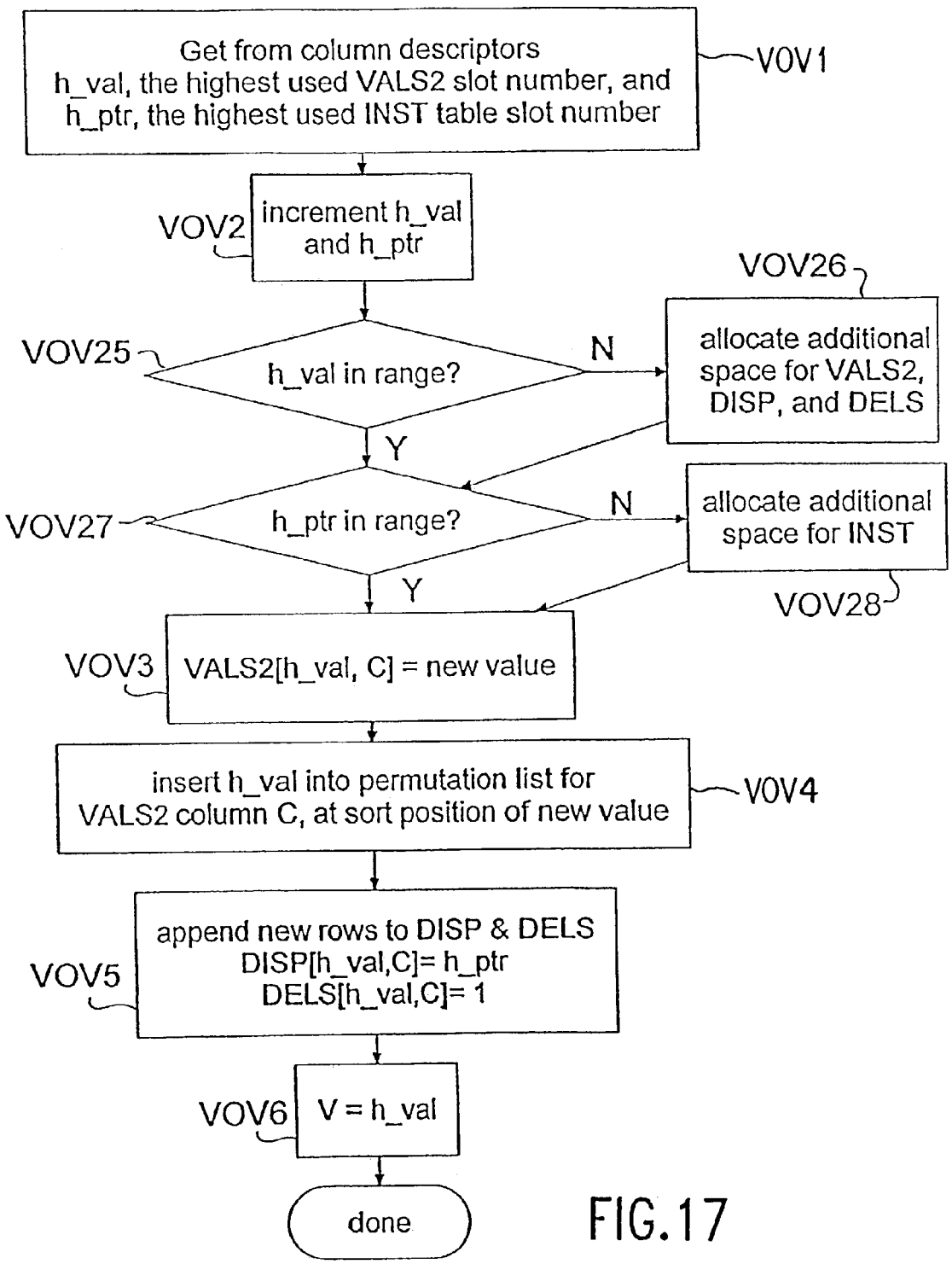
FIG. 17 is a flowchart illustrating the insertion of a new value into a value table column, when the pointers into that column are V/O split.

FIG. 17 is a flowchart of insert_vov(Row V, Column C, void *newvalptr), which inserts a new value (pointed to by newvalptr) into column C of VALS2, when column prev(C) of the instance table is V/O split. The set of column descriptors for such a column includes a value h_val, the highest currently used row number in VALS2 column C, and h_ptr, the highest currently used row number in the instance table. Both VALS2 and the instance table are preferably allocated with extra blank space at their ends to accommodate new entries. In one embodiment of the present invention, inserted new values are written at the end of the VALS2 table (rather than at their sort-order position, as in insert_v( ), above). A permutation list giving the added VALS2 row numbers in sort order is updated by insertion of the new indexes at their proper sort positions. The permutation list is used to access the new part of the VALS2 column in sort order (e.g., by a binary search algorithm). A search for a value in the VALS2 column would first search the original, sorted part of the value list and, if no match was found, a second binary search would use the permutation list to search among the new values.

Other means can be utilized to avoid otherwise unnecessary searching of the appended new value list. These include, but are not limited to, the following: (1) The original sorted value list together with any instance table values for V/O splitting may be reorganized in the background or overnight to keep the appended new value list as short as possible; (2) A bit flag embedded in the value list or associated displacement list or standing alone identifies when new values have or have not been appended between a given old value and a contiguous old value to avoid unnecessary searching of the appended new value list when no new values fall within that range; (3) A pointer mechanism, possibly associated with an existing hash function or with a hash function used expressly for this purpose narrows the range of the appended new value list that needs to be searched.

The insert_vov routine is used by the "Insert new record" and "Update existing record" routines.

Step VOV1 gets, from the column descriptors for column C, h_val, the highest VALS2 slot number already used in column C, and h_ptr, the highest instance table row number already used. In step VOV2, h_val and h_ptr are incremented to point to the first available empty slots in column C of VALS2 and the instance table, respectively, if such empty slots exist. Step VOV25 determines if h_val is in range and, if it is not in range, step VOV26 allocates additional space, for one or more additional slots, in column C of VALS2, DISP and DELS. Step VOV27 then determines if h_ptr is in range and, if it is not, step VOV28 allocates additional space, for one or more additional slots, in column C of INST.

In step VOV3, the VALS2 slot is filled in with the new value (so that h_val once again indicates the highest used slot number); i.e., VALS2[h_val,C] is set to new value. In step VOV4, the new value's proper sort order position is found within the set of new appended values, and the value h_val is inserted at that position in the permutation list. In step VOV5, the DISP and DELS structures are updated; DISP[h_val,C] is set to h_ptr, and DELS[h_val,C] is set to 1, since incrementing h_ptr by one has in effect allocated space for one record, which is not yet a "live" record, and is thus part of the DELS pool. Finally, in step VOV6, row V, which is equal to the sort position of the new value) is changed to h_val for proper inclusion into the ChainVO object used in the routine calling insert_vov( ) (specifically, chainV[prev(C)] must point to the actual location of the new value, i.e. h_val).

Figure 18:
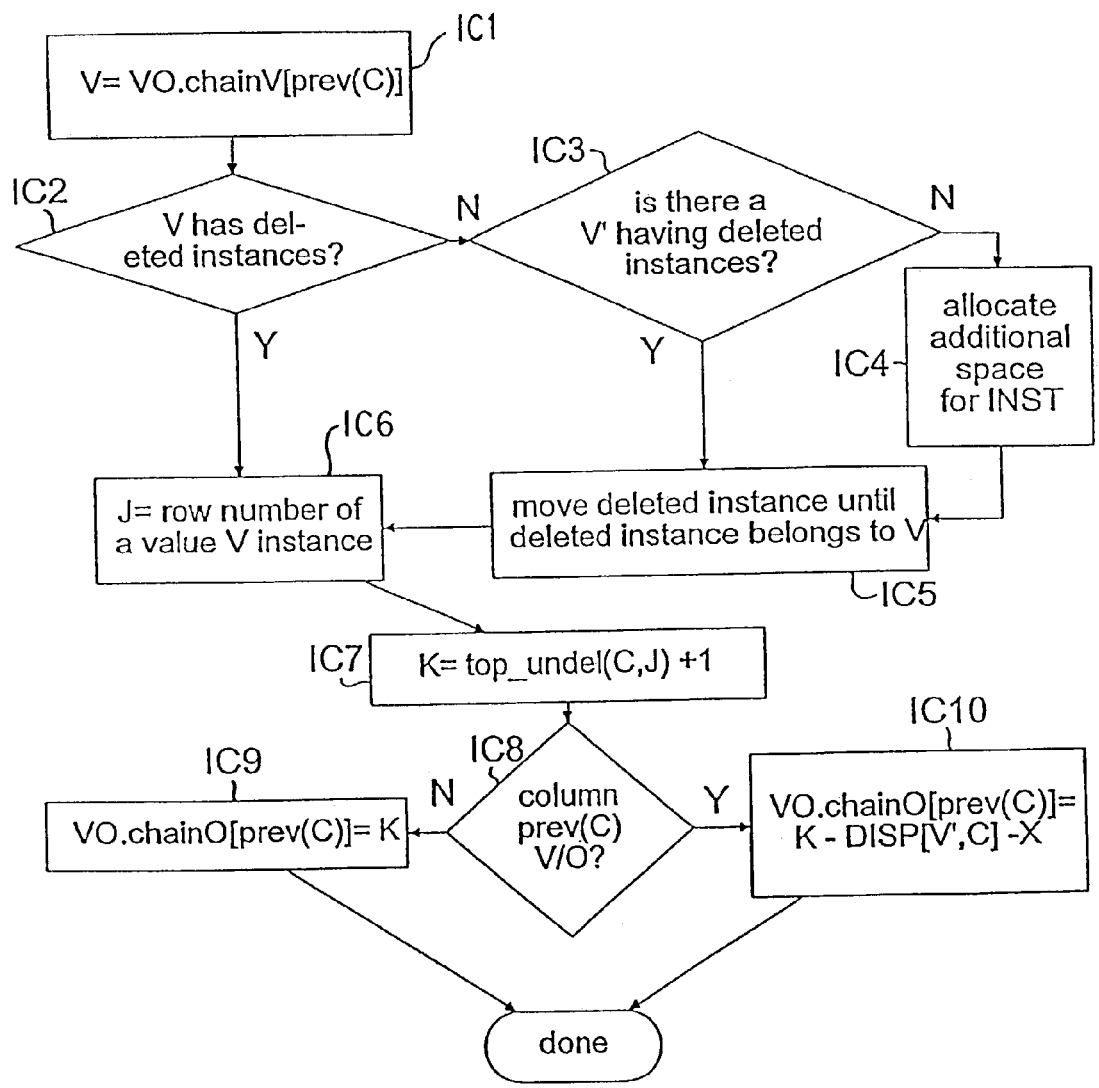
FIG. 18 is a flowchart illustrating the assignment of a free (deleted) instance table cell to a given value in the value table.

FIG. 18 is a flowchart of insert_c(ChainVO VO, Column C). This routine checks if there is a deleted instance of the column C value specified by VO and, if not, migrates a deleted instance from the nearest value having one. The row number of the first deleted instance of the value is then stored in VO.chainO (either as offset or row number, depending on V/O splitting).

Step IC1 sets V to the VALS2 row number in column C for the value whose first deleted instance is to be written into VO.chainO[prev(C)] (i.e., V=VO.chainV(prev(C)). Step IC2 determines whether this value has a deleted instance (i.e., whether DELS[V,C]>0, or by direct count of tombstoned, flagged, cells in those embodiments in which deleted cells are marked by a flag). If this value has no deleted instances, step IC3 is performed, which does an iterative search for the closest value with a deleted instance (similar to the search done in "insert_v( )" above) to determine whether there is a deleted instance for any value. If no deleted instance is found, step IC4 allocates additional space, for one or more additional slots, in column C of INST, and adjusts the data structures as needed to indicate that the additional slots are free (i.e., deleted instances). Step IC5 then does an iterative application of I_move_space_uplist( ) or I_move_space_downlist( ) until the value at row V of VALS2 has a deleted instance. Step IC6, which is also done directly after step IC2 if value table row number V already has a deleted instance of its own, sets J to a row number in column C of the instance table that is associated with value table row number V. If column C of DISP exists, J=DISP [V,C] is such an instance. If DISP has no column C, J=V is such an instance. Step IC7 then finds the first deleted instance, K, which is at one plus the row number returned by top_undel(C,J) (i.e., K=top_undel(C,J)+1). Step IC8 then tests whether the previous column, prev(C), is V/O split. If it is not, step IC9 sets VO.chainO[(prev(C)] to K. Otherwise, step IC10 sets VO.chainO[(prev(C))] to K−DISP[V',C]−X, where V'=V and X=0 if DISP is "first row number" format, or V'=V−1 and X=1 if DISP is "last row number" format. In either case, processing is then complete.

Record Deletion

Record deletion is performed in this embodiment by identifying the pointer table cells of the record and marking them as deleted in the DELS column when it exists, or by a tombstoning flag. Such free space is then available for use when the data in existing records is changed or new records are added. In unsorted columns that are "attached" as described above, the delete status of a cell in the attached column is identical to that of the cell to which it is attached.

Figure 19:
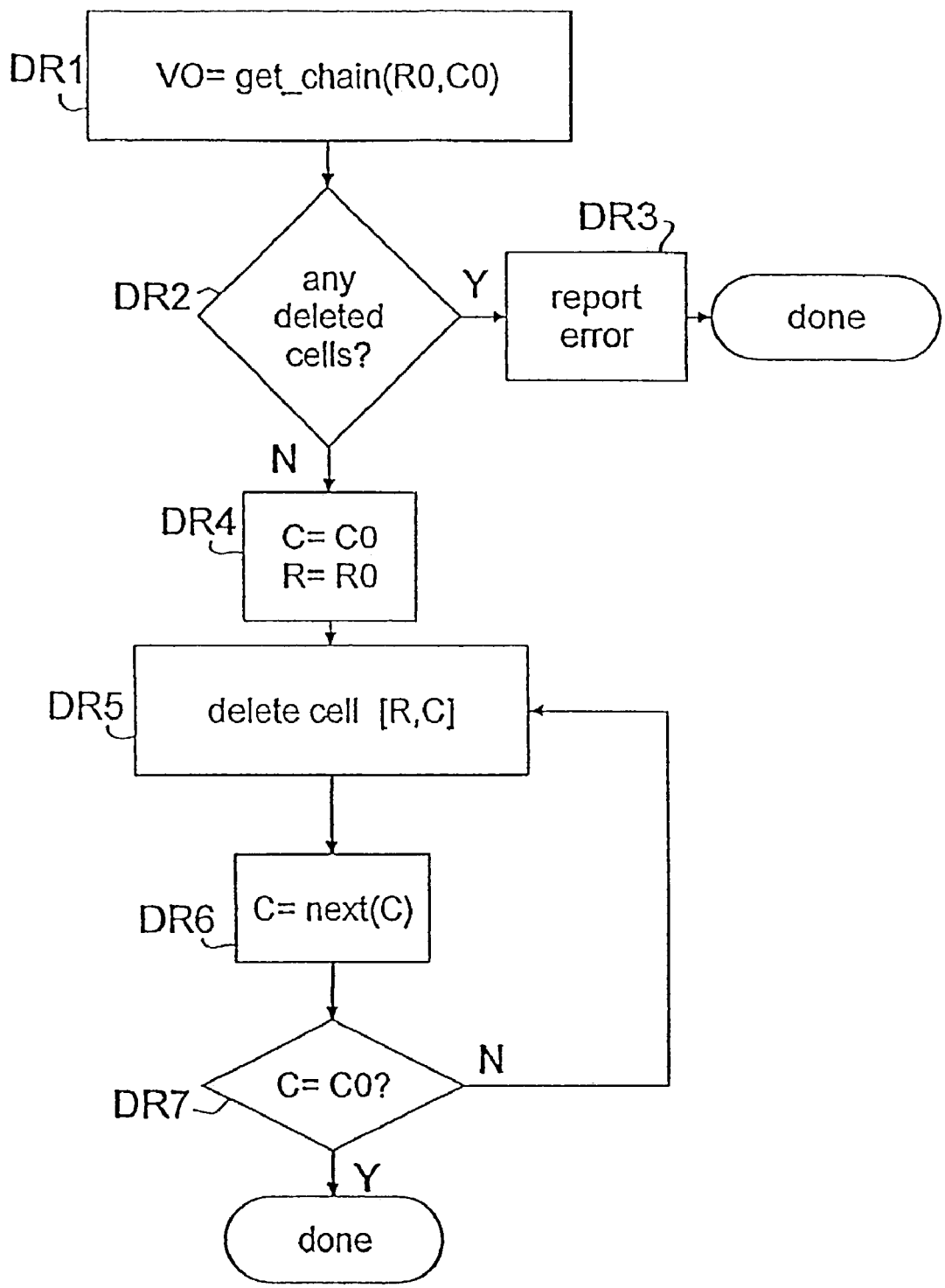
FIG. 19 is a block diagram illustrating the steps in a delete record operation.

Deletion of a record is illustrated in FIG. 19. In step DR1, the record to be deleted (the one containing cell [R0, C0]) is loaded into ChainVO object VO. If the pointer chain starting from [R0, C0] does not form a closed loop, an exception is raised, terminating processing. Step DR2 determines whether the record has any deleted cells (by, e.g., repeated testing of whether top_undel( ) returns a row number less than the cell's row number), because only a live record can be deleted. If the record contains a deleted cell, step DR3 reports an error and processing is complete. If no cells in the record are deleted, step DR4 is performed, which initializes the current column, C, to column C0 and the current column, R, to R0. Step DR5 then deletes the current cell, [R, C], and sets R to the row number in next(C), via a call to "Delete pointer(s) cell [R,C]," described above. Step DR6 then sets C to the next column via a call to next(C). If the current column is not equal to the starting column (C not equal to C0), step DR7 loops back to step DR5; otherwise, step DR7 terminates processing.

For example, if record "Five" is deleted in the example above, all cells in INST (and possibly OCCUR) belonging to this record will be marked as "deleted" (by tombstones for columns not having DISP/DELS, and by the DELS column where it exists). For the above example the DELS table will look as follows (if record "Five" is the only one that has been deleted):

| | | DELETES | | | |
|---|---|---|---|---|---|
| Row # | ENGLISH | SPANISH | GERMAN | TYPE | PARITY |
| 1 | | | | 0 | 0 |
| 2 | | | | 0 | 1 |
| 3 | | | | 1 | |
| 4 | | | | 0 | |
| 5 | | | | | |
| 6 | | | | | |

A count of records with, for example, TYPE="Prime" is now obtained from column TYPE of DISP as 6−3 (difference of row 4 entry and row 3 entry), indicating that there are three such records; however, the DELETES structure indicates that one of those records is deleted, hence the true total is 6−3−1=2. The number of records with PARITY="Odd" is obtained similarly. DISP shows the value 4 in row 2 of the PARITY column. Hence, rows 4 through 6 (last row) of INST are associated with "Odd", three records in all. Again, there is a "1" in the PARITY column of DELETES, row 2, so the number of undeleted records with PARITY="Odd" is 3−1=2.

Record Insertion

Figure 20:
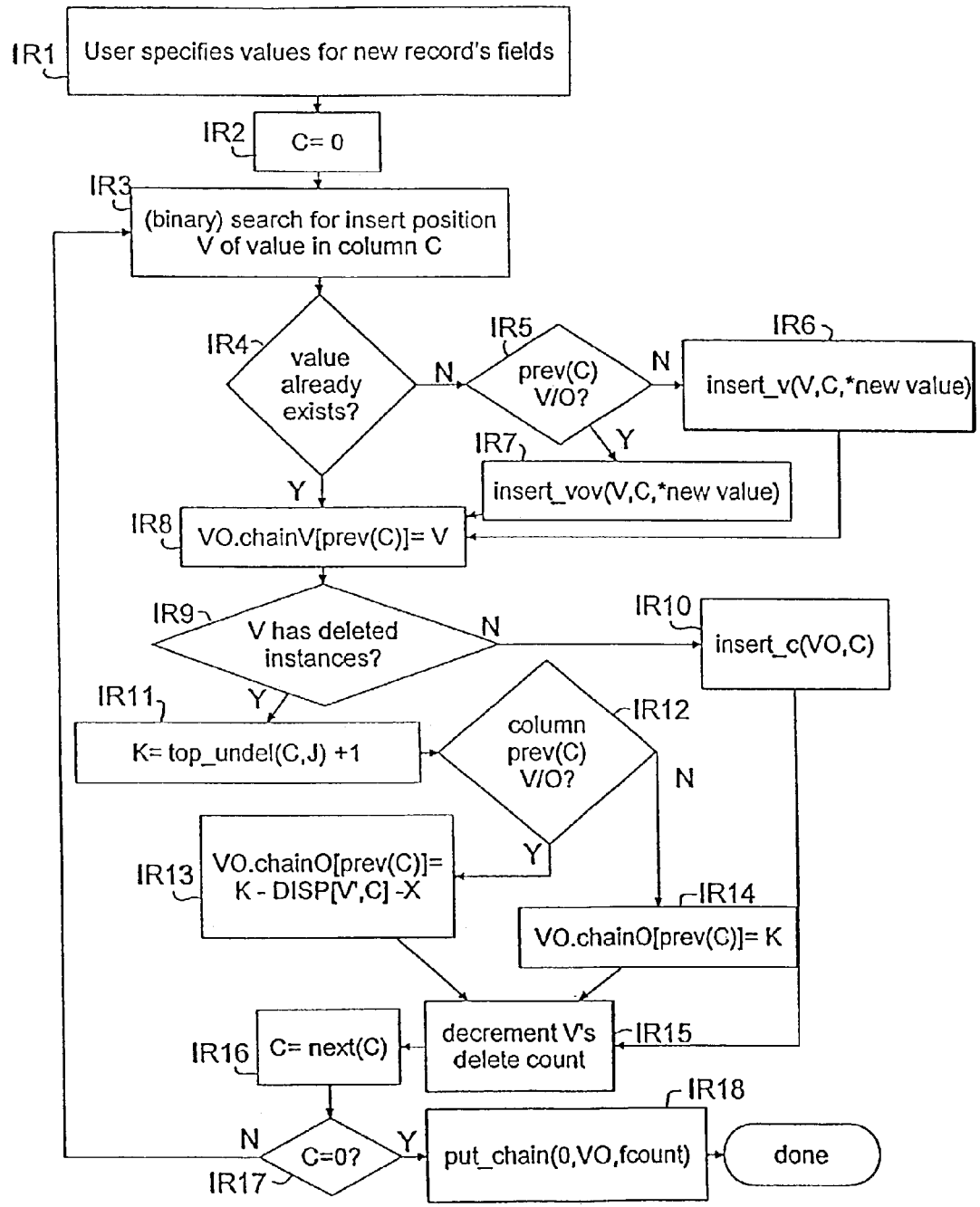
FIG. 20 is a block diagram illustrating the steps in an add record operation.

Insertion of a new record is illustrated in FIG. 20. Step IR1 obtains the values for the new record's fields (for example, from a user) and stores them in a temporary buffer. A ChainVO object VO is also allocated for record construction and insertion. Fields belonging to an "attached" column, as described above, are treated essentially as suffixes to the values in the column to which they are attached. Step IR2 sets the current column C to the first column. Step IR3 then searches the value table, VALS2, for the value, V, specified as the new record's column C value, and returns the sort position, V, of the value and whether the value already exists. Note that when prev(C) is V/O split, the search in VALS2 is done in two parts; first, the original, sorted value list is searched and then, if no match is found, the appended listed of added values is searched through the permutation list (as described above). Step IR4 tests whether the value already exists. If fit does, step IR8 is executed; otherwise step IR5 is executed.

Step IR5 determines whether column C is V/O split (in which case the column descriptors for prev(C) of the instance table would indicate V/O splitting). If it is V/O split, step IR7 is performed, which inserts the new value into VALS2, DISP, and DELS via a call to insert_vov(V,C,*new value). If it is not V/O split, step IR6 is performed, which inserts the new value int VALS2, DISP, and DELS via a call to insert_v(V,C,*new value).

In either case, step IR8 then builds chainV in the VO object, setting VO.chainV[prev(C)]=V, where V is either the sort position found in step IR3 (if column prev(C) is not V/O split), or h_val found in "insert_vov( )" (if column prev(C) of the instance table is V/O split).

Step IR9 determines whether the value at row V of VALS2 has deleted instances (by checking the DELS table column if it exists, otherwise by counting tombstones). If it does not, step IR10 is performed, which provides a deleted instance for the value via a call to insert_c(VO,C) (updating VO.chainO[prev(C)] in the process).

If there is already a deleted instance, the branch starting with step IR11 is performed. In step IR11, the row number, K, in the instance table of the first deleted instance is found via a call to top_undel(C,J)+1, where J represents the row number, in column C of the instance table, of an instance of value number V. In particular, if column C of DISP exists, then J=DISP[V,C] is such an instance. In the absence of column C of DISP, J=V is such an instance. Step IR12 then determines whether column prev(C) of the instance table is V/O split. If prev(C) is V/O split, then step IR13 sets VO.chainO[prev(C)] to the appropriate occurrence number, i.e., K–DISP[V',C]–X, where V'=V and X=0 if DISP is in "first row number" format, or V'=V–1 and X=1 if DISP is "last row number" format). If prev(C) is not V/O split, step IR14 loads the row number of the deleted instance, K, into VO.chainO[prev(C)].

In either case, step IR15 then deducts the deleted instance from the deletes count for row V of VALS2. Step IR16 then moves on to the next column, setting C to next(C). Step IR17 then determines whether all columns have been processed (i.e., whether C equals column 0) and, if not, loops back to step IR3. Otherwise, step IR18 writes the whole object VO back into the instance table (via a call to put_chain(0, VO, fcount), where fcount is the number of fields in the record), and processing is complete.

Record Updates

Figure 21:
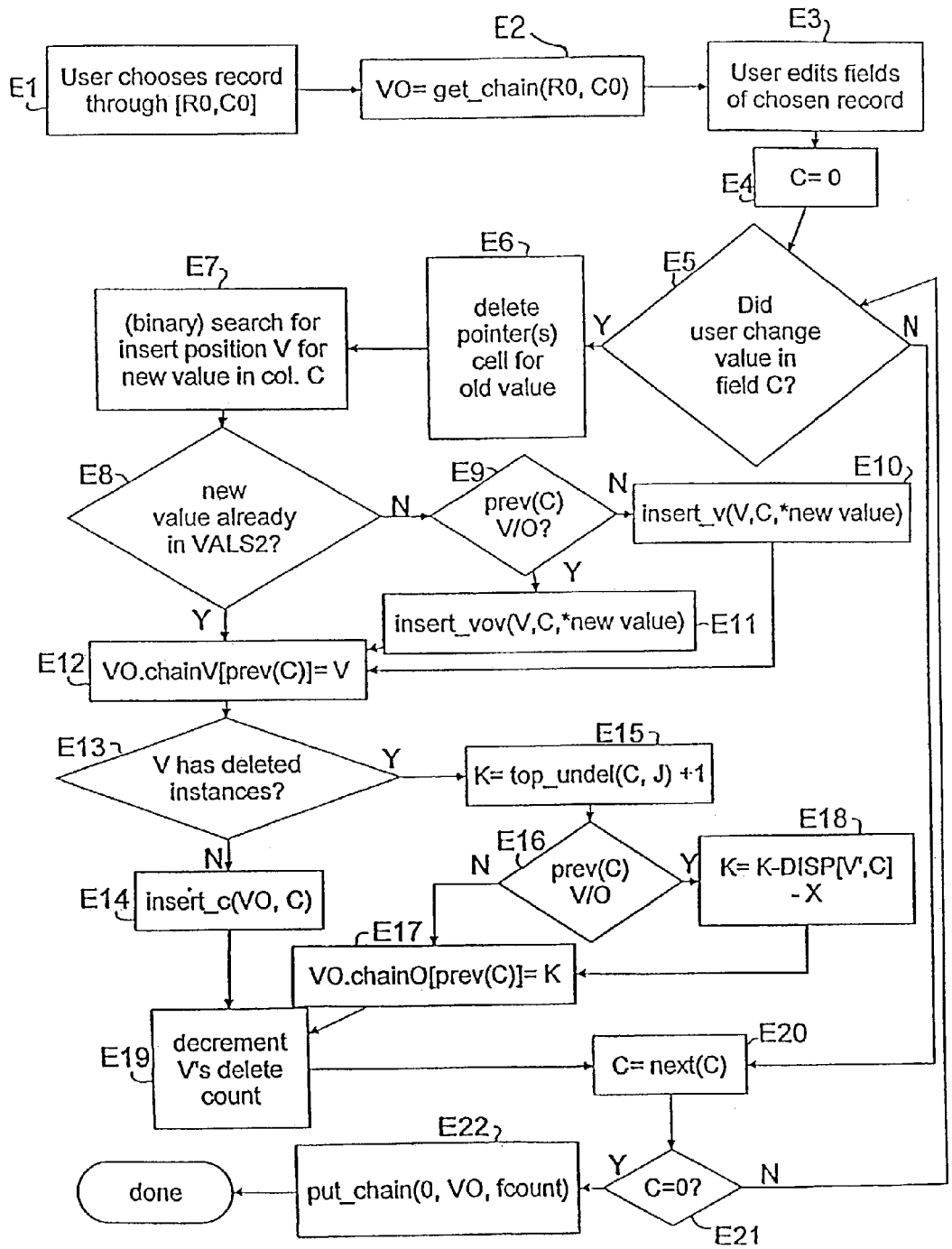
FIG. 21 is a block diagram illustrating the steps in a modify record operation.

Updating an existing record is illustrated in FIG. 21. In step E1, the user chooses a record to be updated and, in step E2, the record is loaded into a ChainVO object VO and in a temporary buffer. Any cell of the record may be selected as a starting point for loading VO. In step E3, the user optionally changes any or all field values (unless read-only conditions pertain) in the temporary buffer. Step E4 initializes the "current column," C, to start at the first column, column 0. Step E5 determines whether the user changed the value in field/column C. If the user has not changed the value, no processing is needed in this column, and step E20 is performed, which advances C to the next column, by setting C to next(C).

If the column C value has changed, step E6 is performed, which deletes the formerly live instance of the record's old value, via a call to "Delete pointer(s) cell [R,C]", described above. Step E7 then searches the value table (using, e.g., a binary search) for the value specified as the new record's column C value, and returns the sort position of the value, whether matched or not. When prev(C) is V/O split, the search of the value table is done in two parts; first, the original, sorted value list is searched and then, if no match is found, the appended listed of added values is searched through the permutation list (as described above). Step E8 tests whether the new value was already in VALS2. If it was, the branch starting with step E12 is performed; otherwise the branch starting with step E9 is performed.

Step E9 determines whether the column prev(C) is V/O split. If it is V/O split, step E11 inserts the new value into VALS2, DISP, and DELS via a call to insert_vov(V,C,*new value); otherwise, step E10 inserts the new value via a call to insert_v(V,C,*new value). Step E12 builds the chainV of the new record, one element at each pass, setting VO.chainV [prev(C)]=V, where V is either the sort position found in step E7, if column prev(C) is not V/O split, or h_val found in "insert_vov( )," if column prev(C) is V/O split. Step E13 determines whether the value at row V has deleted instances by looking in the DELS table, or counting tombstones if DELS has no corresponding column. If the value has no deleted instances, the branch starting at step E14 is executed. Step E14 provides a deleted instance for the value, via a call to insert_c(VO,C), and updates VO.chainO[prev(C)] in the process. Otherwise, the branch starting at step E1 is executed. Step E15 finds the row number, K, in column C of the first deleted instance of value number V; i.e., K=top_undel(C,J)+1, where J represents the row number, in column C of the instance table, of an instance of value number V. In particular, if column C of DISP exists, then J=DISP[V,C] is such an instance; otherwise, J=V is such an instance. Step E16 tests whether column prev(C) is V/O split. If it is V/O split, then step E18 is performed, which sets K to the occurrence number; i.e., K=K–DISP[V',C]–X, where V'=V and X=0 if DISP is "first row number" format, or V'=V–1 and X=1 if DISP is "last row number" format. In either case, step E17 is then performed, which loads the proper data into VO.chainO; i.e., VO.chainO[prev(C)]=K. Step E19 then removes the deleted instance from the deletes count. Step E20 then changes C to the next column (C=next (C)). Step E21 tests whether all columns have been processed; i.e., whether C=0, which was the starting column. If C has not returned to the starting column, execution loops back to step E5 and repeats with the new C value. Otherwise, step E22 writes the whole object VO back into the instance table, via a call to put_chain(O, VO, fcount), and processing is done.

Queries

Because columns in the database system of the present invention may be independently sorted, queries can be performed very quickly. Any of a variety of efficient, standard search or lookup algorithms can be used. For example, a simple binary search delivers a worst case time performance of $C \log_2 n$, and an average performance of $C \log_2 (n/2)$. Other search techniques can also be used, with the best one being dependent on the specific situation and characteristics of the data.

Parallelization can be implemented on top of either a binary midpoint or interpolation search. Such techniques for parallelization of search algorithms are known in the art. Further parallelization can be obtained by grouping rows of sorted data elements from each column in size n containers, where n equals either the number of processors or an integral multiple thereof. The system tracks the upper and lower boundary points of these containers, removing the necessity of data being sorted within them. Where n equals the number of processors, entire containers can then be searched and manipulated with the same efficiency that single rows are operated upon in single processor environments, while displacements within these containers become inconsequential.

Figure 22:
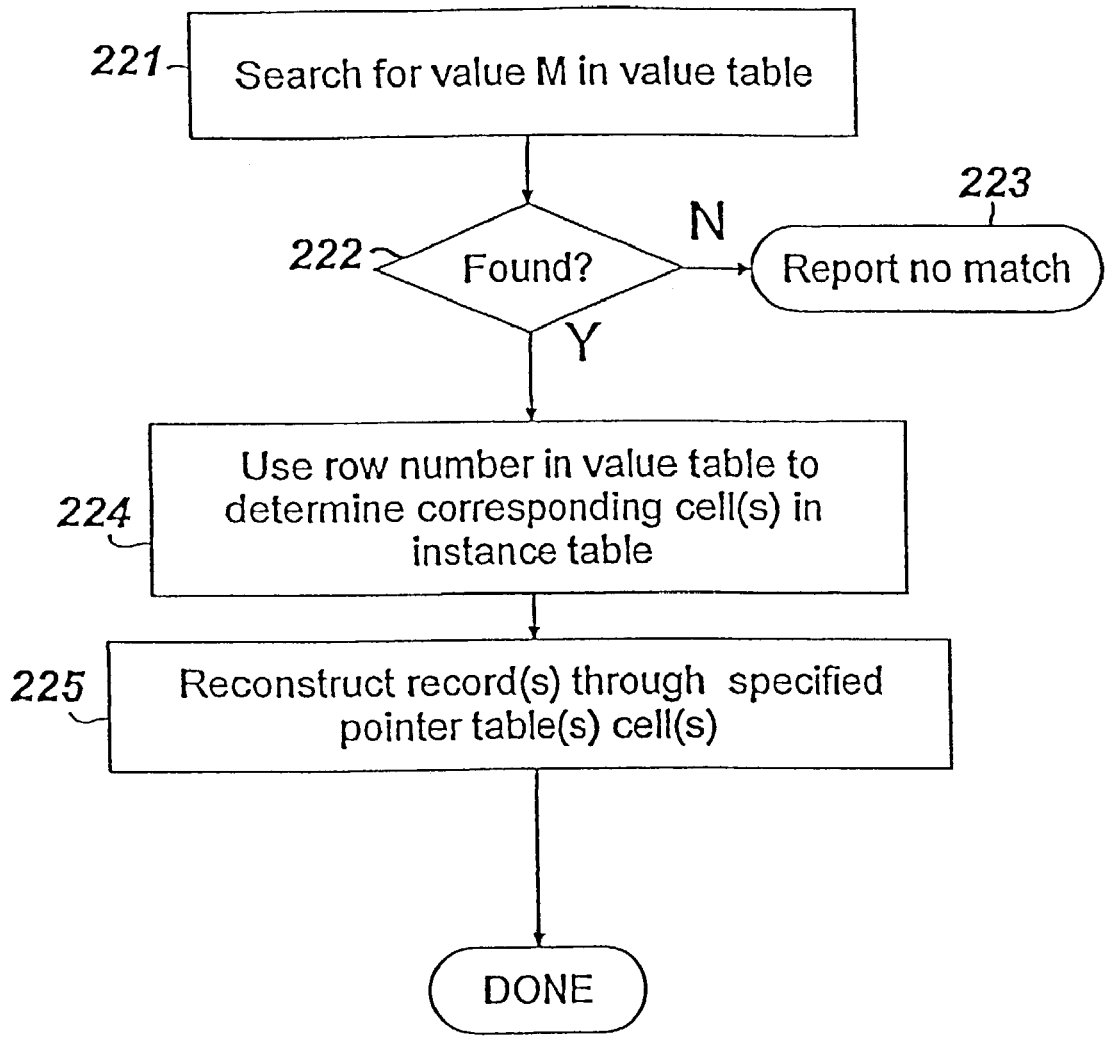
FIG. 22 is a block diagram illustrating the steps in a query operation.

As an example, a flowchart for a query for all records having a chosen value for a given field is illustrated in FIG. 22. In step 221, the value table for a particular field is searched for the values matching the chosen value, M. Again, because the columns are generally in sorted order, a binary search can be used (as well as other search techniques). Step 222 tests whether a matching value was found. If a matching value is not found, that is reported in step 223.

If a matching value is found, for example at Value_Table (r, c), steps 224 and 225 are performed, which determine the row in the value table with matching values (step 224) and reconstruct the records associated those rows (step 225). For a non-condensed column, the record associated with the cell with the matching value is reconstructed as discussed above; then contiguous rows (r+1, r+2, . . . , r−1, r−2, . . . ) are checked for matching values, and if additional matching values are found the records associated with those cells are also reconstructed. The search of contiguous rows can stop in any direction when a non-matching value is found.

For a condensed column, the range of instance table row numbers that point to the matching value is obtained from the displacement table. Again, where the matching value was found at Value_Table(r, c), the contents of Displacement_Table(r, c), if in "first row number" format, is the beginning of the range and Displacement_Table(r+1, c)−1 is the end of the range (unless r is the last row in the displacement table, in which case the end of the range is the last row in the instance table for the column). Step 225 then reconstructs, as described above, the records containing the cells identified in the instance table.

More complicated queries, such as (FIELD_X=M) .AND. (FIELD_Y=N), (FIELD_X=M) .OR. (FIELD_Y=N), and so on, are also efficiently implemented using the data structures described herein. For example, an AND query can be implemented by finding (as above) all records matching FIELD_X=M, then testing for the second condition (e.g., FIELD_Y=N) during record reconstruction.

A significant advantage of the present invention is that the AND condition query can be performed with fewer steps because, for condensed columns, the number of rows meeting each of the conditions is already known from the displacement table. The first condition to be applied can then be chosen to be the one with fewer matches. In contrast, existing database engines typically must perform "analysis" cycles periodically in order to have only an approximate idea of the cardinality found in each column. With the embodiments of the present invention described above, the cardinalities are known ahead of time for each value. An OR query can be implemented, for example, by finding all records matching the first condition and then finding all records matching the second condition that were not already matched by the first condition. If an arbitrarily complex expression is known in advance to be a frequent query, a sorted column for that expression can be included in the value, displacement and instance tables just as though it were an ordinary field, and the same rapid binary search method would apply.

Data structures, corresponding to those discussed above, can be initialized with the results of a query, thus facilitating sub-queries.

SQL Functions

Many SQL functions may be supported by the data structures in accordance with the present invention with a trivial amount of computational effort. For example, the COUNT function, which returns the number of records having a specified value for a given attribute, is available in constant time by accessing the entries for that value and the adjacent value in the displacement table. The MAX and MIN functions, which find the records with the maximum and minimum values for a given attribute, can be implemented by accessing the top and bottom cells, respectively, in the given column. The MEDIAN function, which finds the record with the middle value for a given attribute, can be implemented by searching for the location of the displacement table closest to half the record count, and returning the associated value. The MODE function, which finds the value with the largest number of occurrences, can be implemented by a linear search for the largest difference in adjacent displacement table values, and using the corresponding value. These functions (called aggregation functions) are efficient because the displacement table is directly related to the histogram of value counts within the column.

INSERT, DELETE, and UPDATE operations are supported as shown, for example, in the embodiments of these operations described above.

The present invention also supports other types of SQL queries. For example, suppose there are two tables, labeled "PLANT" and "EMPLOYEE", whose various attributes are shown below:

PLANT:
PLANT_NAME PLANT_NUMBER MANAGER_ID
   etc. . . .
EMPLOYEE:
EMPLOYEE_NAME EMPLOYEE_ID JOB ADDRESS
   etc. . . .

A query, for example, to find the name of each manager of each plant is expressed in SQL as follows:
   SELECT EMPLOYEE_NAME
   FROM PLANT, EMPLOYEE
   WHERE MANAGER_ID=EMPLOYEE_ID If the representations for the two tables are uncoupled, i.e., they each have separate value, instance, displacement, and occurrence tables, simple nested loops can be used to test for equality between values in the MANAGER_ID column of the PLANT database and the EMPLOYEE_ID column of the EMPLOYEE database, and, for each match, the corresponding EMPLOYEE_NAME in the EMPLOYEE database can be found.

If the instance, displacement, and occurrence tables of the EMPLOYEE and PLANT databases point to the same value table with a single MANAGER_ID/EMPLOYEE_ID column, then, for each displacement table that has an entry for a particular column for both EMPLOYEE and PLANT, the corresponding EMPLOYEE_NAME in the EMPLOYEE table can be found.

Joins

A join operation combines two or more tables to create a single joined table. For example, two tables may each have information about EMPLOYEES and a join might be performed to determine all information in both tables about each EMPLOYEE.

In order to perform a join, tables are typically linked through a primary or candidate key in one of the tables. The primary or candidate key is an attribute or attribute combination that is unique. A redundant representation of this same attribute or attribute combination, called a foreign key, is contained in one or more other tables. The foreign keys need not have the same cardinality as the primary or candidate key and need not be unique.

A join operation is defined as a subset of an extended Cartesian product of two or more tables. A Cartesian product of two record-based tables combines each row of the first table with every row of the second table. For example, if the first table had M rows and N columns and the second table had P rows and Q columns, the Cartesian production would have M×P rows and N+Q columns. An extended Cartesian product is a Cartesian product that results from inserting null values into one or more of the original tables.

A membership function defines the subset of the extended Cartesian product of two or more tables that are in the join answer set (i.e., the output of the join operation). The membership function contains a comparison condition and a join criterion that jointly determine a particular join type, which together with column selectors determine the answer set returned by the join.

The comparison condition specifies a logical operator. It is, for example, what appears between the attribute names in the "Where" clause of an SQL SELECT statement. The most common comparison condition is equality and the corresponding join is referred to as an equi-join. Other conditions such as greater than or less than are also possible.

The join criterion specifies the answer set of a join, given a comparison condition, specific join attributes and column selectors. For convenience equi-joins on a single attribute in each table are assumed in the discussion below. Join criteria include inner join (the join answer set consists of those rows that appear in both tables), outer join (further subdivided into left outer join, right outer join and full outer join—the join answer set consists of all the rows in the left, right or either table together with the corresponding rows of the other table where they exist, null filled otherwise), union join (the join answer set consists of those rows that appear in only one of the two tables, with the remaining values in those rows null filled), and cross join (the join answer set consists of the full non-extended Cartesian product of the two tables).

The column selectors specify which columns are returned in the answer set of the join.

In prior art database systems, joins tend to be extremely costly in storage space and/or processing time, requiring either pre-indexed data to maintain sortedness or a time intensive search involving multiple passes over the entirety of each attribute that is being joined. In the latter case, the time to do a two column join is proportional to the square of the number of rows, a three-column join proportional to the cube, etc., for tables of equal cardinality and equal to the n-fold product of record counts otherwise.

The present invention largely eliminates the overhead associated with joins. All attributes can be sorted, and union columns can eliminate the need to maintain redundant copies of data. Membership functions can be implemented efficiently through the displacement table, various alternate displacement tables, bit maps, and/or n-valued logic functions.

Alternate Displacement Tables

Certain properties of the union column lead to various modifications to the displacement table columns, which are particularly useful in performing joins. The "full" displacement structure has, for each column, rows that are in one-to-one correspondence with the rows of the corresponding column of the (condensed) value table. The contents of a cell of the full displacement table, in one embodiment, is the row number of the first (or last, depending on the embodiment) instance in the instance table of all instances possessing the corresponding value in the value table. If a value in the value table has no instances at all, identical entries in the displacement table in the corresponding and next (alternatively, previous) cells will indicate this. Consequently, if there are many more values without than with instances (referred to hereafter as the "sparse" case), there are many more repeated than different values in the displacement structure, leading to redundancy in the displacement table. In the full displacement table, in one embodiment, the entries are in sorted order, so that for row number J in the instance table, the corresponding row number V in the value table is that for which $DISP[V,I]<=J<DISP[V+1,I]$ (for a displacement column in the "first row number" format), or (for "last row number" format) $DISP[V-1,I]<J<=DISP[V,I]$.

In a "sparse" case, an alternative format for displacement table column(s) (referred to below as the "condensed" displacement format) can be used to remove redundancy. In this format, displacement table entries have two parts:

1) DV, the row number in the value table of a value having instances, and

2) DD, the starting (alternately, ending) row number in the instance table of the actual instances of the value.

The row number entries DD are in sorted order; DV will naturally also be in sort order when the underlying value table is in sort order.

For row number J in column I of the instance table, the corresponding row number V in the value table is found as follows:

1) find K, via, e.g., a binary search, such that $DD[K]<=J<DD[K+1]$ (for "first row number" format) or (for "last row number format") $DD[K-1]<J<=DD[K]$;

2) $V=DV[K]$.

A condensed displacement column, when appropriate, simultaneously saves storage space and speeds up binary searching. However, testing for the presence of instances of a given value is a constant-time lookup using a full displacement column, but a log time binary search using a condensed displacement column.

In the case where values without instances are rare, a further alternate format of the displacement table (referred to herein as "dense" format) permits all missing values to be found quickly. In this alternate format, displacement table entries have a bitflag to identify values with no instances, and, for those values with no instances, the contents of the entry is a pointer to the next value without instances. (The originally defined displacement list, lacking the linked list of missing values, is referred to below as "full" format).

Examples of Alternate Displacement Tables

Sparse and dense displacement columns are illustrated below for prior art, record-type, tables $J_{mod}$ and $SPJ_{mod}$ (excerpted from C. J. Date, *Introduction to Database Systems*, Sixth Edition, inside front cover (1995)):

| $J_{mod}$: | | | |
|---|---|---|---|
| Rec # | J# | JNAME | CITY |
| 0000: | J1 | Sorter | Paris |
| 0001: | J3 | OCR | Athens |
| 0002: | J4 | Console | Athens |

-continued $J_{mod}$:

| Rec # | J# | JNAME | CITY |
|---|---|---|---|
| 0003: | J5 | RAID | London |
| 0004: | J6 | EDS | Oslo |

$SPJ_{mod}$:

| Rec # | S# | P# | J# | QTY |
|---|---|---|---|---|
| 0000: | S2 | P3 | J2 | 200 |
| 0001: | S2 | P3 | J5 | 600 |
| 0002: | S2 | P5 | J2 | 100 |
| 0003: | S3 | P4 | J2 | 500 |
| 0004: | S5 | P2 | J2 | 200 |
| 0005: | S5 | P5 | J5 | 500 |
| 0006: | S5 | P6 | J2 | 200 |

Value, displacement, instance and occurrence tables for $J_{mod}$ and $SPJ_{mod}$ are as follows:

$J_{mod}$:
VALS:

| Row # | J# | JNAME | CITY |
|---|---|---|---|
| 0000 | J1 | Console | Athens |
| 0001 | J3 | EDS | London |
| 0002 | J4 | OCR | Oslo |
| 0003 | J5 | RAID | Paris |
| 0004 | J6 | Sorter | |

DISP:

| Row # | J# | JNAME | CITY |
|---|---|---|---|
| 0000 | 0 | 0 | 0 |
| 0001 | 1 | 1 | 2 |
| 0002 | 2 | 2 | 3 |
| 0003 | 3 | 3 | 4 |
| 0004 | 4 | 4 | |

Combined Instance/Occurrence Table:

| Row # | J# | JNAME | CITY |
|---|---|---|---|
| 0000 | 4/0 | 0/1 | 1/0 |
| 0001 | 2/0 | 2/0 | 2/0 |
| 0002 | 0/0 | 0/0 | 3/0 |
| 0003 | 3/0 | 1/0 | 4/0 |
| 0004 | 1/0 | 3/0 | 0/0 |

$SPJ_{mod}$:

VALS:

| Row # | S# | P# | J# | QTY |
|---|---|---|---|---|
| 0000 | S2 | P2 | J2 | 100 |
| 0001 | S3 | P3 | J5 | 200 |
| 0002 | S5 | P4 | | 500 |
| 0003 | | P5 | | 600 |
| 0004 | | P6 | | |
| 0005 | | | | |
| 0006 | | | | |

DISP:

| Row # | S# | P# | J# | QTY |
|---|---|---|---|---|
| 0000 | 0 | 0 | 0 | 0 |
| 0001 | 3 | 1 | 5 | 1 |
| 0002 | 4 | 3 | | 4 |
| 0003 | | 4 | | 6 |
| 0004 | | 6 | | |
| 0005 | | | | |
| 0006 | | | | |

Instance/Occurrence Table:

| Row # | S# | P# | J# | QTY |
|---|---|---|---|---|
| 0000 | 1/0 | 0/2 | 0/0 | 0/2 |
| 0001 | 1/1 | 0/1 | 1/0 | 0/0 |
| 0002 | 3/0 | 1/1 | 1/1 | 2/0 |
| 0003 | 2/0 | 0/4 | 1/2 | 2/2 |
| 0004 | 0/0 | 0/0 | 2/0 | 1/0 |
| 0005 | 3/1 | 1/0 | 2/1 | 2/1 |
| 0006 | 4/0 | 0/3 | 3/0 | 0/1 |

To facilitate rapid join queries on, for example, over the J# attribute of tables $J_{mod}$ and $SPJ_{mod}$, a union column for J# is created and sparse and dense displacement table columns corresponding to the union column are incorporated into the displacement tables for $J_{mod}$ and $SPJ_{mod}$. The J# union column for $J_{mod}$ and $SPJ_{mod}$ is as follows: J# Union for $J_{mod}$ and $SPJ_{mod}$:

| Row # | J# |
|---|---|
| 0000 | J1 |
| 0001 | J2 |
| 0002 | J3 |
| 0003 | J4 |
| 0004 | J5 |
| 0005 | J6 |
| 0006 | J7 |

The appropriate type of displacement column for each of $J_{mod}$ and $SPJ_{mod}$ is determined by comparing the cardinality of the union column to the cardinalities of the corresponding columns of the $J_{mod}$ and $SPJ_{mod}$ tables. The cardinality of the J# union column above is 7. The cardinality for the J# column in the $J_{mod}$ table is 5. Since nearly all values in the union column also appear in the $J_{mod}$ table, a dense displacement column is constructed for that attribute. For the SPJ$_{mod}$ table, the cardinality of its J# column, 2, is compared to the cardinality of the union column, 7. Since the J# values are "sparse" in this case, a sparse displacement column for the SPJ$_{mod}$ column is constructed. The J# union column, the displacement column for J$_{mod}$ and the displacement column for SPJ$_{mod}$ are shown below, all in one table for illustration purposes:

Union and Displacement Columns:

| Row # | J# Union | J$_{mod}$ D-column | SPJ$_{mod}$ D-column |
|---|---|---|---|
| 0000 | J1 | 0 | 1/0 |
| 0001 | J2 | *6 | 4/5 |
| 0002 | J3 | 1 | |
| 0003 | J4 | 2 | |
| 0004 | J5 | 3 | |
| 0005 | J6 | 4 | |
| 0006 | J7 | *1 | |

In the dense displacement column for J$_{mod}$, the asterisks are bitflags, indicating (1) that J$_{mod}$ does not have a record with the corresponding value, and (2) that the value which follows is a pointer to the next value in the union column which does not appear in J$_{mod}$. Those values in the union column which do not appear in J$_{mod}$ are thus maintained in a circular linked list.

In the sparse displacement column for SPJ$_{mod}$, the entries are presented in the format DV/DD, where DV is a pointer to a value in the union column which has instances in the SPJ$_{mod}$ table and the DD pointer is the starting row number in the SPJ$_{mod}$ instance/occurrence table of the instances of the given value.

Modelling Joins Using Bit Maps

The J# union column for the J$_{mod}$ and SPJ$_{mod}$ tables may also be supplemented by bit maps. The bit map will indicate whether a given value in the union column is contained in the J$_{mod}$ or SPJ$_{mod}$ tables. A procedure for creating such a structure is illustrated below. The bit map in this example consists of seven entries, 0000 through 0006, one for each value of J# present in the union column. Each entry is associated with 2 bits. The first bit is set to 1 if the corresponding value of J# is present in the J$_{mod}$ table, 0 otherwise. Likewise, the second entry is set to 1 if the J# value is present in the SPJ$_{mod}$ table, and 0 otherwise.

Since the J$_{mod}$ table is represented by a dense displacement column, its bit entries are initialized to '1' (since almost all the values in the union column are contained in J$_{mod}$). Likewise, since SPJ$_{mod}$ is represented by a sparse displacement column, its bit entries are initialized to '0' (since few of the values in the union column are present in SPJ$_{mod}$). The initial bit map is thus as follows:

Initial Bit Map:

| Row # | J$_{mod}$/SPJ$_{mod}$ |
|---|---|
| 0000 | 1/0 |
| 0001 | 1/0 |
| 0002 | 1/0 |
| 0003 | 1/0 |
| 0004 | 1/0 |
| 0005 | 1/0 |
| 0006 | 1/0 |

The next step is to construct the final bit map. For the J$_{mod}$ column, the values not present in the J# union column are contained in the ring of non-present values in its dense displacement column. The ring is traversed and the corresponding entries in the bit map are set to '0'.

To correct the entries for the SPJ$_{mod}$ column, the DV pointers point to the values in the union column which have entries in the SPJ$_{mod}$ tables and the corresponding entries in the bit map are set to '1'. The final bit map is as follows:

Final Bit Map:

| Row # | J$_{mod}$/SPJ$_{mod}$ |
|---|---|
| 0000 | 1/0 |
| 0001 | 0/1 |
| 0002 | 1/0 |
| 0003 | 1/0 |
| 0004 | 1/1 |
| 0005 | 1/0 |
| 0006 | 0/0 |

N-valued logic functions can model join operations with functions over bit maps. This technique is illustrated by the example below with reference to prior art tables S, P, and J (from C. J. Date, *Introduction to Database Systems*, Sixth Edition, inside front cover (1995)):

S:

| S# | SNAME | STATUS | CITY |
|---|---|---|---|
| S1 | Smith | 20 | London |
| S2 | Jones | 10 | Paris |
| S3 | Blake | 30 | Paris |
| S4 | Clark | 20 | London |
| S5 | Adams | 30 | Athens |

P:

| P# | PNAME | COLOR | WEIGHT | CITY |
|---|---|---|---|---|
| P1 | Nut | Red | 12 | London |
| P2 | Bolt | Green | 17 | Paris |
| P3 | Screw | Blue | 17 | Rome |
| P4 | Screw | Red | 14 | London |
| P5 | Cam | Blue | 12 | Paris |
| P6 | Cog | Red | 19 | London |

J:

| J# | JNAME | CITY |
|---|---|---|
| J1 | Sorter | Paris |
| J2 | Display | Rome |
| J3 | OCR | Athens |
| J4 | Console | Athens |
| J5 | RAID | London |
| J6 | EDS | Oslo |
| J7 | Tape | London |

In this example a union join is performed on the "CITY" columns of the S, P, and J tables. This entails finding only those records whose "CITY" value appears in exactly one of the S, P, or J tables.

The first step is to construct a union column for the CITY columns of S, P, and J, if one does not already exist.

The second step is to associate with each value of the union column three bits, corresponding to the S, P, and J tables, respectively. A bit is set to 'Y' (i.e., '1') if the CITY value is present in the appropriate table, and to 'N' (i.e., '0') otherwise. Such a table is depicted below:

| Union column and bit map: | | | |
|---|---|---|---|
| CITY | S | P | J |
| Athens | Y | N | Y |
| London | Y | Y | Y |
| Oslo | N | N | Y |
| Paris | Y | Y | Y |
| Rome | N | Y | Y |

For a particular value of the CITY attribute, records with that value appear in the union join if and only if that value of CITY appears in exactly one of the S, P, and J tables, i.e., exactly one of the bits in the bitmap for the union column equals 'Y'. One illustrative implementation of a function that finds such rows is function f(temp, column) described below. The function's domain consists of the two variables 'temp' and 'column'. The variable 'temp' can be one of three values; 'Y', 'N', or 'D'. The variable 'column' is either 'Y' or 'N'. Lastly, the return value of function f also consists of the three values 'Y', 'N', or 'D'.

For each value of CITY in the union column, function f is applied iteratively to the bit values in each of the three columns: the variable 'column' is set to the bit value of the current column, and 'temp' is assigned the result of the previous application of the function f. For the first column, S, 'temp' is initialized to 'N'. After the final iteration, if the result is 'Y', the value appears in the union join; if the result is 'N' or 'D', the value does not appear.

The function f is defined as follows:

| Temp | Column | Return Value |
|---|---|---|
| N | N | N |
| Y | N | Y |
| D | N | D |
| N | Y | Y |
| Y | Y | D |
| D | Y | D |

Applying this function to the first row in the Union Table, corresponding to the value 'Athens', yields the following result: f(f(f('N','Y'),'N'),'Y'), which equals 'D'. Hence 'Athens', which appears twice in the row, does not appear in the Union Join.

Applying function f to the row for 'Oslo' yields the following result: f(f(f('N','N'),'N'),'Y'), which equals 'Y'. Hence 'Oslo', which appears exactly once in the row, does appear in the union join.

Figure 23:
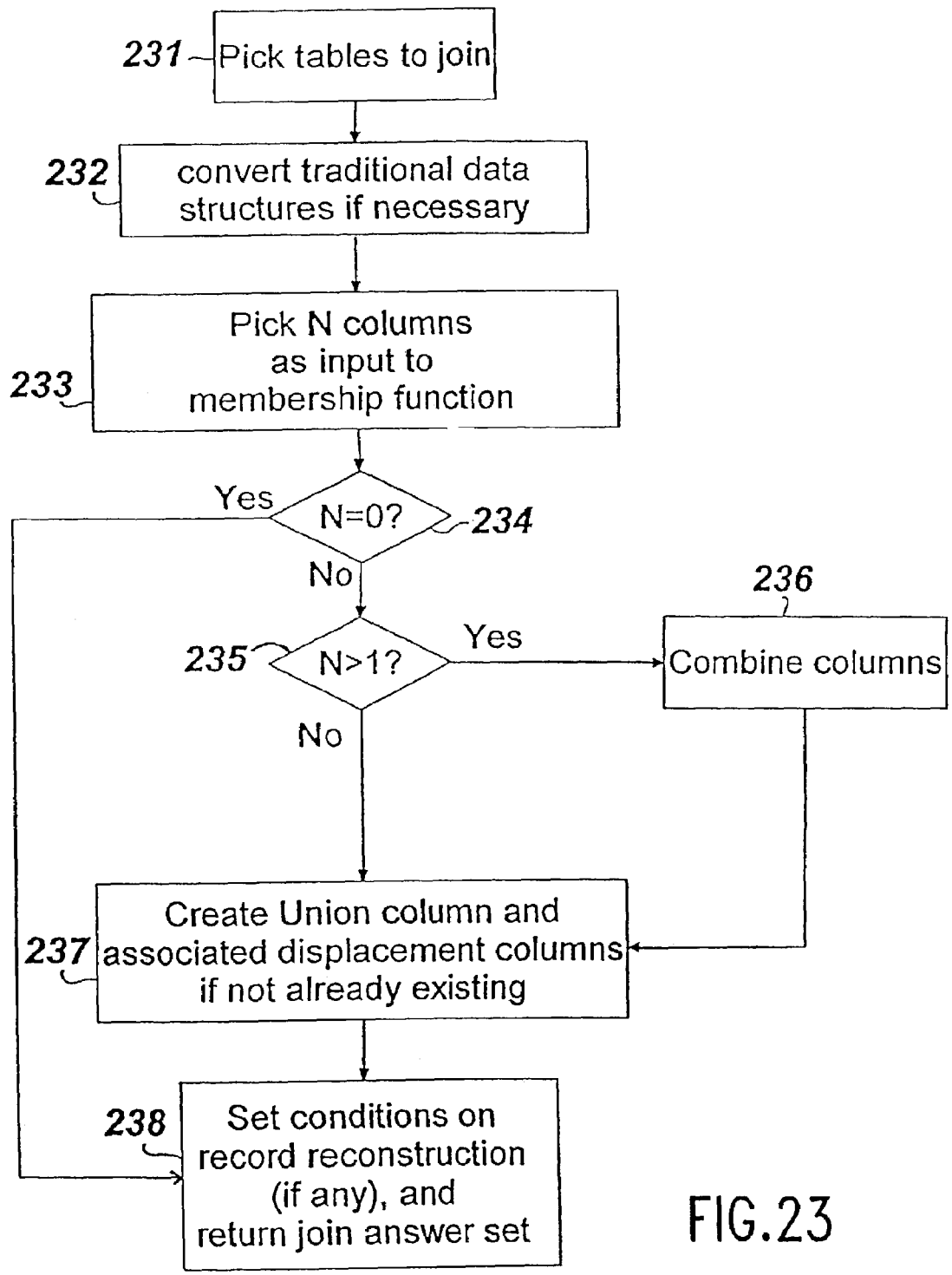
FIG. 23 is a block diagram illustrating the steps in a join operation.

FIG. 23 is a flowchart that illustrates a join operation. In step 231, the user picks tables to join. In step 232, any tables not already represented in the data structures of the present invention are converted into such structures. Next, in step 233, columns, if any, are picked whose values are part of the logical expression defining the join as a subset of the extended Cartesian product. Step 234 tests if any columns were selected. If no columns were selected, the join corresponds to the full non-extended Cartesian product, and record reconstruction proceeds via step 238 without conditional constraints (i.e., every record from each table is combined with every record of every other table).

Otherwise step 235 is performed which tests if more than one column was selected. If so, those columns are combined into a combined column (such as in the "combined columns" description above).

If the appropriate value table union column does not already exist, step 237 creates it, together with its associated displacement table columns. Step 238 then modifies the ranges in the routines that produce the join output, using full, dense and/or sparse displacement lists, bitmaps, multivalued logic functions or any combination of them, so as to match the type of join, using the appropriate comparison condition and join criterion.

For example, the answer set of an inner join is limited to instance table cells corresponding to displacement table rows in which the tables involved have non-null record ranges. This can be determined, for example, from their displacement table entries. Corresponding instance cell entries derived from each such displacement table row (and possibly one of the adjacent rows, depending on the implementation) provide the instance table cell ranges for each table for all matching records. The answer set is restricted to only those records, producing the appropriate inner join answer set. The answer sets for other types of joins can be similarly determined from, for example, the displacement table.

Combination with the query methods discussed above enables implementation of a full range of statements like SQL's "SELECT . . . FROM . . . WHERE . . . "

Metric Combined Fields

One space saving technique described in the "Column Merge Compression" section above is to combine low cardinality fields into a single "combined" field having values representing the various combinations of the original fields. An extension of the combined-field technique, referred to herein as "metric combined fields," provides generally faster processing of queries than the previously described combined fields, sometimes, but not always, at the cost of an increase in space usage.

A metric combined field (i) contains all values in the Cartesian product of the original fields, instead of only the instantiated values, as in the earlier (non-metric) combined field, and (ii) the values are sorted in a nested sort order. Performing complex queries on such a field is extremely fast because the position of subfields having specific values can be directly computed since all values having a given subfield are separated by fixed distances in the nested sort order.

Uncompressed Metric Combined Fields

In one embodiment, a D-list for a metric combined field has an entry for each possible combined field value (i.e., there is no compression) with consecutive entries associated with values in nested sort order. Again, the ability to locate subfield data without searching follows from the "metric" property of the D-list for the metric combined field, i.e., such D-lists have known, fixed distances between D-list entries corresponding to a given subfield value.

Consider the following sample data table (of unique records, as required for a relational database):

| FIRST | LAST | PHONE | BIRTH |
|---|---|---|---|
| Aaron | Blubwat | 2122221111 | Oct. 15, 1954 |
| Alice | Blubwat | 2122221111 | Dec. 13, 1979 |
| Joe | Blubwat | 2012221111 | Sep. 5, 1957 |
| Aaron | Jones | 2122221112 | Mar. 23, 1962 |
| Joe | Jones | 2032221113 | Jun. 17, 1975 |
| Alice | Smith | 2022221112 | Feb. 4, 1971 |
| Blubby | Smith | 2122221113 | Nov. 14, 1953 |
| Alice | Jones | 2032221113 | Jan. 4, 1948 |
| Blubby | Jones | 2032221113 | Oct. 11, 1957 |
| Blubby | Blubwat | 2022221112 | Aug. 1, 1950 |
| Jake | Jones | 2012221111 | Jul. 9, 1946 |
| Blubby | Blubwat | 2122221111 | Oct. 15, 1954 |
| Blubby | Smith | 2012221111 | Nov. 14, 1953 |
| Alice | Jones | 2042221114 | Jan. 4, 1948 |
| Blubby | Smith | 2022221112 | Nov. 14, 1953 |
| Joe | Jones | 2122221113 | Jun. 17, 1975 |
| Joe | Smith | 2122221113 | Feb. 4, 1971 |
| Blubbz | Blubwaz | 2132221113 | Aug. 1, 1950 |
| Jakz | Blubwaz | 2132221113 | Aug. 1, 1950 |
| Alicz | Blubwaz | 2132221113 | Aug. 1, 1950 |

This data table can be represented (prior to the creation of metric combined fields) by the condensed value table and corresponding displacement table, and I/O lists (skewered order, all with V/O breakout) as follows (where all tables are 0-based):

| V-LIST: | | | | |
|---|---|---|---|---|
| 000000: | Aaron | Blubwat | 2012221111 | Jan. 4, 1948 |
| 000001: | Alice | Blubwaz | 2022221112 | Feb. 4, 1971 |
| 000002: | Alicz | Jones | 2032221113 | Mar. 23, 1962 |
| 000003: | Blubby | Smith | 2042221114 | Jun. 17, 1975 |
| 000004: | Blubbz | | 2122221111 | Jul. 9, 1946 |
| 000005: | Jake | | 2122221112 | Aug. 1, 1950 |
| 000006: | Jakz | | 2122221113 | Sep. 5, 1957 |
| 000007: | Joe | | 2132221113 | Oct. 11, 1957 |
| 000008: | | | | Oct. 15, 1954 |
| 000009: | | | | Nov. 14, 1953 |
| 000010: | | | | Dec. 13, 1979 |

| DISP: | | | | |
|---|---|---|---|---|
| 000000: | 0 | 0 | 0 | 0 |
| 000001: | 2 | 5 | 3 | 2 |
| 000002: | 6 | 8 | 6 | 4 |
| 000003: | 7 | 15 | 9 | 5 |
| 000004: | 13 | | 10 | 7 |
| 000005: | 14 | | 13 | 8 |
| 000006: | 15 | | 14 | 12 |
| 000007: | 16 | | 17 | 13 |
| 000008: | | | | 14 |
| 000009: | | | | 16 |
| 000010: | | | | 19 |

| Instance/Occurence: | | | | |
|---|---|---|---|---|
| 000000: | 0/002 | 0/001 | 4/000 | 1/001 |
| 000001: | 2/005 | 1/001 | 6/000 | 1/002 |
| 000002: | 0/004 | 4/000 | 9/000 | 1/003 |
| 000003: | 2/001 | 4/001 | 1/000 | 7/003 |
| 000004: | 2/004 | 4/002 | 5/001 | 0/001 |
| 000005: | 3/001 | 7/000 | 9/001 | 7/001 |
| 000006: | 1/000 | 7/001 | 0/000 | 7/002 |
| 000007: | 0/001 | 7/002 | 3/000 | 5/000 |
| 000008: | 0/003 | 0/000 | 7/000 | 2/000 |
| 000009: | 2/003 | 2/000 | 0/001 | 3/000 |
| 000010: | 3/000 | 2/001 | 8/000 | 4/000 |
| 000011: | 3/002 | 2/002 | 8/001 | 6/000 |
| 000012: | 3/004 | 3/000 | 10/000 | 7/000 |
| 000013: | 1/001 | 5/000 | 2/000 | 3/002 |
| 000014: | 2/000 | 6/001 | 1/001 | 0/000 |
| 000015: | 1/002 | 0/002 | 3/001 | 3/001 |
| 000016: | 0/000 | 1/000 | 9/002 | 3/003 |
| 000017: | 2/002 | 1/002 | 5/000 | 3/004 |
| 000018: | 2/006 | 6/000 | 5/002 | 3/005 |
| 000019: | 3/003 | 6/002 | 5/003 | 1/000 |

In the above example, the BIRTH field is in essence a non-metric combined field since it contains distinct subfields (month, day of month, year); the subfields are sometimes represented as separate fields in traditional databases. The BIRTH field can be converted to a metric combined field as follows. A good choice for a metric combined field representation provides compact storage as well as fast access when selecting or grouping by subfield (in this case, by month, day of month or year). One such metric combined field representation is formed by converting a date in MM/DD/YYYY format (where MM is a two digit number representing the month, DD is a two digit number representing a day, and YYYY is a four digit number representing a year) to a sixteen bit integer S where S=(YYYY−XXXX)*512+(MM−1)*32+DD−1 and XXXX is the earliest date being considered. This uses 5 bits for the day field, 4 bits for the month field, and 7 bits for the year field and provides a 128 year range of birthdays in a 16-bit integer.

The above lists can incorporate a metric combined field representation of the date as follows. First, the V-list for the BIRTH field can be eliminated since the value is implicit in the offset into the D-list. Second, the D-list can be replaced by a 65536-entry list. In the above example the D-list would be composed of eleven distinct values, in monotonically increasing order, with changes in values at the positions indexed by the metric combined field values corresponding to instantiated dates. Third, the I part of the I/O values shown in the third column of the Instance/Occurence list would be changed to equal the value corresponding to the date instantiated in that record.

The increase in overhead for, e.g., the D-list is impractical for the small data set of this example, but for larger data sets, the savings become apparent. For example, considering a voter registration data table having a birthday field and a registration date field and containing information on the entire population of the State of New York, all or almost all metric combined field values corresponding to a valid date could have an instantiation. Thus, a D-list having an entry for every such value would not have undue overhead. Such D-lists do include entries for some values that have no corresponding dates (because only 366 day-month combinations are actually used of the 512 allowed for in the above metric combined field representation), and these entries will always have the identical displacement value of the next valid date. However, this slight expansion of the displacement table is offset by the fast computation of the location of specific subfield values in the metric combined field.

Moreover, such a representation of date information represents an immense reduction in storage requirements over, for example, conventional B-tree database methods, which would store each date for each voter (100 million dates assuming 50 million records in the voter registration database), and an additional tree node for each unique value for each field to allow for indexed searching. In contrast, the displacement table for each date field is only 65536 entries long.

Using the metric combined field method of the present invention, records can be rapidly selected by various groupings with no searching required. For example, to find all voters who registered in October of all years, the database system need only look at every group of 31 values spaced 512 values apart, starting with October 1 of the first year stored.

Using powers of two to represent days, months, and years in a date field in metric combined field format complicates the computation of relative distances in days between two dates—i.e., the number of days between the dates represented by two values in the metric combined field is not simply the difference of the values. This can be rectified by the addition of a time line of, for example, 4 years (2048 entries), where 4 years is selected to include a leap year. The time line maps real years (365 or 366 day years) onto the power of two years (512 day years). In one embodiment of this time line, the first 31 entries (starting with January 1) would contain the consecutive digits 1 through 31 (i.e., the 31 days of January) followed by a 0 (to pad out the 32 slots allocated for each month), followed by 32 through either 59 (for a non leap year) or 60 (for a leap year) (i.e., the 28 or 29 days of February) followed by either 4 zeros (for a non-leap year) or 3 zeros (for a leap year), followed by an additional set of another 31 consecutive numbers (for the 31 days in March) beginning with 61 (for a leap year) or 60 (for a non-leap year), followed by another zero, followed by another 30 consecutive numbers representing April, followed by two consecutive zeros and so on. Such a time line not only enables the relative distances in days between any two points to be easily calculated, but also serves as a data integrity check, since any number that maps onto a zero on this time line, and only such numbers, are known to represent invalid entries. Alternatively, the time line could represent only one year, thus occupying only 512 entries, with leap year corrections calculated separately. The described time line is generally applicable to any metric combined field in which the rounding of subfields creates discontinuities in previously continuous, regular sequences.

The use of metric combined fields for representation of dates similarly applies to the representation of data associated with "smart codes." "Smart codes" in current art refer to identification codes having subparts encoding specific information. Such codes have been used in, for example, check processing, inventory labeling systems and mailing systems. The code will often uniquely identify an item or person and will also reveal additional information when decoded. For example, a checking account number may include embedded bank and branch information; an employee identification number may include department and division information; and a U.S. zip+4 code may include state and city information. In known database systems, it is not uncommon for smart code subfields to be stored in separate database fields to facilitate searching. As in the date example, a metric combined field for a smart code has all possible values of the smart code, including uninstantiated values, represented in the V- and D-lists. Also, the subfields can again be rounded to bit boundaries to further facilitate searching.

Expanded Metric Combined Field Example with Containers

In accordance with another aspect of the present invention, compression techniques are provided for reducing the size of the V- and D-lists required for representing the complete set of all possible values in a metric combined field while preserving the field's metric property. These techniques are particularly useful in situations where relatively few of the values in the metric combined field are actually instantiated.

In one illustrative example, instead of the 7-bit year portion of the above metric combined field value representing 128 individual years, the year portion is used as a pointer to one of 128 containers of 1000 years, so that the value, plus other structures described below, covers a date range of 128,000 years. In this example, each entry in the 65536-entry D-list indicates the start of all records having a given day and month, with the year value being one of one thousand consecutive years. The records are sorted within the containers by year.

To find a particular date in the recorded range, in an arbitrarily large data table, the steps are:
1) Subtract the starting year (SY) from the year sought (Y) to obtain the difference (DIFF),
2) Divide DIFF by 1000 to get a number between 0 and 127, indicating the thousand-year range including the requested year for the requested day and month, and
3) Multiply DIFF by 512 and add 32*(month−1)+(day−1) to get the D-list entry index.

Each D-list entry in this example points to a further structure, e.g. a D-sublist of 1000 entries (one such D-sublist per container), that specifies the number of instances of each date within the container. The entry for the particular date within the container is at position DIFF mod 1000. Containers for which all included dates have no instances can have NULL pointers in the D-list, saving the space otherwise needed for the corresponding D-sublist. For sparse but clumpy record-sets, considerable compression can result without loss of the metric property (regular spacing of like values) of the full D-list for a metric combined field.

In the above example, the containers had entries for a specific day number and month number in each of one thousand contiguous years. The containers may be organized, in alternative embodiments, in many different ways. For example, in one alternative embodiment, each container may contain entries for every day and month in a specified number of contiguous years.

Also, the D-list sublists may be in a variety of formats as described-previously, such as, for example, individual count format (where each entry provides the number of instances for each value) or cumulative count format (where each entry provides the number of instances for each value and all preceding values).

Generalized Metric Combined Fields

The previous sections described using a single metric combined field to represent the data in a single field of a record. A metric combined field can also be used to represent multiple or all fields of a record. The range of such a field is, in one embodiment, the Cartesian product of the cardinalities of all the constituent fields.

In the example below, a metric combined field is created from the "FIRST", "LAST" and "PHONE" fields of a data set. These fields may for example comprise some or all of the fields in a record. The data table and V-list for this example are as follows:

| FIRST  | LAST    | PHONE      |   |
|--------|---------|------------|---|
| Aaron  | Blubwat | 2122221111 | a |
| Alice  | Blubwat | 2122221111 | b |
| Joe    | Blubwat | 2012221111 | c |
| Aaron  | Jones   | 2122221112 | d |
| Joe    | Jones   | 2032221113 | e |
| Alice  | Smith   | 2022221112 | f |
| Blubby | Smith   | 2122221113 | g |
| Alice  | Jones   | 2032221113 | h |
| Blubby | Jones   | 2032221113 | i |
| Blubby | Blubwat | 2022221112 | j |
| Jake   | Jones   | 2012221111 | k |
| Blubby | Blubwat | 2122221111 | l |
| Blubby | Smith   | 2012221111 | m |
| Alice  | Jones   | 2042221114 | n |
| Blubby | Smith   | 2022221112 | o |
| Joe    | Jones   | 2122221113 | p |
| Joe    | Smith   | 2122221113 | q |

(The lower case letters a–q to the right are not part of the record, but serve as identifiers for later reference.)

| V-List: | | | |
|---------|--------|---------|------------|
| 0000:   | Aaron  | Blubwat | 2012221111 |
| 0001:   | Alice  | Jones   | 2022221112 |
| 0002:   | Blubby | Smith   | 2032221113 |
| 0003:   | Jake   |         | 2042221114 |
| 0004:   | Joe    |         | 2122221111 |
| 0005:   |        |         | 2122221112 |
| 0006:   |        |         | 2122221113 |

As the V-List illustrates, there are 5 distinct values for column 0, 3 values for column 1 and 7 values for column 2 (i.e. "FIRST" has cardinality 5; "LAST" has cardinality 3, and "PHONE" has cardinality 7). Given these values, there are thus 5*3*7=105 possible distinct unique records in the Cartesian product, of which 17 appear in this data table.

Rounding up each field's cardinality to the next higher power of 2 (unless the cardinality is already a power of 2) results in a metric combined field in which each subfield's value can be represented by a fixed-bit index falling within a separate and distinct sequence of bits. Thus, as shown below, the "FIRST" field can be represented by a 3-bit index (and has a cardinality of 8), the "LAST" field can be represented by a 2-bit index (and has a cardinality of 4), and the "PHONE" field can be represented by a 3-bit index (and has a cardinality of 8). After rounding, there are 8*4*8=256 possible values in the metric combined field for this example.

| FIRST | | LAST | | PHONE | |
|-----|--------|----|---------|-----|------------|
| 000 | Aaron  | 00 | Blubwat | 000 | 2012221111 |
| 001 | Alice  | 01 | Jones   | 001 | 2022221112 |
| 010 | Blubby | 10 | Smith   | 010 | 2032221113 |
| 011 | Jake   | 11 |         | 011 | 2042221114 |
| 100 | Joe    |    |         | 100 | 2122221111 |
| 101 |        |    |         | 101 | 2122221112 |

-continued

| FIRST | LAST | PHONE | |
|-----|--|-----|------------|
| 110 |  | 110 | 2122221113 |
| 111 |  | 111 |            |

The unused values padding each value list to a power of two may be used to represent new values not already present in the value lists. In this example, the new values correspond to unspecified values greater (in sort order) than any already existing in the corresponding value list.

Alternatively, dummy values can be inserted in sort order as placeholders at user selected or automatically selected positions in the value lists. The value of any such placeholder is arbitrary, within the constraint that it lexically follow the instantiated value immediately preceding it in the value list and lexically precede the instantiated value immediately following it. For example, the instantiated values "Blubwat" and "Jones" may be separated by a placeholder "Blubwaz"; this placeholder can actually be any value V satisfying "Blubwat"<V<"Jones". New instantiated values can then be inserted into the value list by overwriting a placeholder in the correct lexical position. For example, if a record having new "LAST"="Greene" is inserted in the data table, the placeholder "Blubwaz" can be overwritten with "Greene", while still maintaining the sort order of the value list. The bits associated with "Blubwaz" now represent "Greene".

A metric combined field can then be formed from columns FIRST, LAST and PHONE. In this case, the values in the metric combined field represent a nested sort ordering of the constituent columns (such as FIRST-LAST-PHONE nested sort order). The V-lists for FIRST, LAST and PHONE identify the codes for each value in the list. Again, no V-list is required for the metric combined field because, as above, the values are implicit in the D-list.

The instantiated values of the metric combined field for the data in the above illustrative data table, in FIRST-LAST-PHONE nested sort order, are as follows:

| 000 | 00 | 100 | a |
|-----|----|-----|---|
| 000 | 01 | 101 | d |
| 001 | 00 | 100 | b |
| 001 | 01 | 010 | h |
| 001 | 01 | 011 | n |
| 001 | 10 | 001 | f |
| 010 | 00 | 001 | j |
| 010 | 00 | 100 | l |
| 010 | 01 | 010 | i |
| 010 | 10 | 000 | m |
| 010 | 10 | 001 | o |
| 010 | 10 | 110 | g |
| 011 | 01 | 000 | k |
| 100 | 00 | 000 | c |
| 100 | 01 | 010 | e |
| 100 | 01 | 110 | p |
| 100 | 10 | 110 | q |

The invention is not limited to an "index" that identifies the position of a value in a value list that is in sort order. Any way of assigning unique numbers to each value in the value list can be used. For example, the value list can be a hash table and the number assigned to each value in the value list (i.e., its "index") can be its hash value. Alternatively, the index may identify a container containing entries for a plurality of values, as in the date example above.

If fewer than all the columns are combined, the I- and D-lists for the data set can be modified as described above for combined fields.

Advantageously, the process of creating metric combined fields can be automated based on the cardinalities of the fields and the size of the data set. For example, combined-code fields can be automatically created for columns having low cardinalities in large data sets.

While the invention has been particularly shown and described with reference to particular illustrative embodiments thereof, it will be understood by those skilled in the art that various changes in form and details are within the scope of the invention, which is defined by the claims.

What is claimed is:

1. A system for storing a first plurality of tuples, each tuple comprising at least a first attribute having a first attribute value and a second attribute having a second attribute value, and a second plurality of tuples, each tuple comprising at least a first attribute, that is the same as the first attribute of the first plurality of tuples, having a first attribute value and a second attribute, different than the second attribute of the first plurality of tuples, having a second attribute value, the system comprising:
    a value store storing the first attribute values for each of the first and second plurality of tuples;
    a first instance store identifying instances of the first attribute value associated with each tuple in the first plurality of tuples;
    a second instance store identifying instances of the first attribute value associated with each tuple in the second plurality of tuples;
    a first cardinality store storing information representing frequencies of occurrence of instances of equal value of the first attribute in the first plurality of tuples, wherein a particular value in the value store associated with a particular instance in the first instance store can be derived using the first cardinality store; and
    a second cardinality store storing information representing frequencies of occurrence of instances of equal value of the first attribute in the second plurality of tuples, wherein a particular value in the value store associated with a particular instance in the second instance store can be derived using the second cardinality store.

2. The system of claim 1 wherein at least one of the first and second cardinality stores contains information indicating that there are zero occurrences of an instance of at least one value.

3. A method for storing a first plurality of tuples, each tuple comprising at least a first attribute having a first attribute value and a second attribute having a second attribute value, and a second plurality of tuples, each tuple comprising at least a first attribute, that is the same as the first attribute of the first plurality of tuples, having a first attribute value and a second attribute, different than the second attribute of the first plurality of tuples, having a second attribute value, the method comprising the steps of:
    storing in a value store the first attribute values for each of the first and second plurality of tuples;
    storing in a first instance store information identifying instances of the first attribute value associated with each tuple in the first plurality of tuples;
    storing in a second instance store information identifying instances of the first attribute value associated with each tuple in the second plurality of tuples;
    storing in a first cardinality store information representing frequencies of occurrence of instances of equal value of the first attribute in the first plurality of tuples, wherein a particular value in the value store associated with a particular instance in the first instance store can be derived using the first cardinality store; and
    storing in a second cardinality store information representing frequencies of occurrence of instances of equal value of the first attribute in the second plurality of tuples, wherein a particular value in the value store associated with a particular instance in the second instance store can be derived using the second cardinality store.

4. The method of claim 3 wherein at least one of the first and second cardinality stores contains information indicating that there are zero occurrences of an instance of at least one value.

* * * * *